(12) United States Patent
Sawano et al.

(10) Patent No.: US 10,536,591 B2
(45) Date of Patent: Jan. 14, 2020

(54) INFORMATION PROCESSING APPARATUS WITH MULTIPLE CONFIGURATION SCREENS

(71) Applicant: SHARP KABUSHIKI KAISHA, Sakai, Osaka (JP)

(72) Inventors: Takashi Sawano, Sakai (JP); Mayuko Yoshida, Sakai (JP); Kumiko Ogino, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/160,745

(22) Filed: Oct. 15, 2018

(65) Prior Publication Data

US 2019/0116280 A1 Apr. 18, 2019

(30) Foreign Application Priority Data

Oct. 17, 2017 (JP) .................. 2017-200773

(51) Int. Cl.
*H04N 1/00* (2006.01)

(52) U.S. Cl.
CPC ..... *H04N 1/00435* (2013.01); *H04N 1/00411* (2013.01)

(58) Field of Classification Search
None
See application file for complete search history.

(56) References Cited

U.S. PATENT DOCUMENTS

| 10,063,721 | B2 | 8/2018 | Yoshida | |
|---|---|---|---|---|
| 2014/0333951 | A1* | 11/2014 | Yoshida | ................. G03G 15/50 358/1.13 |
| 2017/0322759 | A1* | 11/2017 | Tokuchi | ............... H04N 1/4433 |

FOREIGN PATENT DOCUMENTS

JP 2009-196180 A 9/2009

* cited by examiner

*Primary Examiner* — Andrew H Lam
(74) *Attorney, Agent, or Firm* — ScienBiziP, P.C.

(57) ABSTRACT

An information processing system according to the present disclosure has, for example, a copy function. In the copy function, a plurality of configuration screens including a paper selection screen are displayed one at a time in a predetermined order as a configuration target screen in a main area on a display surface of a display. In a case where a subsequent configuration screen is present when any configuration screen is displayed as the configuration target screen in the main area, a left end part of the subsequent configuration screen is displayed in a marginal part on a right side of the main area. Furthermore, in a case where configuration on the current configuration target screen is complete by a user operation, an appropriate modification is made on the left end part of the subsequent configuration screen. Accordingly, an operability of an information processing system having the copy function is improved.

13 Claims, 51 Drawing Sheets

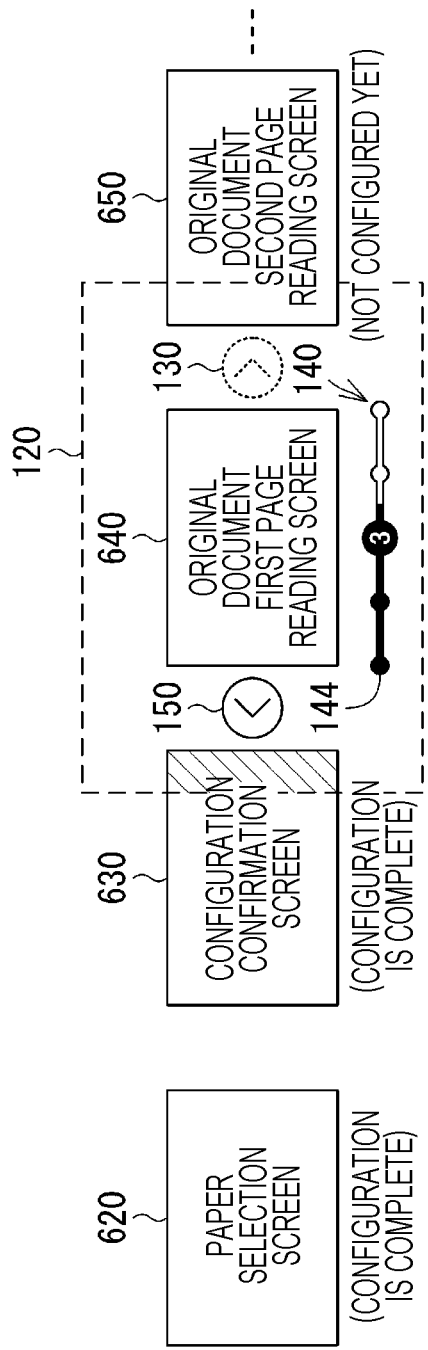
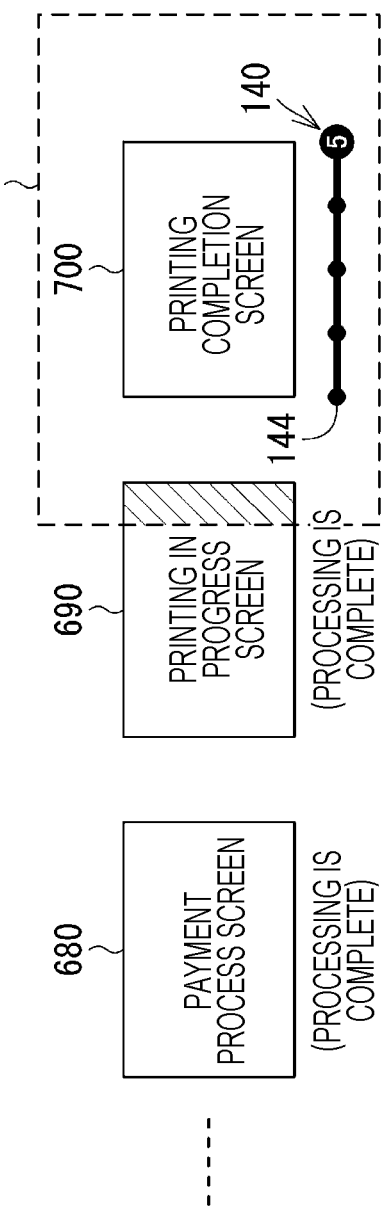

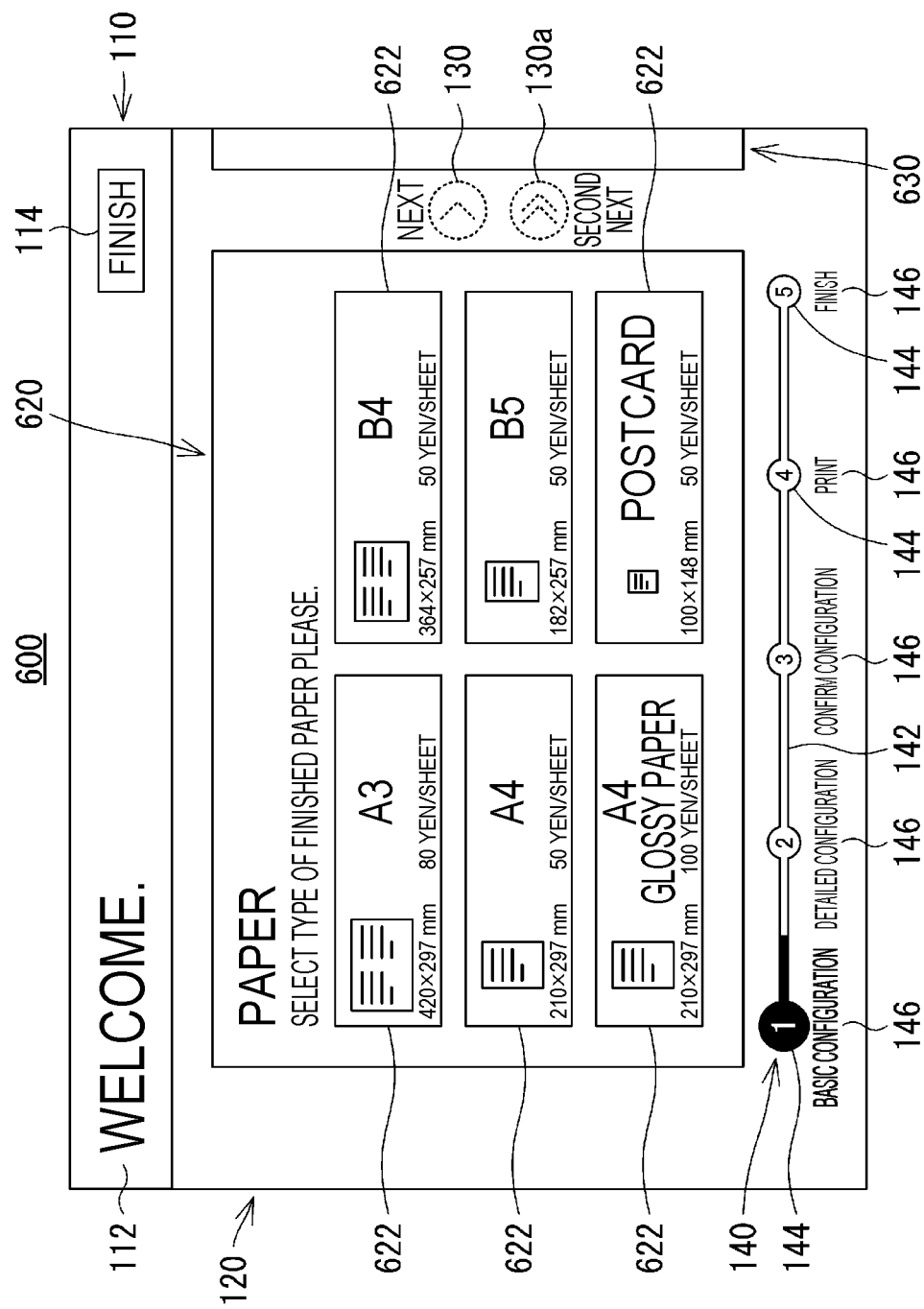

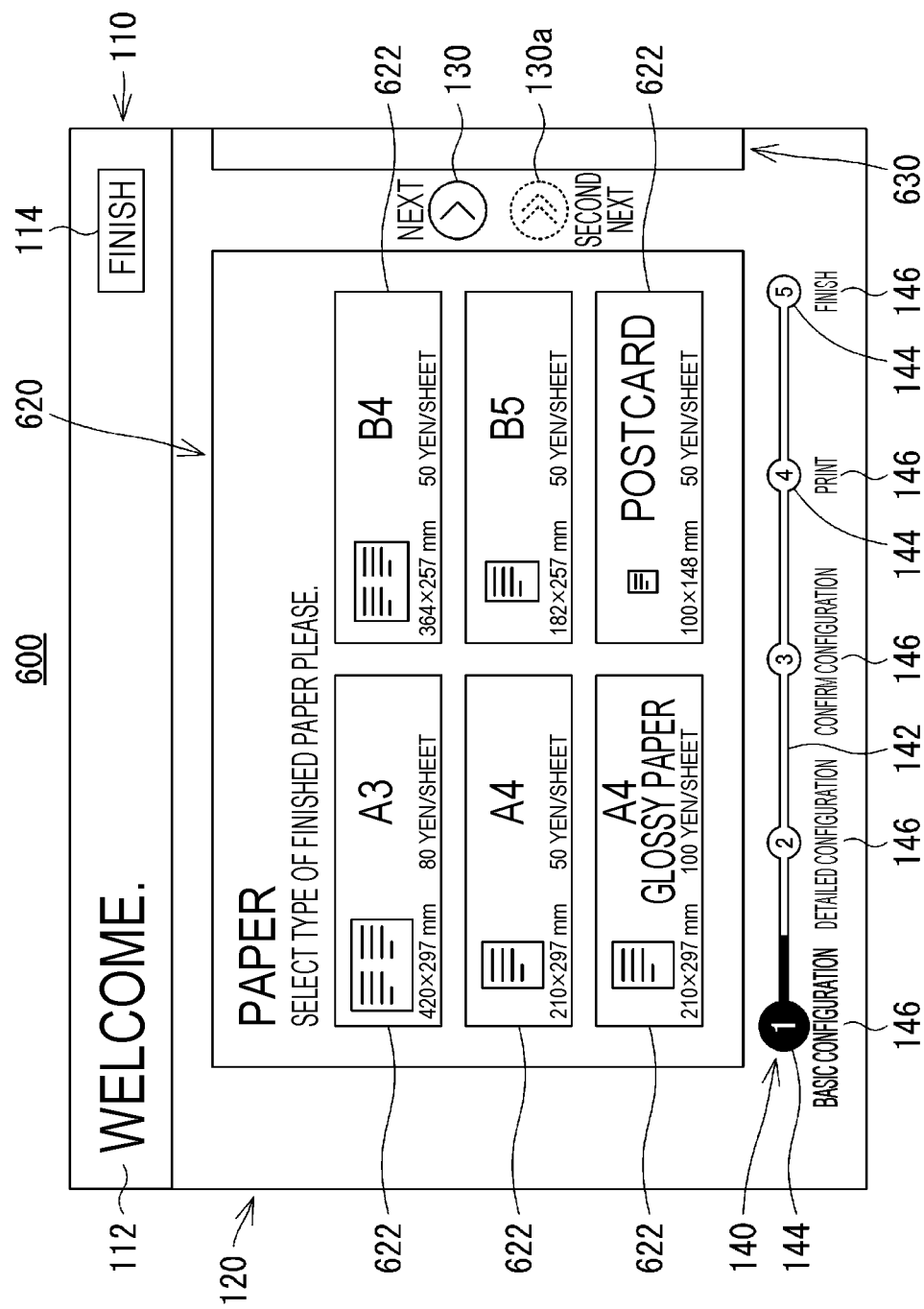

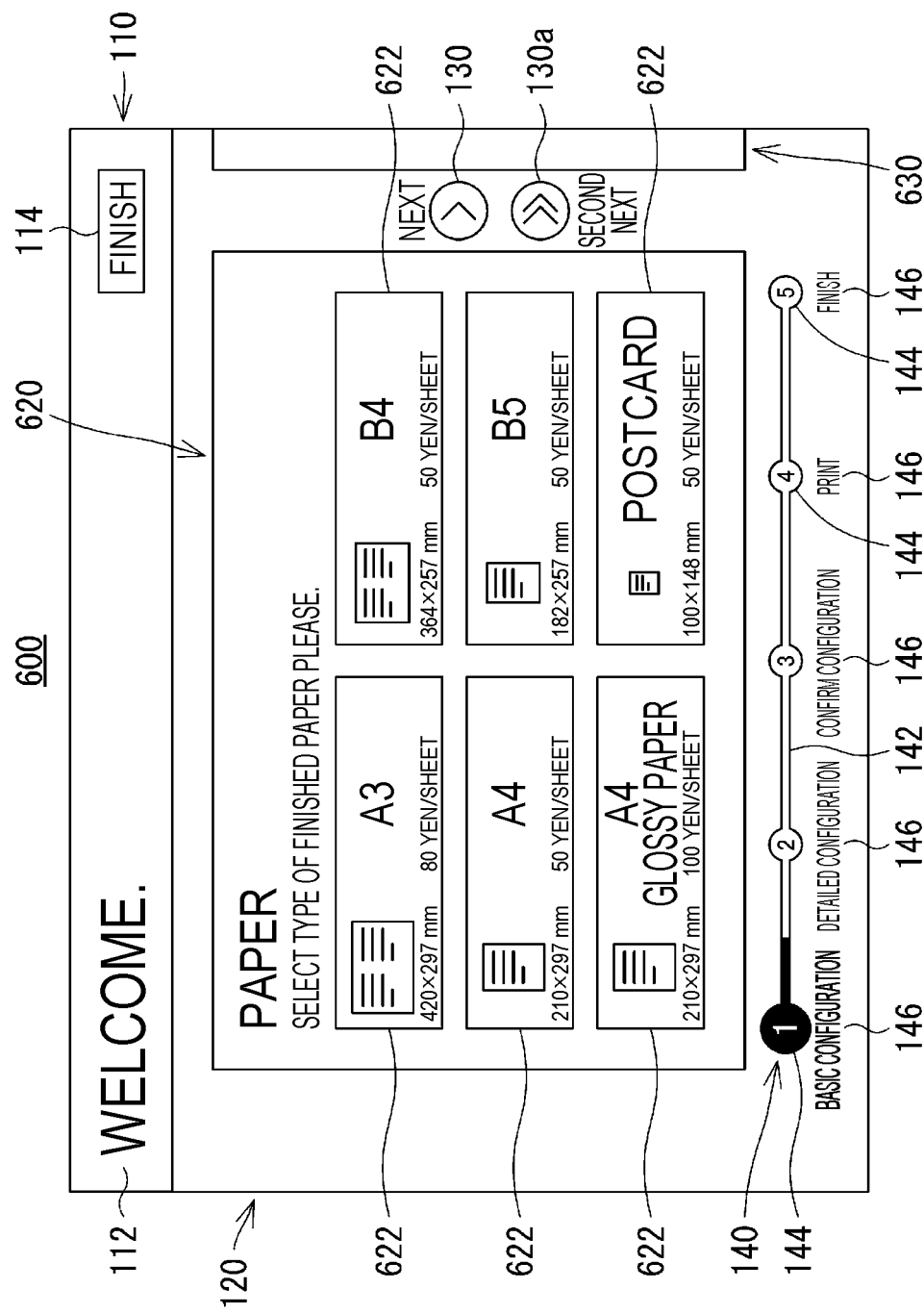

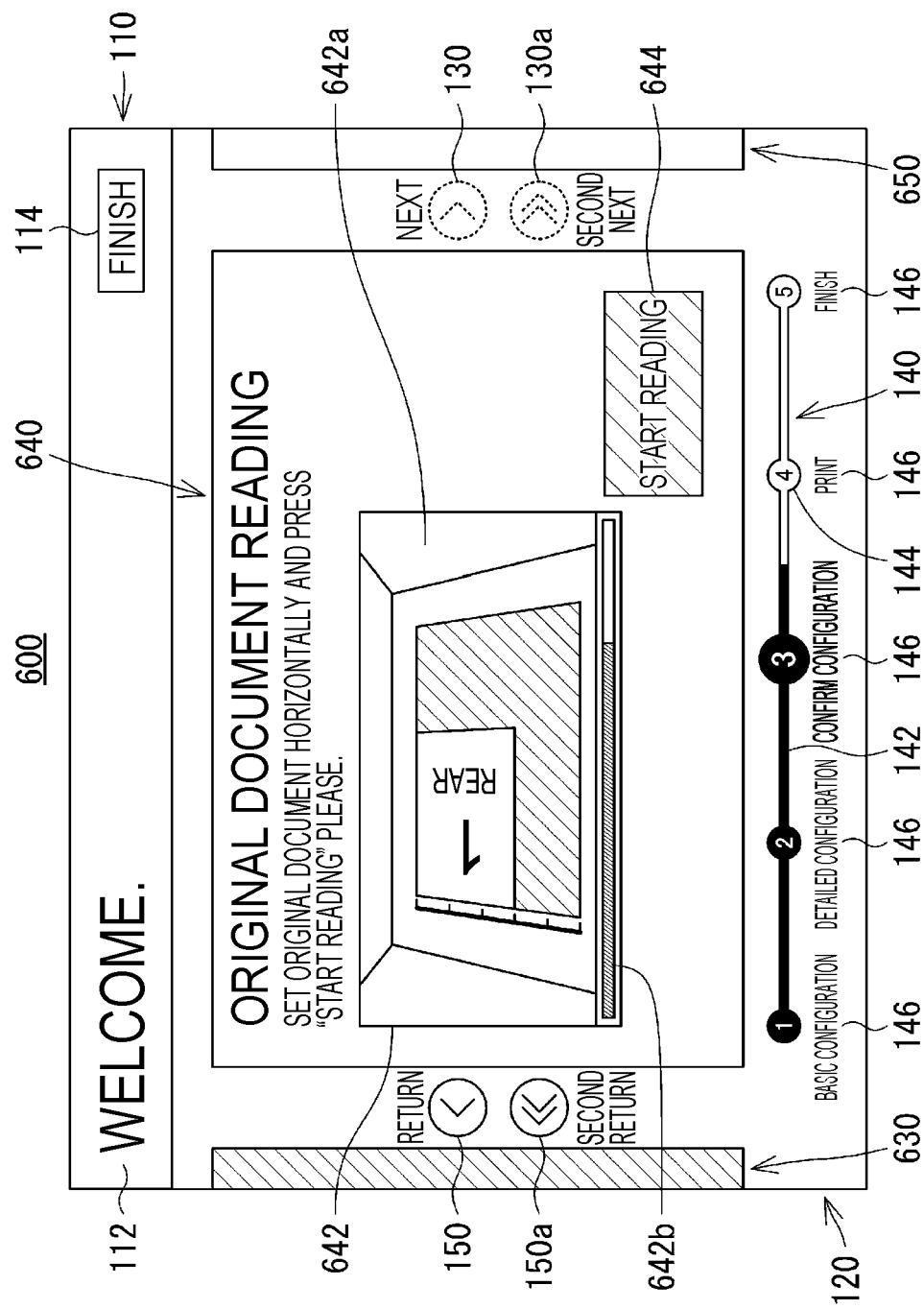

INFORMATION PROCESSING APPARATUS WITH MULTIPLE CONFIGURATION SCREENS

BACKGROUND

1. Field

The present disclosure relates to an information processing apparatus, an information processing program, an information processing method, and an information processing system and particularly, relates to an information processing apparatus including a display unit including a display surface and an operation receiving unit receiving a user operation, an information processing program, an information processing method, and an information processing system related to the information processing apparatus.

2. Description of the Related Art

One example of such an information processing apparatus is disclosed in Japanese Unexamined Patent Application Publication No. 2009-196180. Japanese Unexamined Patent Application Publication No. 2009-196180 discloses one example in which the information processing apparatus is applied to a multifunction peripheral including a liquid crystal display (LCD) as a display unit and a touch panel as an operation receiving unit disposed on a display surface of the liquid crystal display. According to the multifunction peripheral disclosed in Japanese Unexamined Patent Application Publication No. 2009-196180, for example, a printing process can be performed based on a document file that is stored in a hard disk drive (HDD) of the multifunction peripheral. In this case, a plurality of configuration screens (user interface screens) including a menu screen, a stored document selection screen, a document list display screen, and a printing configuration screen are displayed one at a time in this order on the display surface of the liquid crystal display. By performing an appropriate configuration operation as a user operation on each configuration screen, the printing process is performed under a condition corresponding to the content of the configuration operation (refer to [0055] to [0071], FIG. 4, and FIG. 11 to FIG. 18 particularly).

In the multifunction peripheral disclosed in Japanese Unexamined Patent Application Publication No. 2009-196180, while an appropriate configuration operation is performed on each configuration screen as described above, the user who performs the configuration operation may not recognize whether or not the configuration operation still continues. This tendency is noticeable in a case where the user is not accustomed to the operation of the multifunction peripheral, for example, in a case where the multifunction peripheral is installed in an environment such as a supermarket or a convenience store where the multifunction peripheral is operated by a large unspecified number of users. Therefore, for example, in a case where the user can recognize whether or not the configuration operation still continues, operability is expected to be improved.

SUMMARY

It is desirable to provide an information processing apparatus, an information processing method, an information processing program, and an information processing system that can improve an operability.

According to a first aspect of the present disclosure, there is provided an information processing apparatus including a display unit, a screen switching unit, an operation receiving unit, an information processing unit, and a subsequent sequence screen adding unit. The display unit includes a display surface. The screen switching unit displays a plurality of configuration screens one at a time in a predetermined order as a configuration target screen on the display surface of the display unit. The operation receiving unit receives a user operation. The user operation includes a configuration operation which is performed depending on the configuration target screen when each of the configuration screens is displayed as the configuration target screen on the display surface of the display unit. The information processing unit performs predetermined information processing under a condition corresponding to contents of the configuration operations by receiving all configuration operations related to each of the configuration screens by the operation receiving unit. The subsequent sequence screen adding unit displays a part of a subsequent sequence screen on the display surface of the display unit when each configuration screen other than a final screen is displayed as the configuration target screen on the display surface of the display unit. The final screen is the final configuration screen in the order among the configuration screens, and the subsequent sequence screen is the configuration screen in a subsequent sequence of the configuration target screen in the order.

According to a second aspect of the present disclosure, there is provided an information processing program for an information processing apparatus. The program causes a computer of the information processing apparatus to execute a screen switching procedure, an information processing procedure, and a subsequent sequence screen adding procedure. The information processing apparatus includes a display unit that includes a display surface. In the screen switching procedure, a plurality of configuration screens are displayed one at a time in a predetermined order as a configuration target screen on the display surface of the display unit. In addition, the information processing apparatus includes an operation receiving unit that receives a user operation. The user operation received by the operation receiving unit includes a configuration operation which is performed depending on the configuration target screen when each of the configuration screens is displayed as the configuration target screen on the display surface of the display unit. In the information processing procedure, predetermined information processing is performed under a condition corresponding to contents of the configuration operations by receiving all configuration operations related to each of the configuration screens by the operation receiving unit. Furthermore, in the subsequent sequence screen adding procedure, a part of a subsequent sequence screen is displayed on the display surface of the display unit when each configuration screen other than a final screen is displayed as the configuration target screen on the display surface of the display unit. The final screen is the final configuration screen in the order among the configuration screens, and the subsequent sequence screen is the configuration screen in a subsequent sequence of the configuration target screen in the order.

According to a third aspect of the present disclosure, there is provided an information processing method in an information processing apparatus. The method includes screen switching, information processing, and subsequent sequence screen adding. The information processing apparatus includes a display unit that includes a display surface. In the screen switching, a plurality of configuration screens are displayed one at a time in a predetermined order as a configuration target screen on the display surface of the display unit. In addition, the information processing apparatus includes an operation receiving unit that receives a user operation. The user operation received by the operation receiving unit includes a configuration operation which is performed depending on the configuration target screen when each of the configuration screens is displayed as the configuration target screen on the display surface of the display unit. In the information processing, predetermined information processing is performed under a condition corresponding to contents of the configuration operations by receiving all configuration operations related to each of the configuration screens by the operation receiving unit. Furthermore, in the subsequent sequence screen adding, a part of a subsequent sequence screen is displayed on the display surface of the display unit when each configuration screen other than a final screen is displayed as the configuration target screen on the display surface of the display unit. The final screen is the final configuration screen in the order among the configuration screens, and the subsequent sequence screen is the configuration screen in a subsequent sequence of the configuration target screen in the order.

According to a fourth aspect of the present disclosure, there is provided an information processing system including the information processing apparatus according to the first aspect, and an image forming apparatus. The image forming apparatus executes an image forming process of forming an image on a sheet. The predetermined information processing executed by the information processing unit included in the information processing apparatus includes an image forming instruction process of instructing the image forming apparatus to execute the image forming process.

BRIEF DESCRIPTION OF THE DRAWINGS

FIG. 38 is still another diagram conceptually illustrating the scheme of screen switching control;

FIG. 39 is still another diagram conceptually illustrating the scheme of screen switching control;

FIG. 52 is a diagram illustrating one example of a copy reception screen including a paper selection screen according to a third embodiment of the present disclosure;

FIG. 53 is a diagram illustrating one example of another state of the copy reception screen including the paper selection screen;

FIG. 54 is a diagram illustrating one example of still another state of the copy reception screen including the paper selection screen; and FIG. 55 is a diagram illustrating one example of the copy reception screen including an original document first page reading screen.

DESCRIPTION OF THE EMBODIMENTS

First Embodiment

Figure 1:
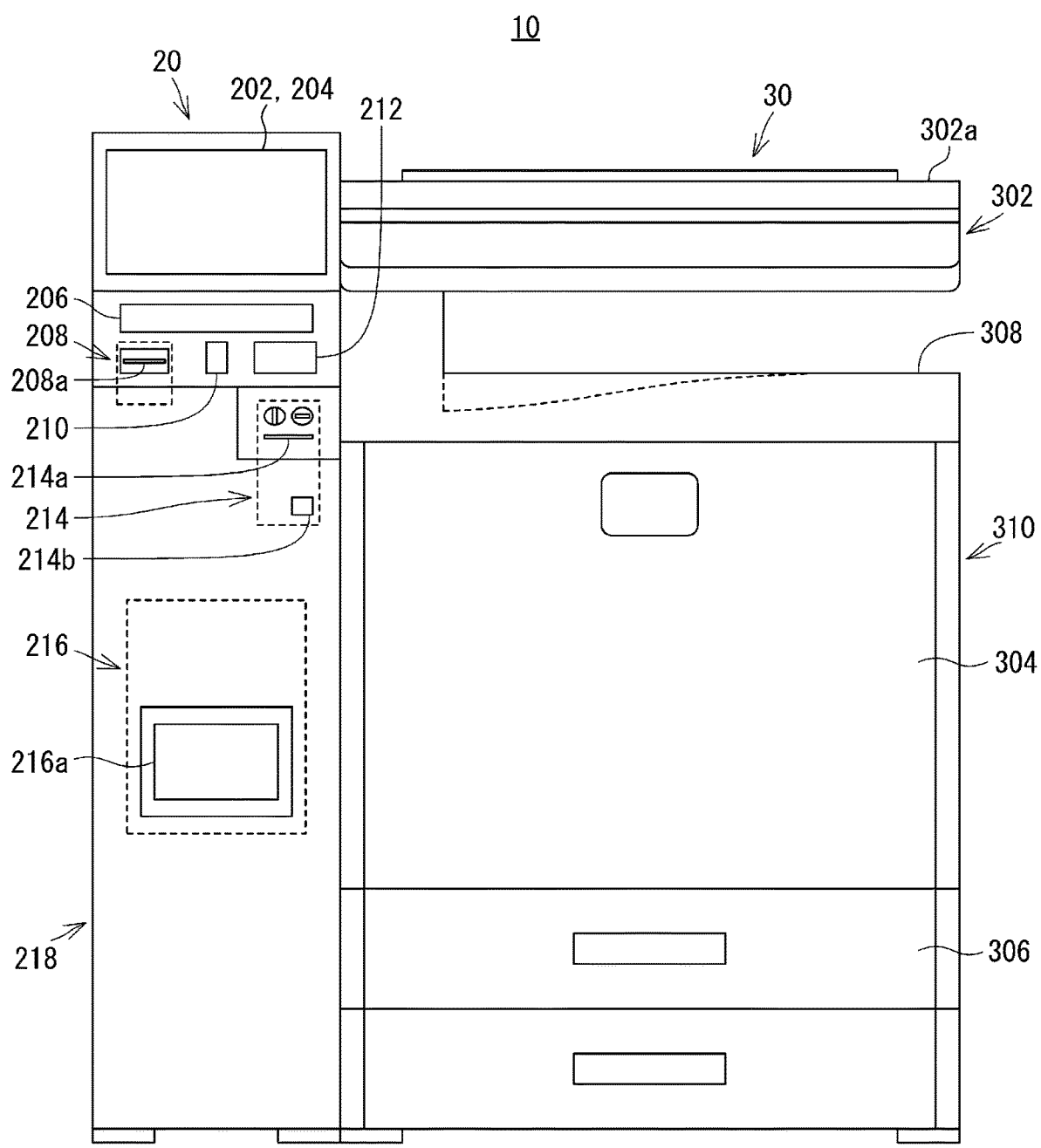
FIG. 1 is an overall exterior diagram of an information processing system according to a first embodiment of the present disclosure.

FIG. 1 is an exterior diagram of an information processing system 10 according to a first embodiment of the present disclosure. The information processing system 10 includes an information processing apparatus 20 and an image forming apparatus 30. In the following description, upward and downward directions will be defined based on a state where the information processing system 10 is installed and usable as illustrated in FIG. 1. Forward and rearward directions will be defined by regarding the surface facing the reader in FIG. 1 as the front surface of the information processing system 10. The front side of the information processing system 10 corresponds to a position where a user, not illustrated, who uses the information processing system 10 stands. The left and right directions of the information processing system 10 will be defined by seeing the information processing system 10 from its front side which is the position where the user stands.

The information processing apparatus 20 is, for example, an MMK. The information processing apparatus 20 has functions of providing the user with various services such as purchase of a ticket, payment of a utility bill, and download of digital contents. In addition, the information processing apparatus 20 can provide the user with predetermined services such as a copy service, a printing service, a scan service, and a fax service described below in cooperation with the image forming apparatus 30.

The information processing apparatus 20 includes an apparatus body 218 that includes a display 204 equipped with a touch panel 202, a recording medium connecting unit 206, a paper piece printer 208, a symbol reading unit 210, a short-range communication unit 212, a money processing unit 214, and a photograph printer 216.

The display 204 equipped with the touch panel 202 is disposed in the upper part of the apparatus body 218. The touch panel 202 is, for example, a capacitive touch panel and is one example of an operation receiving unit according to the present disclosure. The display 204 is, for example, a liquid crystal display (LCD) and is one example of a display unit according to the present disclosure. The touch panel 202 is disposed on a rectangular display surface of the display 204. The touch panel 202 may be not only a capacitive touch panel but also any touch panel such as an electromagnetic induction touch panel, a resistive film touch panel, or an infrared touch panel. In addition, the display 204 may be not only a liquid crystal display but also an organic electroluminescent (EL) display or the like. Furthermore, instead of the display 204 equipped with the touch panel 202, a touch panel display in which the touch panel 202 and the display 204 are integrated may be used.

The recording medium connecting unit 206 includes a mount unit, not illustrated, such as a disc drive and a memory slot for mounting various information recording media. The information recording media referred hereto include optical discs such as a compact disc-recordable (CD-R), a DVD-recordable (DVD-R), and a Blu-ray Disc (registered trademark)-recordable (BD-R). Other information recording media include flash memories such as a universal serial bus (USB) memory, a secure digital (SD) memory card, and a Memory Stick (registered trademark). Optical discs are mounted in the disc drive, and flash memories are mounted in the memory slot.

The paper piece printer 208 is, for example, a thermal (heat sensitive) printer or a dot impact printer and issues a paper piece, not illustrated, on which an image of a receipt, a journal, a coupon, or the like is printed. Specifically, the paper piece printer 208 prints various character strings, images, code patterns (for example, barcodes), and the like on a paper roll and discharges a printed paper piece from a paper discharging unit 208a.

The symbol reading unit 210 includes, for example, a laser scanner or a camera, not illustrated, and can read symbols attached to a product, a card, a receipt, or the like, not illustrated, using the laser scanner or the camera. In addition, the symbol reading unit 210 can read symbols displayed on a display surface of a user terminal (portable terminal), not illustrated, such as a smartphone. The symbols that can be read by the symbol reading unit 210 include a one-dimensional code (barcode) and a two-dimensional code such as a Quick Response (QR) code (registered trademark).

The short-range communication unit 212 performs wireless, contactless data communication with a communication target, not illustrated, such as an IC card or the user terminal in accordance with a wireless communication standard such as ISO/IEC 18092 (so-called near field communication (NFC)). The distance in which the short-range communication unit 212 can communicate with the communication target is approximately a few cm to a few tens of cm. The short-range communication unit 212 outputs a so-called read instruction to the communication target by transmitting a signal that instructs the communication target to read data stored in the communication target. The communication target transmits the data corresponding to the read instruction to the short-range communication unit 212 in response to the read instruction. In addition, the short-range communication unit 212 outputs a so-called write instruction to the communication target by transmitting a signal that instructs the communication target to write specific data in the communication target. In addition, the short-range communication unit 212 transmits the specific data corresponding to the write instruction, so-called write data, to the communication target. The communication target stores the write data corresponding to the write instruction in its storage unit in accordance with the write instruction.

The money processing unit 214 includes a money accepting unit 214a and a coin return port 214b. The money accepting unit 214a includes a coin accepting port, a banknote accepting port, and a change return lever and, for example, is disposed below the short-range communication unit 212. Each of coins accepted from the coin accepting port and banknotes accepted from the banknote accepting port is sorted by its type (amount) and accommodated in a money storage unit, not illustrated. The money storage unit includes a coin storage unit and a banknote storage unit. An accepted amount of money is calculated depending on the type and the number of coins accommodated in the coin storage unit and the type and the number of banknotes accommodated in the banknote storage unit. In a case where a predetermined service is executed in the information processing apparatus 20, an expense corresponding to the content of the service is subtracted from the accepted amount of money, and a balance after subtraction is calculated. In a case where the change return lever is operated, coins or banknotes are returned depending on the balance of the accepted amount of money. Coins are returned from the coin return port 214b, and banknotes are returned from the banknote accepting port. For example, the coin return port 214b is disposed below the money accepting unit 214a.

The photograph printer 216 is, for example, a sublimation printer or an inkjet printer and forms, that is, prints, an image on a photograph sheet, not illustrated. The sheet after printing by the photograph printer 216 is discharged to a discharging unit 216a. Data of the image printed by the photograph printer 216 includes image data stored in a recording medium connected to the recording medium connecting unit 206, image data transmitted from an external computer, not illustrated, and the like. In addition, the size of the photograph sheet includes an L size, a postcard size, a 2L size, and the like.

Figure 2:
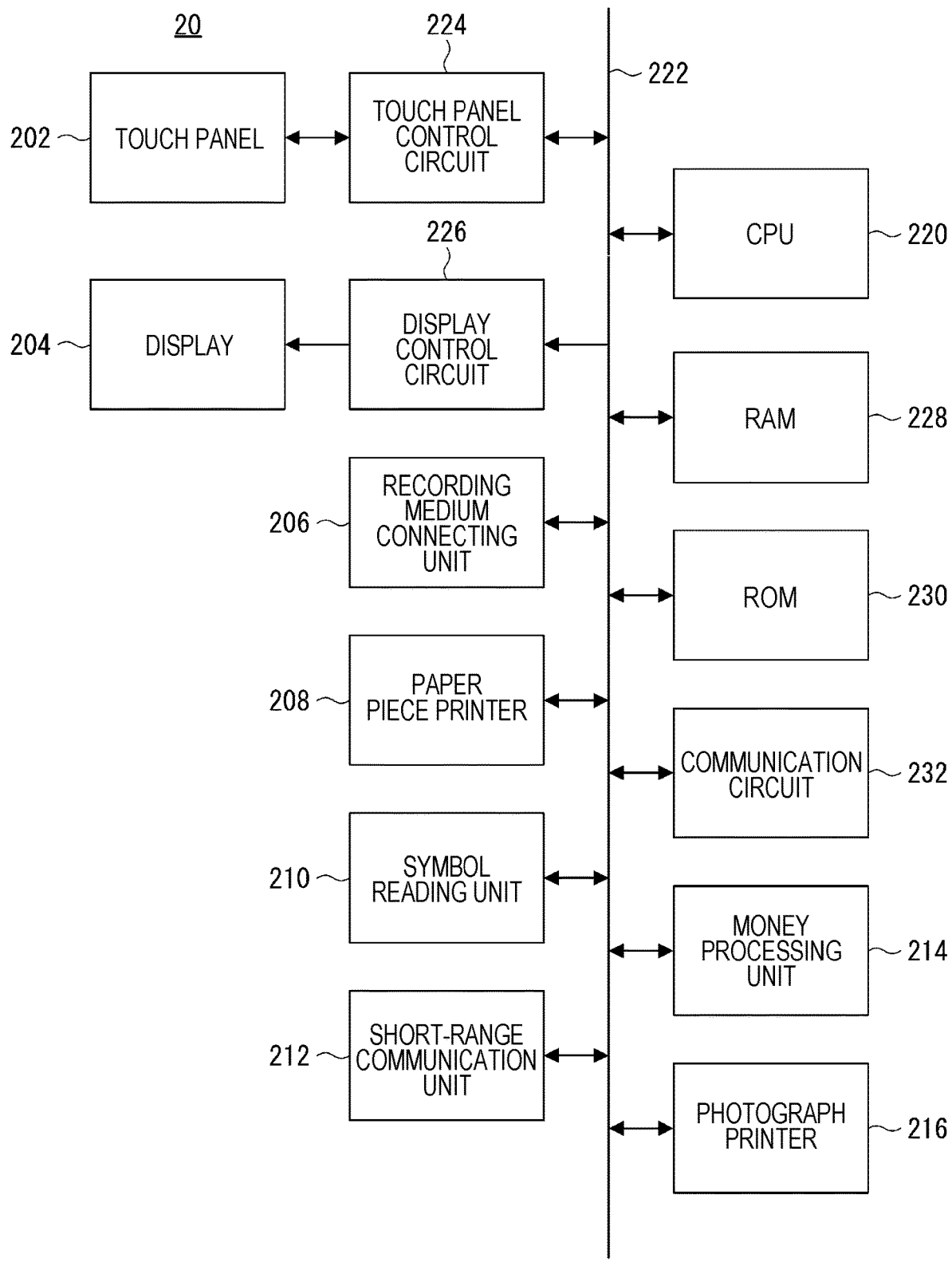
FIG. 2 is a block diagram illustrating an electrical configuration of an information processing apparatus in FIG. 1.

FIG. 2 is a block diagram illustrating an electrical configuration of the information processing apparatus 20. As illustrated in FIG. 2, the information processing apparatus 20 includes a central processing unit (CPU) 220. The recording medium connecting unit 206, the paper piece printer 208, the symbol reading unit 210, the short-range communication unit 212, the money processing unit 214, and the photograph printer 216 are connected to the CPU 220 through a bus 222. In addition, a touch panel control circuit 224 and a display control circuit 226 are connected to the CPU 220 through the bus 222. The touch panel 202 is connected to the touch panel control circuit 224, and the display 204 is connected to the display control circuit 226. Furthermore, a random access memory (RAM) 228, a read only memory (ROM) 230, and a communication circuit 232 are connected to the CPU 220 through the bus 222.

The CPU 220 controls the whole information processing apparatus 20. The RAM 228 is used as a work area and a buffer area of the CPU 220. The ROM 230 stores an information processing program 520 described below. In addition, the ROM 230 stores default values of various kinds of information such as information related to an advertisement switching period Ta described below. The RAM 228 and the ROM 230 are basic storage devices of the information processing apparatus 20. Besides, an auxiliary storage device such as a flash memory or an Electrically Erasable Programmable Read-Only Memory (EEPROM; registered trademark) may be disposed.

The touch panel control circuit 224 applies a drive voltage and the like for the touch panel 202 to the touch panel 202. In addition, the touch panel control circuit 224 detects a touch operation in an effective touch area of the touch panel 202 and inputs touch coordinate data representing the position of the touch into the CPU 220 in a time-series manner.

The display control circuit 226 includes a graphics processing unit (GPU) and a video RAM (VRAM). In accordance with an instruction from the CPU 220, the GPU generates display image data for displaying various images on the display 204 in the VRAM using image generation data 542, described below, stored in the RAM 228. The display image data generated in the VRAM is input into the display 204.

The communication circuit 232 is a circuit that connects to a network, not illustrated, such as the Internet. The communication circuit 232 is a wired communication circuit or a wireless communication circuit and performs bidirectional communication with an external computer, not illustrated, such as a server through the network in accordance with an instruction from the CPU 220. In addition, the communication circuit 232 can perform bidirectional communication with the image forming apparatus 30, more precisely, with a communication circuit 320, described below, on the image forming apparatus 30 side. Furthermore, the communication circuit 232 can perform bidirectional communication directly with the user terminal and particularly, can perform the bidirectional communication using wireless communication such as infrared communication, Wi-Fi (registered trademark) communication, or Bluetooth (registered trademark) communication.

Returning to FIG. 1, the image forming apparatus 30 is a multifunction peripheral that has a copy function, a printer function, a scanner function, a facsimile function, and the like. The image forming apparatus 30 includes an apparatus body 310 that includes an image reading unit 302, an image forming unit 304, a paper feeding device 306, and a paper discharging tray 308. The image forming apparatus 30 is installed in the vicinity of the information processing apparatus 20 and, for example, is disposed on the right side of the information processing apparatus 20.

The image reading unit 302 includes an original document setting table, not illustrated, that is formed of a transparent material such as glass, and is incorporated in the upper part of the apparatus body 310. In addition, an original document pressing cover 302a is openably and closably attached above the original document setting table through a hinge or the like. The image reading unit 302 performs an image reading process of reading an image of an original document, not illustrated, set on the original document setting table. In order to do so, the image reading unit 302 includes a light source, a plurality of mirrors, an image forming lens, a line sensor, and the like, not illustrated. According to the image reading unit 302, the surface of the original document is exposed to light by the light source, and reflective light that is reflected from the surface of the original document is guided to the image forming lens by the plurality of mirrors. The reflective light guided to the image forming lens is formed as an image on a light-receiving surface of the line sensor by the image forming lens. The line sensor detects the intensity of the reflective light formed as an image on the light-receiving surface and generates image data representing a detected value of each pixel of the line sensor. A charge coupled device (CCD), a contact image sensor (CIS), or the like is used as the line sensor.

The image forming unit 304 is disposed below the image reading unit 302 and is incorporated in the apparatus body 310. The image forming unit 304 performs an image forming process of forming an image using electrophotography on a sheet (paper) as an image recording medium, not illustrated, transported from the paper feeding device 306. In order to do so, the image forming unit 304 includes a photoreceptor drum, a charging device, a light exposure device, a developing device, a transfer device, a fixing device, and the like, not illustrated. The sheet after the image is formed by the image forming unit 304, that is, the printed sheet is discharged to the paper discharging tray 308. For example, the paper discharging tray 308 is disposed between the image reading unit 302 and the image forming unit 304. Image data that is used in the image forming process by the image forming unit 304 includes image data read by the image reading unit 302, image data transmitted from the information processing apparatus 20, image data transmitted from the external computer, and the like. In addition, the sheet as the image recording medium may be not only paper such as plain paper and thick paper but also a sheet other than paper such as an OHP film. The image forming unit 304 may be not only an electrophotographic image forming unit but also an inkjet image forming unit to perform the image forming process.

Figure 3:
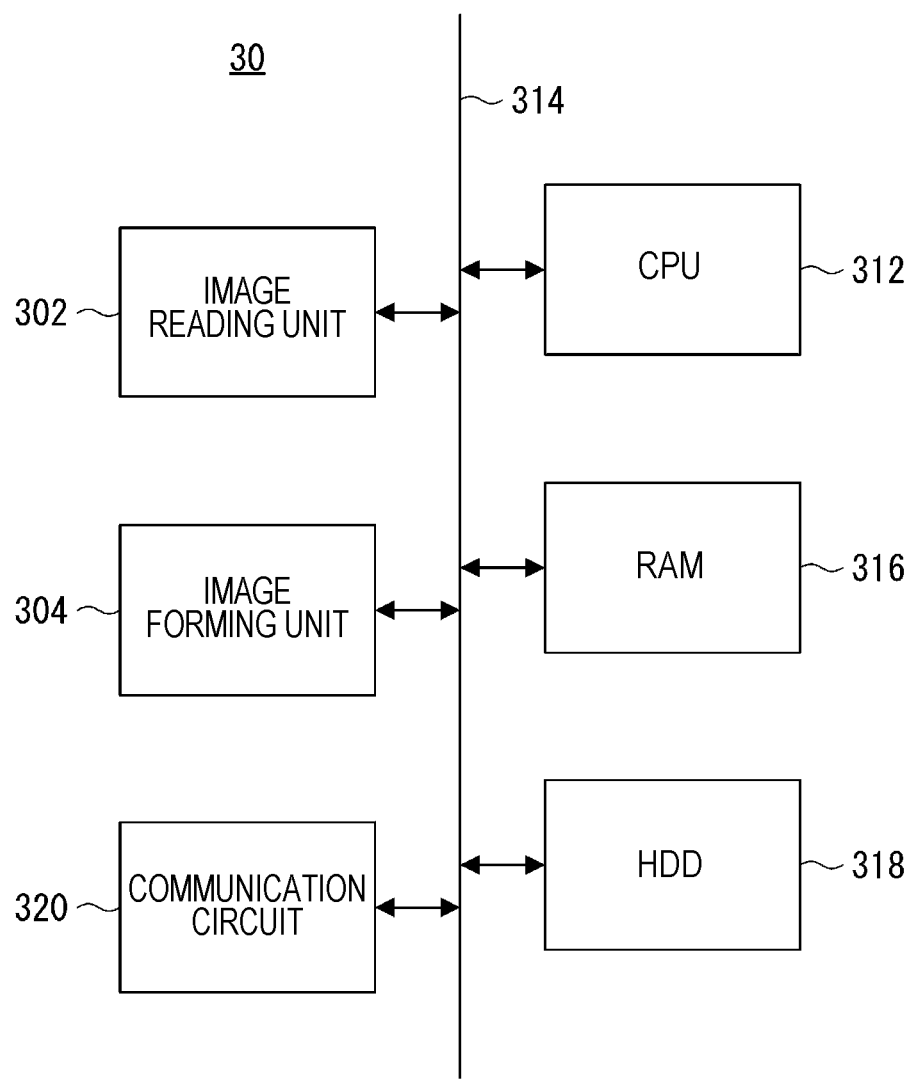
FIG. 3 is a block diagram illustrating an electrical configuration of an image forming apparatus in FIG. 1.

FIG. 3 is a block diagram illustrating an electrical configuration of the image forming apparatus 30. As illustrated in FIG. 3, the image forming apparatus 30 includes a CPU 312. The image reading unit 302 and the image forming unit 304 are connected to the CPU 312 through a bus 314. In addition, a RAM 316, a hard disk drive (HDD) 318, and the communication circuit 320 are connected to the CPU 312 through the bus 314.

The CPU 312 controls the whole image forming apparatus 30. The RAM 316 is a basic storage device of the image forming apparatus 30 and is used as a work area and a buffer area of the CPU 312.

The hard disk drive 318 is an auxiliary storage device of the image forming apparatus 30 and stores, for example, a control program in order for the CPU 312 to control the operation of the image forming apparatus 30. Instead of the hard disk drive 318 or in addition to the hard disk drive 318, an auxiliary storage device such as a solid state drive (SSD), a flash memory, or an EEPROM may be disposed.

The communication circuit 320 is a circuit that performs bidirectional communication with the communication circuit 232 on the information processing apparatus 20 side. The bidirectional communication performed between the communication circuit 320 on the image forming apparatus 30 side and the communication circuit 232 on the information processing apparatus 20 side may be performed in a wired manner or by wireless communication.

As described above, the information processing system 10 according to the first embodiment includes the information processing apparatus 20 and the image forming apparatus 30. Particularly, the information processing apparatus 20 is, for example, an MMK. Characteristics of the MMK are such that the MMK has functions of providing various services and is used by a large unspecified number of users. Thus, in the MMK, it is desirable to present information related to the functions of the MMK to the user.

Figure 4:
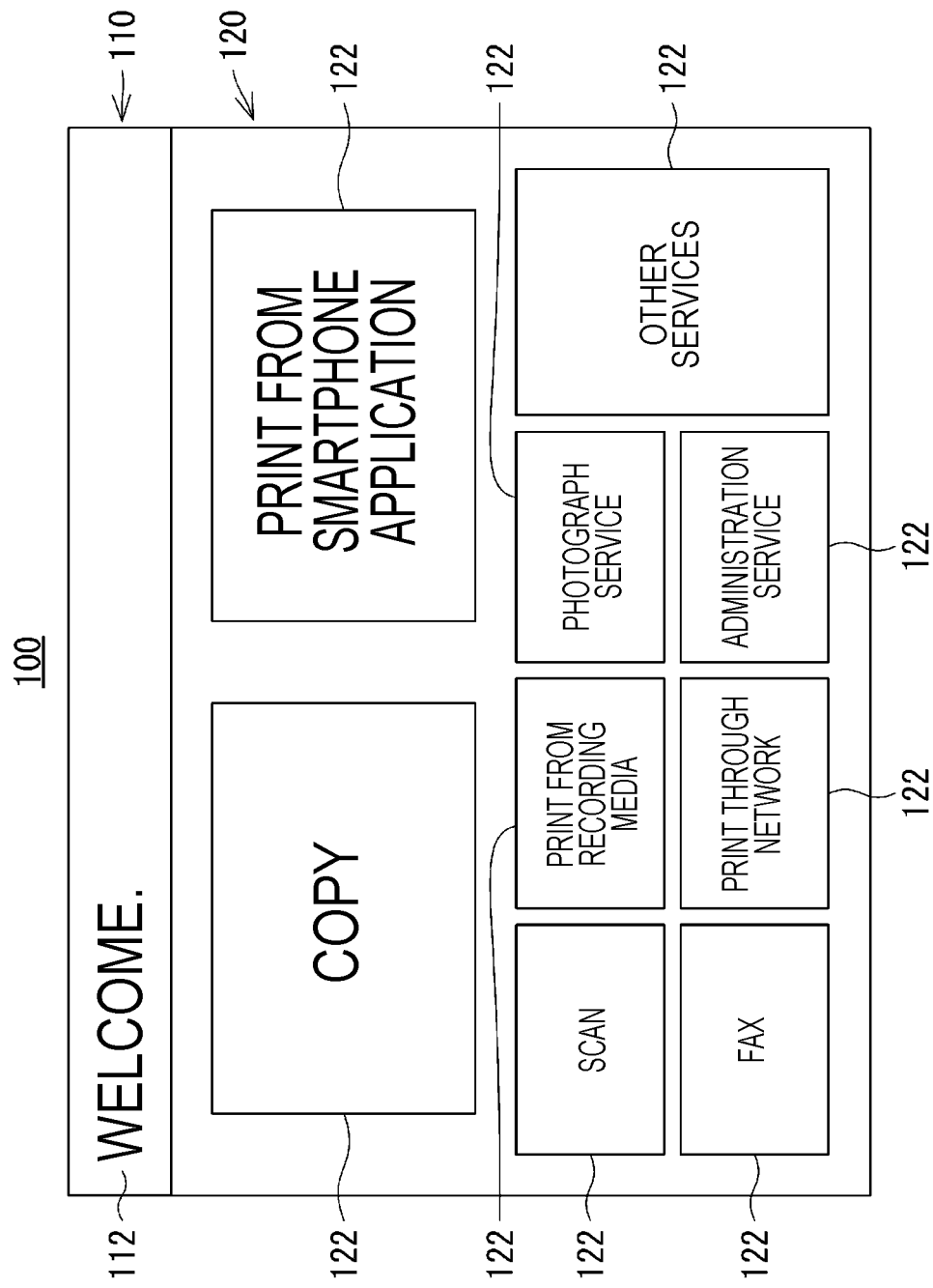
FIG. 4 is a diagram illustrating one example of a home screen displayed on a display of the information processing apparatus.

Therefore, according to the information processing system 10 according to the first embodiment, a home screen (or may be referred to as a "menu screen" or a "portal screen") 100 as illustrated in FIG. 4 is displayed on the display surface of the display 204 after the information processing system 10 is started. The home screen 100 is configured with a title bar area 110 and a main area 120. The title bar area 110 has a horizontally elongated rectangular shape and is positioned in the upper part of the home screen 100. The main area 120 has a rectangular shape and is positioned below the title bar area 110. A title bar 112 in which a character string such as "welcome" representing hospitality is shown is displayed in the title bar area 110. Buttons 122, 122, . . . as a plurality of corresponding function operators that can receive user operations are displayed in the main area 120. Each of the buttons 122, 122, . . . corresponds to a function of the information processing system 10. In addition, an appropriate character string that represents the corresponding function is shown on each of the buttons 122, 122, . . . .

Each of the buttons 122, 122, . . . is displayed depending on its corresponding function, particularly, depending on the frequency of use of the function. Specifically, the button 122 corresponding to a function that is expected to be used at a high frequency is displayed such that the button 122 stands out. For example, the copy function is expected to be used at the highest frequency among the functions of the information processing system 10. Therefore, the button 122 (a character string "copy" is attached) corresponding to the copy function is displayed in a relatively large size and is displayed at a position in the upper part of the main area 120 where the button 122 relatively stands out. Meanwhile, for example, the scanner function is expected to have a lower frequency of use than the copy function. Therefore, the button 122 (a character string "scan" is attached) corresponding to the scanner function is displayed in a smaller size than the button 122 corresponding to the copy function and is displayed at a position below the button 122 corresponding to the copy function, that is, displayed such that the button 122 is not easily noticed.

In addition, the button 122 in which a character string "other services" is shown corresponds to a function related to a plurality of services such as services providing various contents including a download service for digital contents, and services providing recommended information related to the digital contents. This function is expected to be used less frequently than the copy function but at a relatively high frequency. Therefore, the button 122 (a character string "other services" is attached) corresponding to the function is displayed in a relatively large size and is displayed at a position in the lower part of the main area 120 where the button 122 relatively does not stand out.

Each of the buttons 122, 122, . . . may be characterized by not only its size and its display position but also other states such as shape and color. In addition, each of the buttons 122, 122, . . . may be displayed depending on not only the frequency of use of its corresponding function but also, for example, a charge for using the function, that is, an appropriate attribute of the function.

The home screen 100 is one example of a function selection screen for presenting the functions of the information processing system 10 to the user and causing the user to select a function that the user desires for use. Therefore, the user can recognize the functions of the information processing system 10 from the home screen 100. The user selects any function desired for use from the home screen 100.

The home screen 100 is a so-called static image. Therefore, in a case where a state in which the home screen 100 is displayed continues, that is, in a case where a state in which the information processing system 10 is not used by the user continues, the display surface of the display 204 may experience image sticking (more precisely, an afterimage may occur in the case of a liquid crystal display). Thus, it is desirable to protect the display surface of the display 204 from image sticking.

Figure 5:
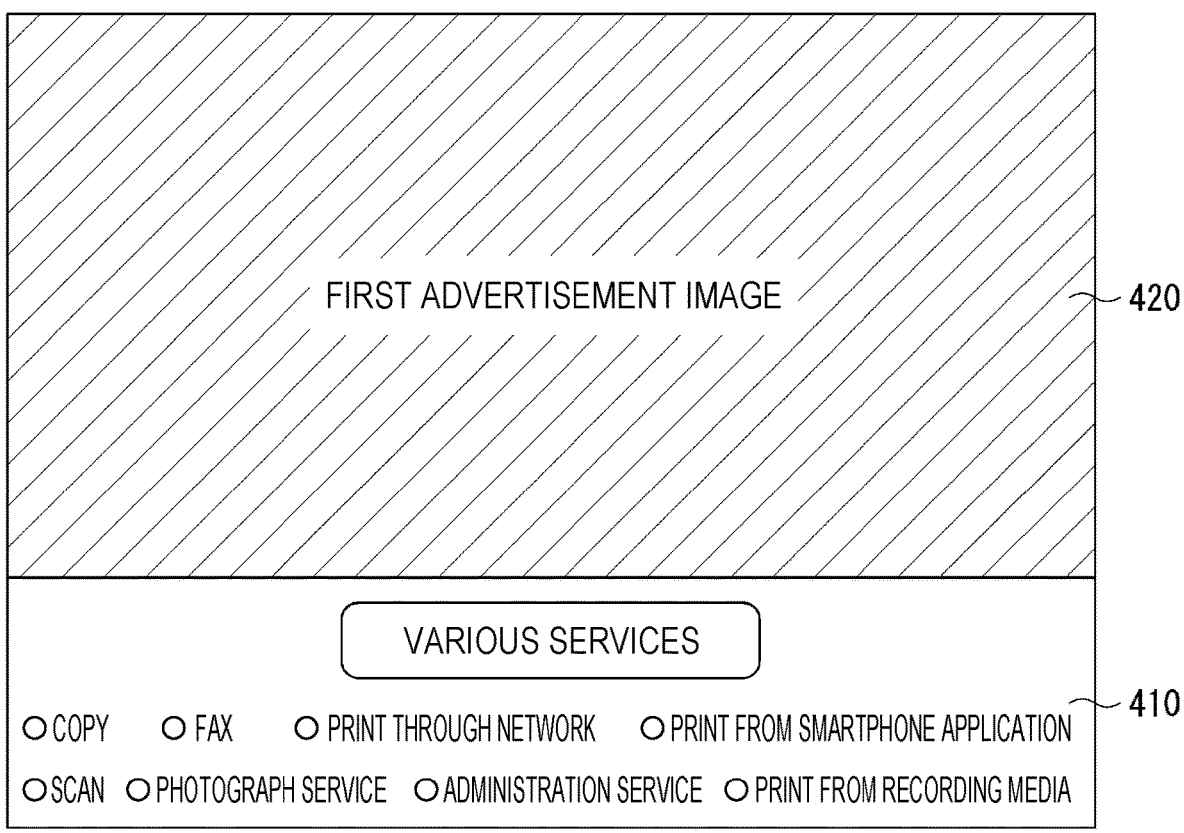
FIG. 5 is a diagram illustrating one example of a standby screen displayed on the display of the information processing apparatus.

According to the information processing system 10 according to the first embodiment, in a case where a state in which the information processing system 10 is not used by the user continues, a standby screen 400 as illustrated in FIG. 5 is displayed on the whole display surface of the display 204. For example, when the home screen 100 is continuously displayed for a predetermined standby switching period Tb, the standby screen 400 is displayed instead of the home screen 100. The standby switching period Tb is appropriately a few minutes to a few tens of minutes and can be changed to any period.

The standby screen 400 is configured with a rectangular function list image 410 and a rectangular advertisement image 420. The function list image 410 is one example of a first image according to the present disclosure. The function list image 410 is positioned in the lower part of the standby screen 400 immediately after the standby screen 400 is displayed. Specifically, the upper edge and the lower edge of the function list image 410 as a first edge pair are parallel to the upper edge and the lower edge of the display surface of the display 204, respectively. In addition, the length dimensions of the upper edge and the lower edge of the function list image 410 are the same as the length dimensions of the upper edge and the lower edge of the display surface of the display 204, respectively. The left edge and the right edge of the function list image 410 as a second edge pair are parallel to the left edge and the right edge of the display surface of the display 204, respectively. The length dimensions of the left edge and the right edge of the function list image 410 are smaller than the length dimensions of the left edge and the right edge of the display surface of the display 204, respectively, and are, for example, approximately ⅓ of the length dimensions of the left edge and the right edge of the display surface of the display 204, respectively. In addition, the lower edge of the function list image 410 overlaps with the lower edge of the display surface of the display 204 immediately after the standby screen 400 is displayed.

The advertisement image 420 is one example of a second image according to the present disclosure and occupies an area of the standby screen 400 other than the function list image 410. Therefore, the advertisement image 420 is positioned above the function list image 410 immediately after the standby screen 400 is displayed.

First information that is related to at least a part of the functions of the information processing system 10, such as character strings related to functions providing services other than the "other services", is included in the function list image 410. Meanwhile, second information that is related to "other services", such as a dynamic image or a character string related to specific contents provided as the "other services", is included in the advertisement image 420.

Therefore, the user can recognize the functions of the information processing system 10 from the function list image 410 constituting the standby screen 400, that is, even in a state where the standby screen 400 is displayed. In addition, from the advertisement image 420, the user can recognize information related to specific contents that can be provided by the information processing system 10.

Figure 6A:
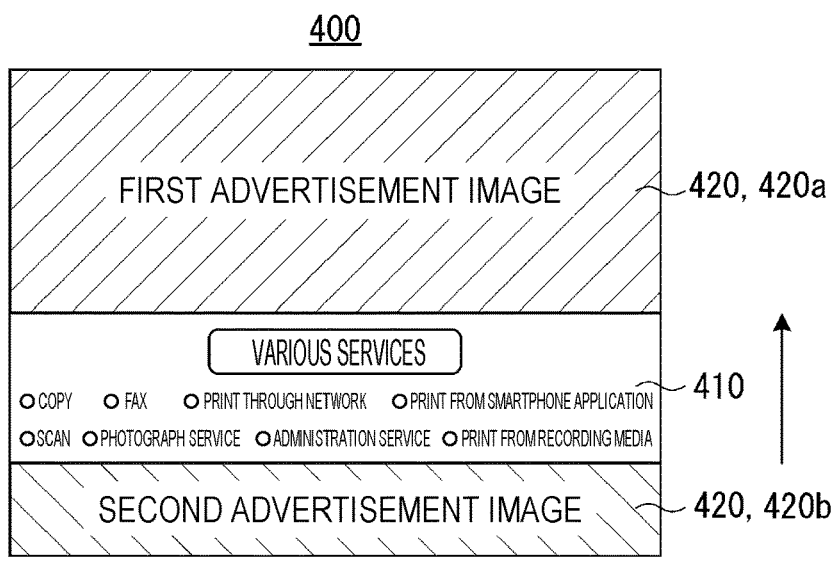
FIGS. 6A to 6C are diagrams illustrating one example of change in the state of the standby screen.
Figure 6B:
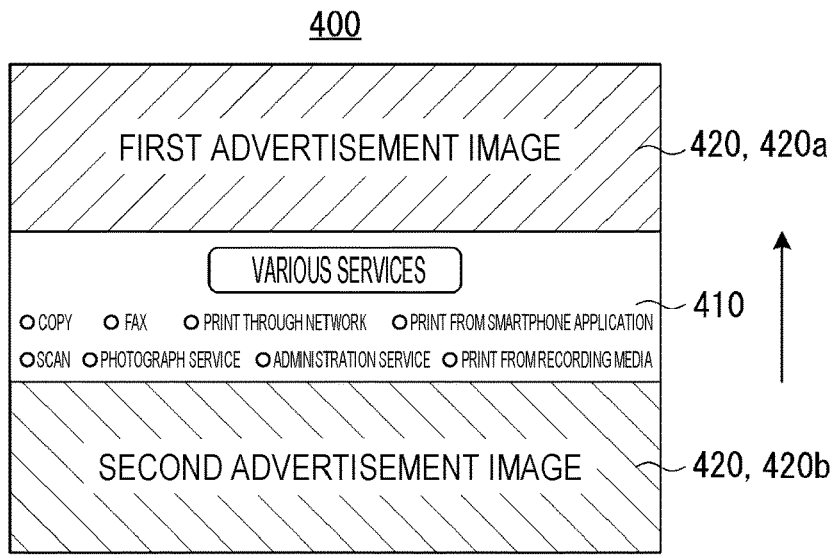
Figure 6C:
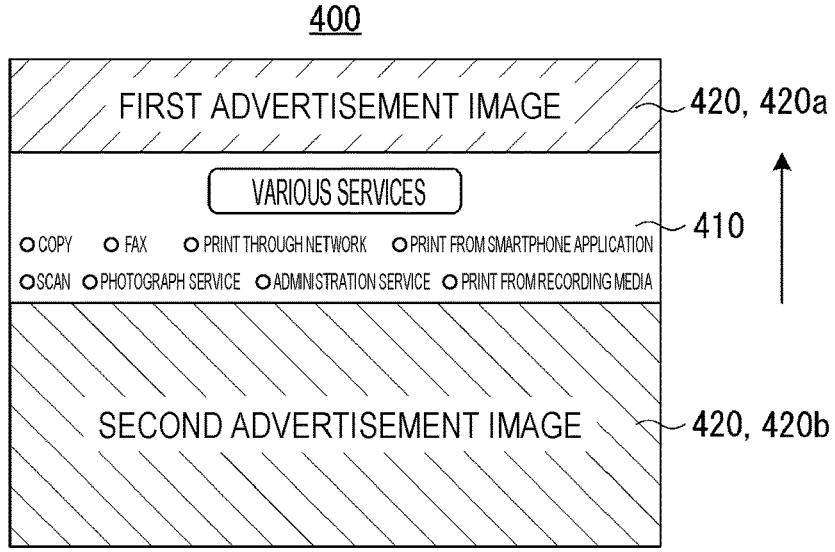

Furthermore, in a case where the predetermined advertisement switching period Ta elapses from the time at which the standby screen 400 is displayed, the display state of the standby screen 400 is changed in the order of (A)→(B)→(C) as illustrated in FIGS. 6A to 6C. That is, the function list image 410 gradually moves (slides) upward along with the elapse of time. Another advertisement image 420 is displayed in the area after the function list image 410 moves, that is, below the function list image 410. For example, given that the advertisement image 420 that is displayed above the function list image 410 is a first advertisement image 420a, a second advertisement image 420b that is different from the first advertisement image 420a is displayed below the function list image 410.

Display of three images including the function list image 410, the first advertisement image 420a, and the second advertisement image 420b at the same on the display surface of the display 204 is implemented by forming the three images 410, 420a, and 420b in different layers. Apparently, the display of the images 410, 420a, and 420b at the same on the display surface of the display 204 may be implemented using other methods.

Figure 7:
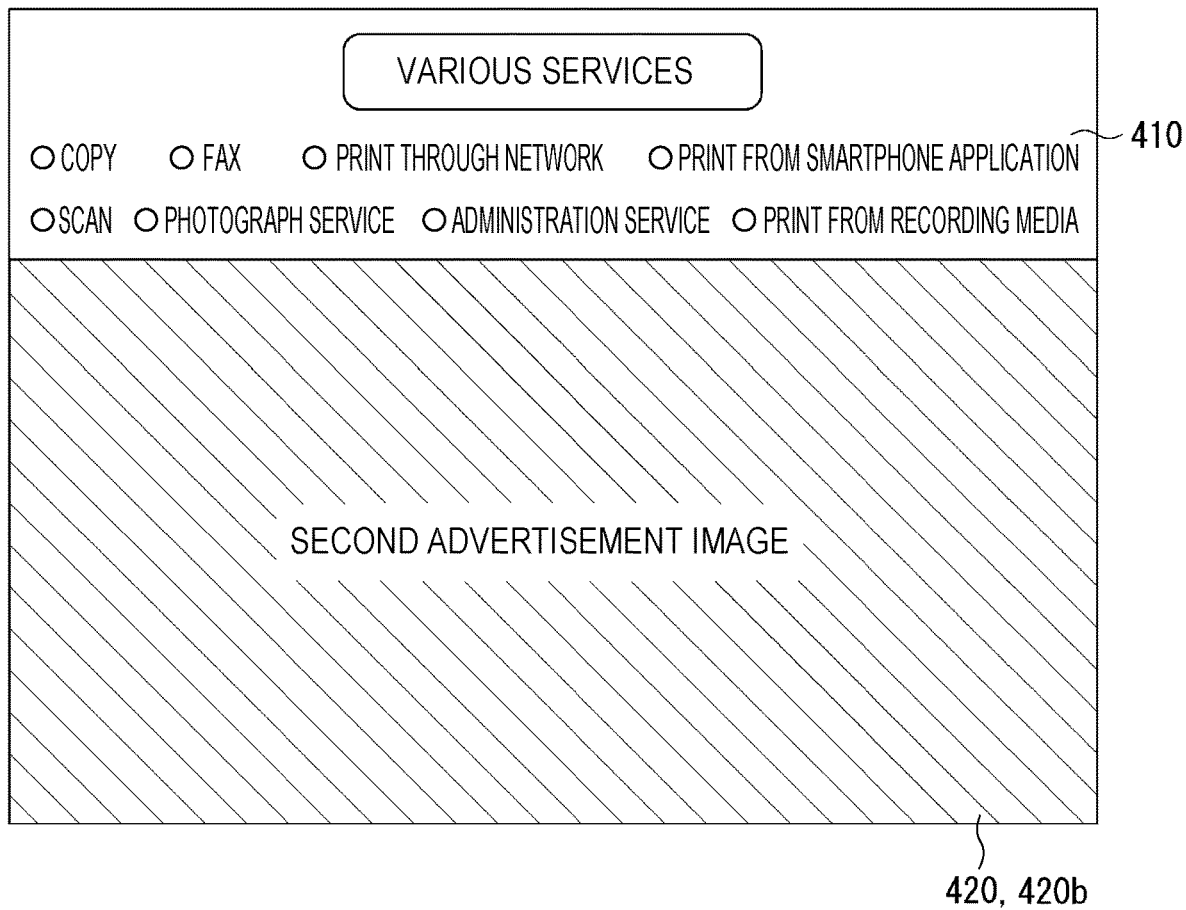
FIG. 7 is a diagram illustrating one example of the standby screen in another state.

The function list image 410 stops moving in a case where the function list image 410 reaches the upper edge of the display surface of the display 204, more precisely, in a case where the upper edge of the function list image 410 overlaps with the upper edge of the display surface of the display 204. Consequently, as illustrated in FIG. 7, the standby screen 400 transitions to a state where the standby screen 400 is configured with the function list image 410 positioned in its upper part and the second advertisement image 420b positioned below the function list image 410. That is, the function list image 410 moves to the upper part from the lower part of the display 204, and the advertisement image 420 is changed such that the first advertisement image 420a is replaced with the second advertisement image 420b by the moving function list image 410.

Figure 8A:
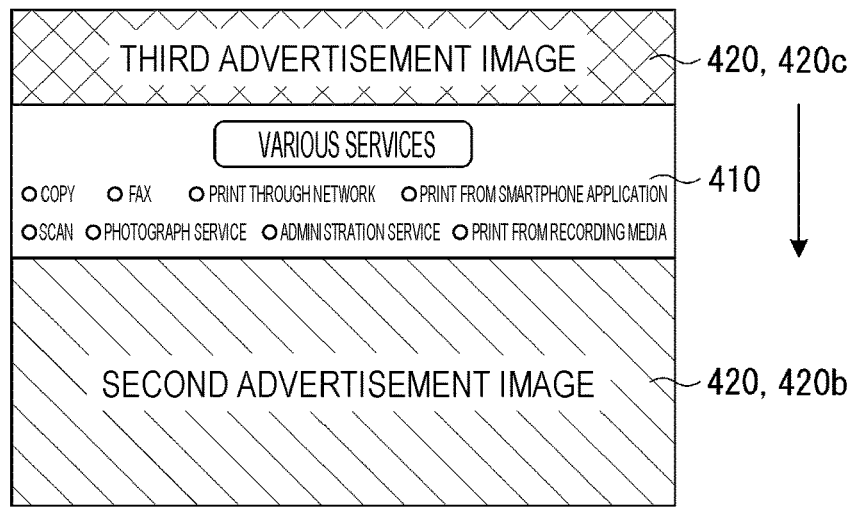
FIGS. 8A to 8C are diagrams illustrating another example of change in the state of the standby screen.
Figure 8B:
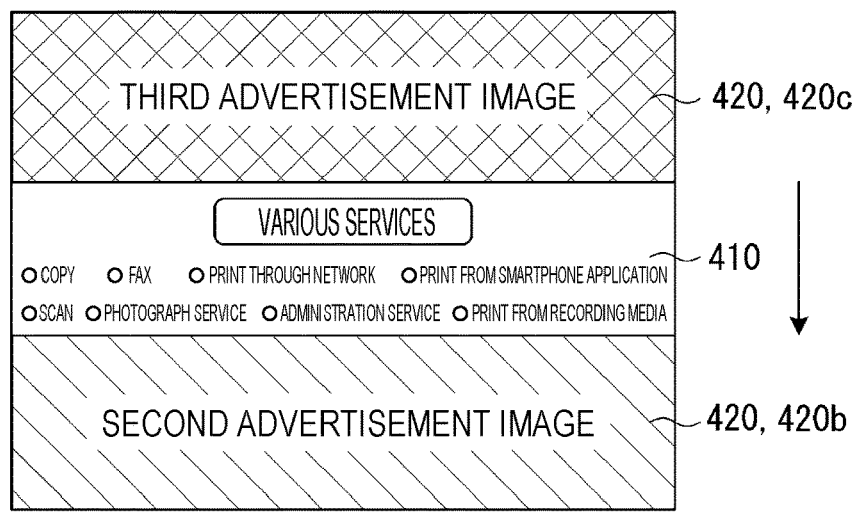
Figure 8C:
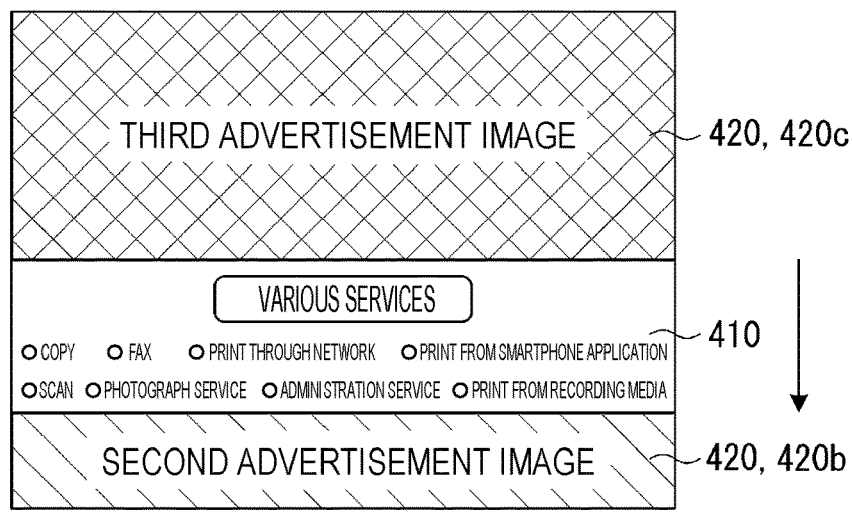

The state illustrated in FIG. 7 is maintained for the advertisement switching period Ta. In a case where the advertisement switching period Ta elapses, the display state of the standby screen 400 is changed in the order of (A)→(B)→(C) as illustrated in FIGS. 8A to 8C. That is, the function list image 410 gradually moves downward along with the elapse of time. Still another advertisement image 420 is displayed in the area after the function list image 410 moves, that is, above the function list image 410. For example, a third advertisement image 420c is displayed.

Figure 9:
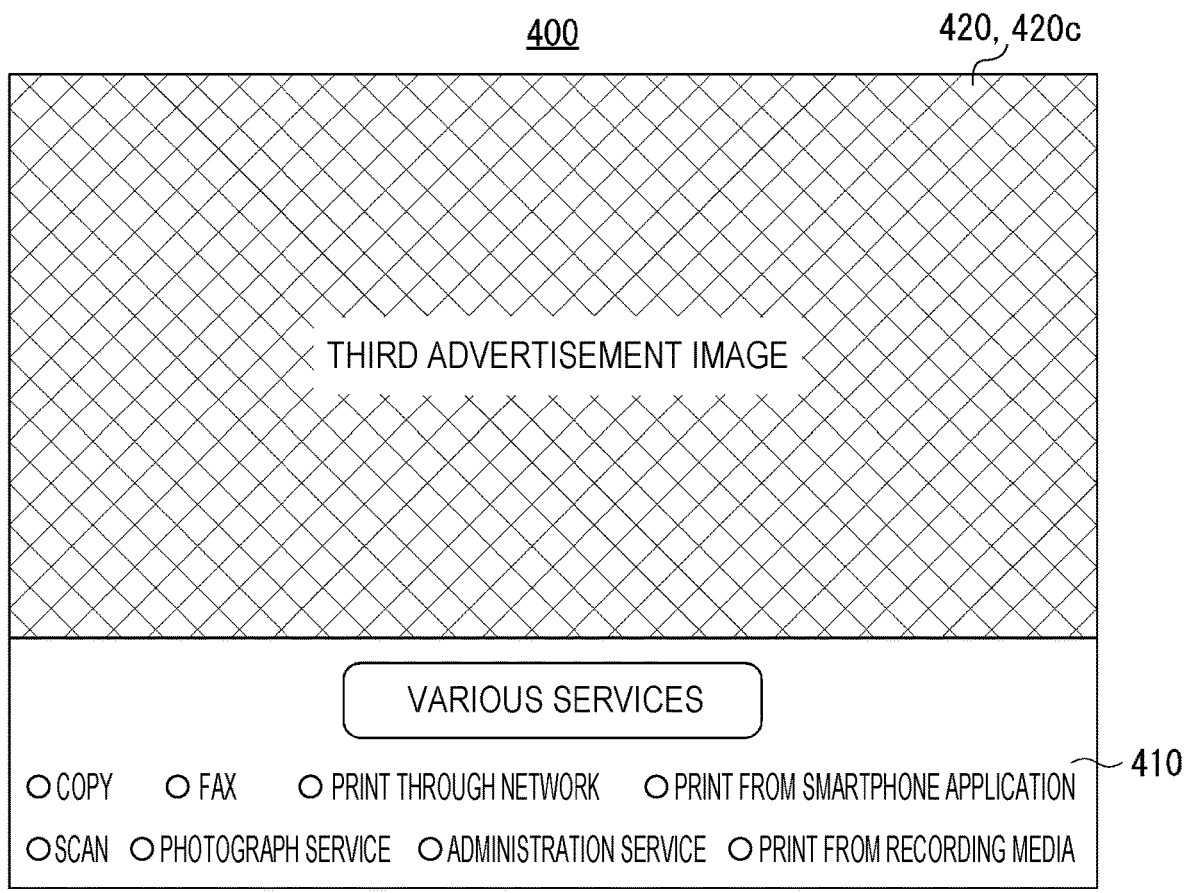
FIG. 9 is a diagram illustrating one example of the standby screen in still another state.

The function list image 410 stops moving in a case where the function list image 410 reaches the lower edge of the display surface of the display 204, more precisely, in a case where the lower edge of the function list image 410 overlaps with the lower edge of the display surface of the display 204. Consequently, as illustrated in FIG. 9, the standby screen 400 transitions to a state where the standby screen 400 is configured with the function list image 410 positioned in its lower part and the third advertisement image 420c positioned above the function list image 410. That is, the function list image 410 moves to the lower part from the upper part of the display 204, and the advertisement image 420 is changed such that the second advertisement image 420b is replaced with the third advertisement image 420c by the moving function list image 410. Then, the same operation is repeated.

That is, the function list image 410 reciprocates at a certain cycle between the upper edge and the lower edge of the display surface of the display 204 along the left edge and the right edge of the display surface of the display 204. The advertisement image 420 is gradually changed along with the reciprocation of the function list image 410. The point is that a kind of dynamic image that is configured with the function list image 410, and the advertisement image 420 is displayed as the standby screen 400. Accordingly, the display surface of the display 204 is protected from image sticking.

In addition, while the function list image 410 moves within the display surface of the display 204 as described above, the function list image 410 is displayed on the display surface of the display 204 at all times. Therefore, the user can still recognize the functions of the information processing system 10 from the function list image 410, that is, even in a state where the standby screen 400 is displayed on the display surface of the display 204. Accordingly, the convenience of use of the information processing system 10 is improved. Furthermore, while the advertisement image 420 is also displayed on the display 204 at all times, the advertisement image 420 (its content) is gradually changed along with the elapse of time. That is, various advertisement images 420 are presented to the user. Accordingly, the effect of advertising by the information processing system 10 is improved, and the added value, profitability, and the like of the information processing system 10 are improved.

For example, the advertisement switching period Ta is appropriately a few seconds to a few tens of seconds and can be appropriately changed. For example, a period in which the function list image 410 moves from one of the upper edge or the lower edge of the display surface of the display 204 to the other, that is, a moving period of the function list image 410, is appropriately a few seconds to a few tens of seconds and can be appropriately changed.

In a case where a specific operation is performed by the user in a state in which the standby screen 400 is displayed on the display surface of the display 204, for example, in a case where any position on the touch panel 202 is touched, the home screen 100 is displayed again instead of the standby screen 400. Accordingly, the user can select any function from the home screen 100 as described above. In addition, in a case where a state in which the home screen 100 is displayed continues for the standby switching period Tb, the standby screen 400 is displayed again instead of the home screen 100.

In order to implement such control of the standby screen 400, the CPU 220 of the information processing apparatus 20 executes a standby screen control process in accordance with the information processing program 520 stored in the RAM 228.

Figure 10:
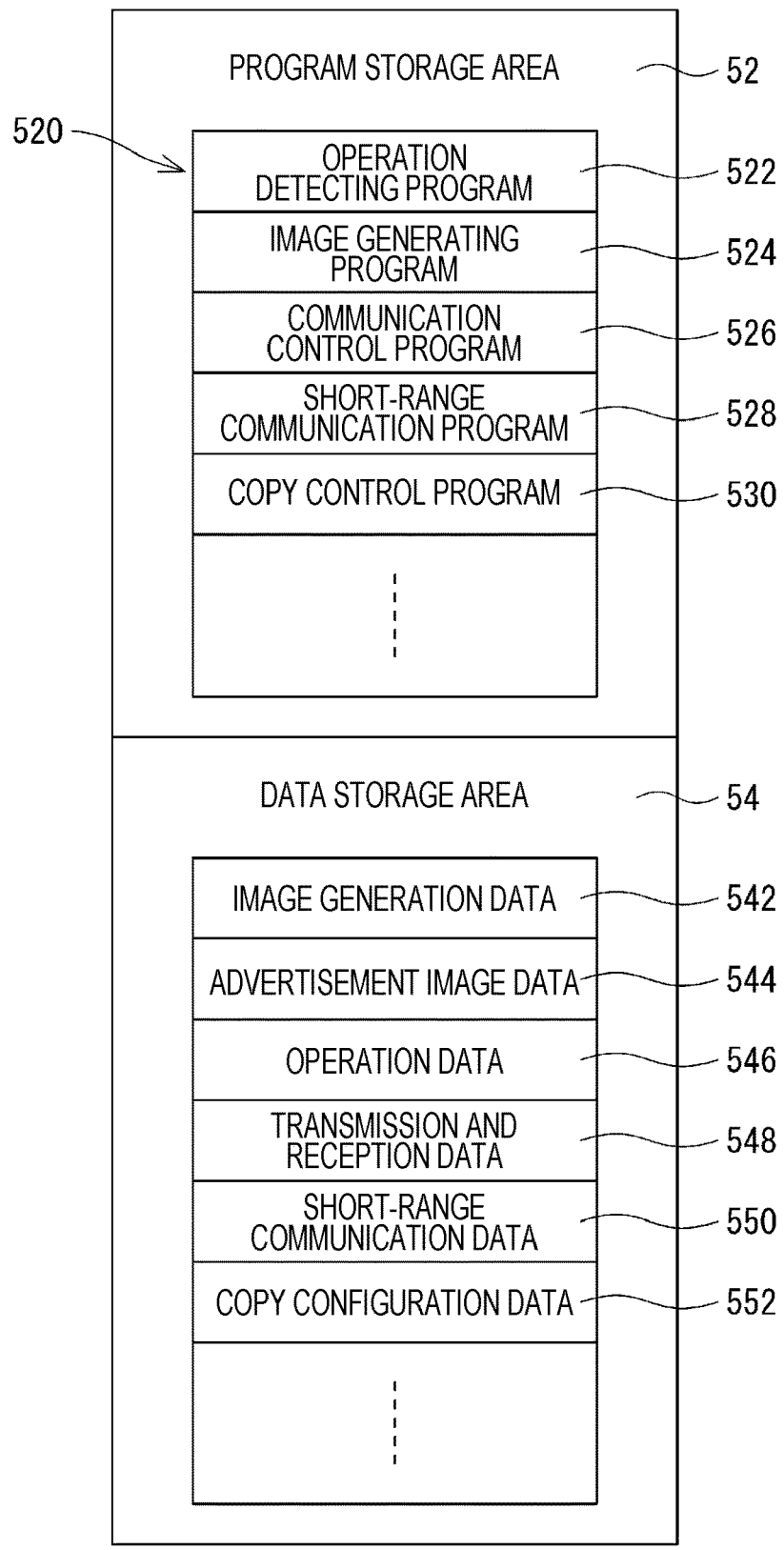
FIG. 10 is a diagram illustrating one example of a memory map of a RAM of the information processing apparatus.

FIG. 10 illustrates one example of a memory map 50 of the RAM 228. As illustrated in FIG. 10, the RAM 228 includes a program storage area 52 and a data storage area 54. The program storage area 52 stores the information processing program 520. The information processing program 520 includes an operation detecting program 522, an image generating program 524, a communication control program 526, a short-range communication program 528, and a copy control program 530.

The operation detecting program 522 is a program for detecting the state of the touch panel 202 operated by the user. Specifically, the operation detecting program 522 is a program for acquiring the touch coordinate data from the touch panel control circuit 224 and storing the touch coordinate data in the data storage area 54 in a time-series manner.

The image generating program 524 is a program for generating display image data that is used for displaying various screens such as the home screen 100 and the standby screen 400 on the display surface of the display 204. Specifically, in a case where the image generating program 524 is executed, the GPU in the display control circuit 226 generates the display image data corresponding to the screen to be displayed on the display surface of the display 204 in the VRAM in accordance with an instruction from the CPU 220. By inputting the display image data generated in the VRAM into the display 204, the screen based on the display image data is displayed on the display surface of the display 204.

The communication control program 526 is a program for implementing bidirectional communication of the communication circuit 232. That is, in a case where the communication control program 526 is executed, bidirectional communication of the communication circuit 232 is implemented in accordance with an instruction from the CPU 220. The bidirectional communication includes bidirectional communication with the communication circuit 320 on the image forming apparatus 30 side as described above.

The short-range communication program 528 is a program for implementing data communication of the short-range communication unit 212 with the communication target. That is, in a case where the short-range communication program 528 is executed, data communication of the short-range communication unit 212 with the communication target is implemented in accordance with an instruction from the CPU 220.

The copy control program 530 is a program for controlling the copy function of the image forming apparatus 30. The CPU 220 controls the copy function of the image forming apparatus 30 in accordance with the copy control program 530. For example, the CPU 220 configures various parameters related to the copy function or instructs the CPU 312 of the image forming apparatus 30 to start copying.

The data storage area 54 stores the image generation data 542, advertisement image data 544, operation data 546, transmission and reception data 548, short-range communication data 550, copy configuration data 552, and the like.

Figure 11:
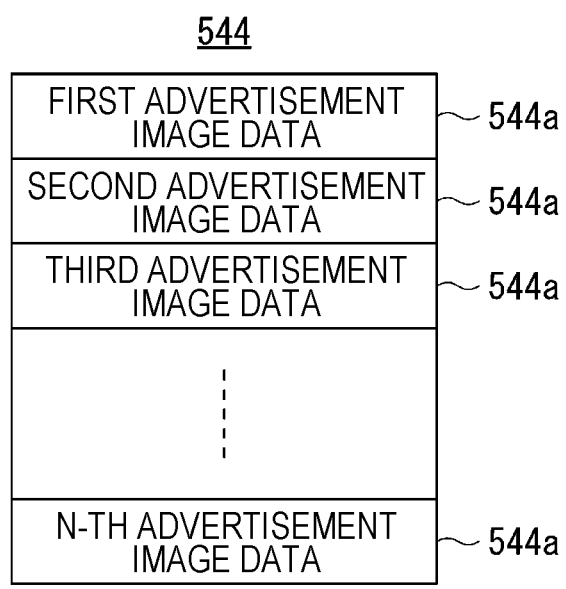
FIG. 11 is a diagram illustrating one example of details of advertisement image data stored in the RAM of the information processing apparatus.

The image generation data 542 is data such as polygon data or texture data for generating display screen data corresponding to various screens such as the home screen 100 and the standby screen 400. The advertisement image data 544 is data that corresponds to the advertisement image 420, more precisely, the plurality of advertisement images 420a, 420b, 420c, . . . . For example, as illustrated in FIG. 11, the advertisement image data 544 includes a plurality of pieces of advertisement image data 544a, 544a, 544a, . . . . FIG. 11 illustrates a state where N (N: an integer greater than or equal to two) pieces of advertisement image data 544a, 544a, 544a, . . . are stored. For example, these pieces of advertisement image data 544a, 544a, 544a, . . . are supplied or updated through the network.

The operation data 546 is the touch coordinate data acquired in accordance with the operation detecting program 522 and is stored in a time-series manner.

The transmission and reception data 548 is data that is transmitted and received in accordance with the communication control program 526. The transmission and reception data 548 includes data that is transmitted and received with the image forming apparatus 30, such as an image forming instruction transmitted to the image forming apparatus 30 and image reading data received from the image forming apparatus 30.

The short-range communication data 550 is data that is transmitted and received in accordance with the short-range communication program 528. The short-range communication data 550 includes data related to a payment process, described below, that uses electronic money.

The copy configuration data 552 is data of various parameters that are configured in accordance with the copy control program 530 and related to the copy function of the image forming apparatus 30. The copy configuration data 552 includes data related to a copy mode, a type of finished sheet (output paper), and the like described below.

While illustration is not provided, the data storage area 54 stores other various pieces of data that are used for executing the information processing program 520. In addition, for example, various counters (timers) for counting the advertisement switching period Ta, the standby switching period Tb, and the like and various indexes representing a serial number n and the like of each piece of the advertisement image data 544a, 544a, . . . are set in the data storage area 54.

Figure 12:
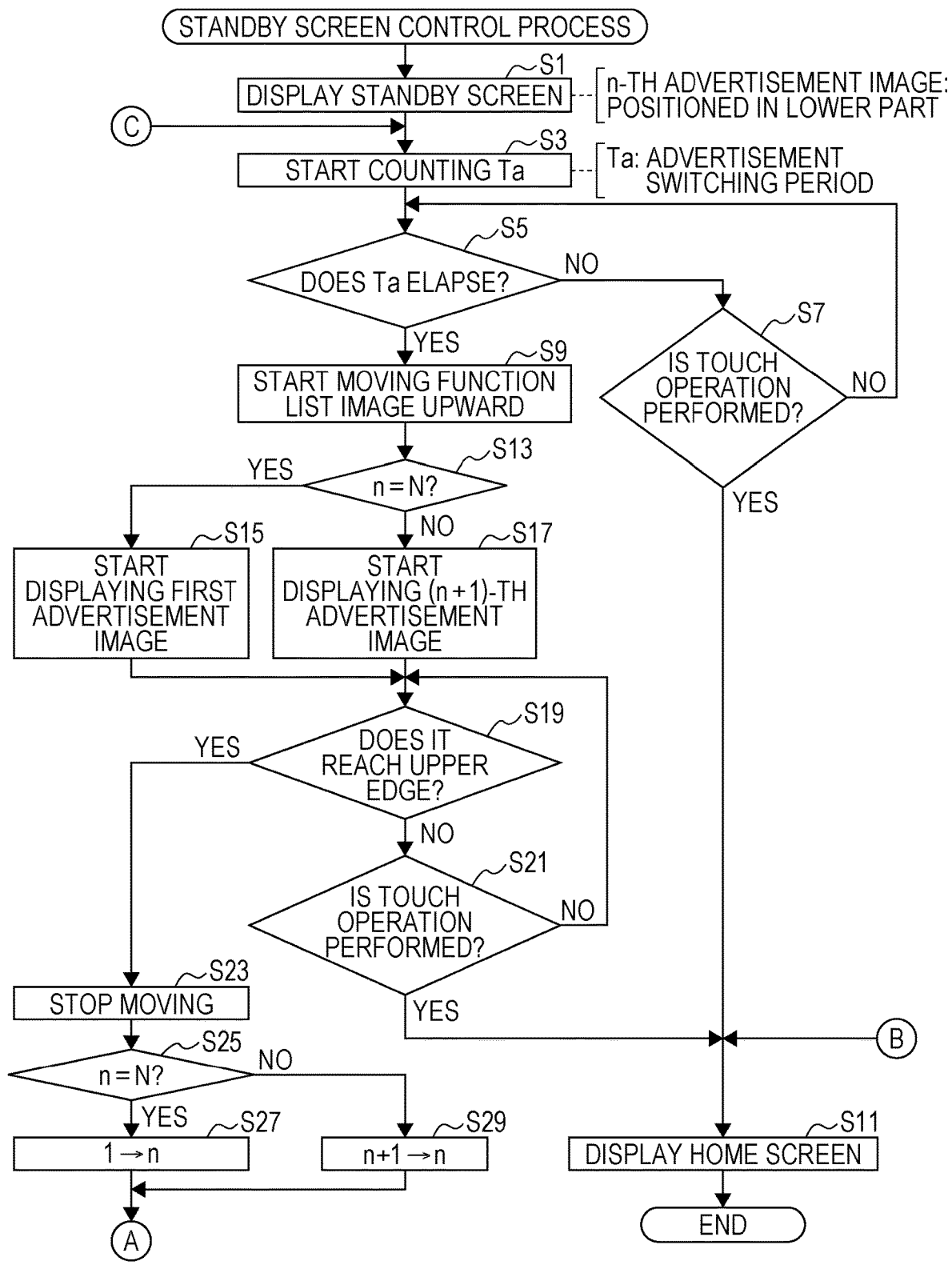
FIG. 12 is a flowchart illustrating a part of one example of a standby screen control process executed by a CPU of the information processing apparatus.
Figure 13:
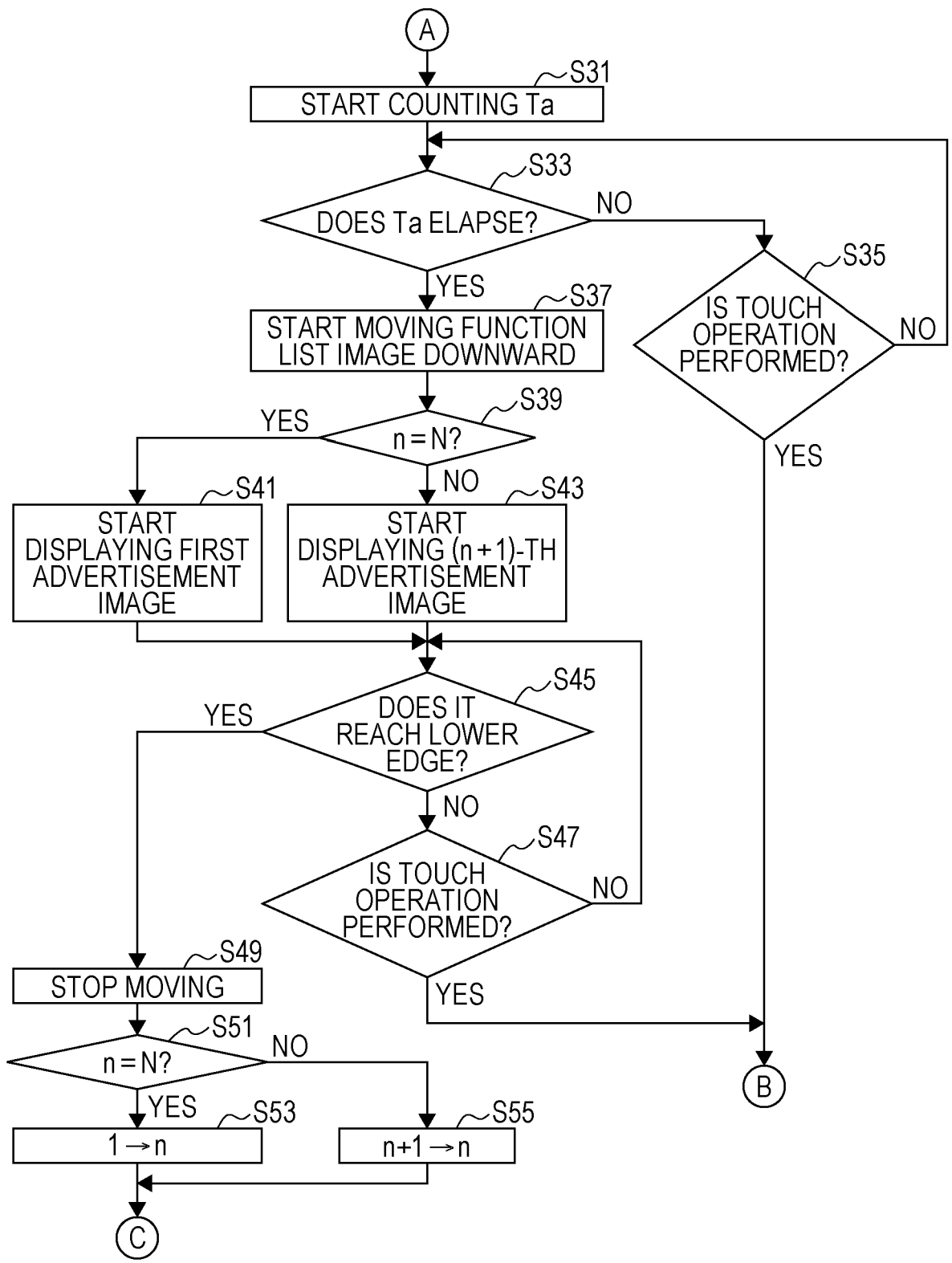
FIG. 13 is a flowchart illustrating the remaining part of the example of the standby screen control process.

In addition, the CPU 220 of the information processing apparatus 20 executes the standby screen control process in accordance with the information processing program 520 as described above. The flow of standby screen control process will be described with reference to flowcharts illustrated in FIG. 12 and FIG. 13. The CPU 220 starts executing the standby screen control process when a state where the home screen 100 is displayed continues for the standby switching period Tb.

First, in step S1, the CPU 220 displays the standby screen 400 on the display surface of the display 204. More precisely, the CPU 220 controls the display control circuit 226 to do so. At this point, an image based on the n-th advertisement image data 544a is displayed as the advertisement image 420 constituting the standby screen 400. When the information processing system 10 is started, or each piece of the advertisement image data 544a, 544a, . . . in the RAM 228 is updated, an initial value "1" is configured as the value of the index representing the serial number n of each piece of the advertisement image data 544a, 544a, . . . . Therefore, for example, in a case where step S1 is executed for the first time after the information processing system 10 is started or each piece of the advertisement image data 544a, 544a, . . . in the RAM 228 is updated, the first advertisement image 420a is displayed as the advertisement image 420. That is, the standby screen 400 illustrated in FIG. 5 is displayed.

After step S1 is executed, the CPU 220 advances the process to step S3. In step S3, the CPU 220 starts counting the advertisement switching period Ta. Furthermore, the CPU 220 advances the process to step S5 from step S3 and determines whether or not the advertisement switching period Ta elapses.

In step S5, for example, in a case where the advertisement switching period Ta does not elapse yet (S5—NO), the CPU 220 advances the process to step S7. In step S5, in a case where the advertisement switching period Ta elapses (S5—YES), the CPU 220 advances the process to step S9.

In step S7, the CPU 220 determines whether or not the touch panel 202 receives a touch operation from the user, more precisely, whether or not the touch coordinate data corresponding to the touch operation is input from the touch panel control circuit 224. For example, in a case where the touch operation is not received (S7—NO), the CPU 220 returns the process to step S5. In a case where the touch operation is received (S7—YES), the CPU 220 advances the process to step S11 from step S7.

In step S11, the CPU 220 displays the home screen 100 on the display surface of the display 204. More precisely, the CPU 220 controls the display control circuit 226 to do so. By executing step S11, the CPU 220 finishes the standby screen control process.

In step S9, the CPU 220 causes the function list image 410 on the display surface of the display 204 to start moving upward. More precisely, the CPU 220 controls the display control circuit 226 to do so. The CPU 220 advances the process to step S13.

In step S13, the CPU 220 determines whether or not the value of the index representing the serial number n of each piece of the advertisement image data 544a, 544a, . . . matches its maximum value N. For example, in a case where the value of the index representing the serial number n matches its maximum value N (S13—YES), that is, in a case where the current advertisement image 420 is based on the N-th advertisement image data 544a, the CPU 220 advances the process to step S15. In a case where the value of the index representing the serial number n does not match its maximum value N (S13—NO), that is, in a case where the current advertisement image 420 is based on the advertisement image data 544a other than the N-th advertisement image data 544a, the CPU 220 advances the process to step S17 from step S13.

In step S15, the CPU 220 causes display of the first advertisement image 420 (420a) based on the first advertisement image data 544a to be started on the display surface of the display 204. More precisely, the CPU 220 controls the display control circuit 226 to do so. The first advertisement image 420 is displayed below the function list image 410. After step S15 is executed, the CPU 220 advances the process to step S19.

In step S17, the CPU 220 causes display of the (n+1)-th advertisement image 420 based on the (n+1)-th advertisement image data 544a to be started on the display surface of the display 204. More precisely, the CPU 220 controls the display control circuit 226 to do so. The (n+1)-th advertisement image 420 is also displayed below the function list image 410. After step S17 is executed, the CPU 220 advances the process to step S19.

In step S19, the CPU 220 determines whether or not the function list image 410 reaches the upper edge of the display surface of the display 204. For example, in a case where the function list image 410 does not reach the upper edge of the display surface of the display 204 (S19—NO), the CPU 220 advances the process to step S21. In a case where the function list image 410 reaches the upper edge of the display surface of the display 204 (S19—YES), the CPU 220 advances the process to step S23 from step S19.

In step S21, the CPU 220 determines whether or not the touch panel 202 receives a touch operation from the user, that is, whether or not the touch coordinate data corresponding to the touch operation is input from the touch panel control circuit 224. For example, in a case where the touch operation is not received (S21—NO), the CPU 220 returns the process to step S19. In a case where the touch operation is received (S21—YES), the CPU 220 advances the process to step S11 from step S21.

In addition, in step S23, the CPU 220 causes the function list image 410 on the display surface of the display 204 to stop moving upward. More precisely, the CPU 220 controls the display control circuit 226 to do so. The CPU 220 advances the process to step S25.

In step S25, the CPU 220 determines whether or not the value of the index representing the serial number n matches its maximum value N. For example, in a case where the value of the index representing the serial number n matches its maximum value N (S25—YES), the CPU 220 advances the process to step S27. In a case where the value of the index representing the serial number n does not match its maximum value N (S25—NO), the CPU 220 advances the process to step S29 from step S25.

In step S27, the CPU 220 configures the value of the index representing the serial number n to be "1". After step S27 is executed, the CPU 220 advances the process to step S31.

In step S29, the CPU 220 increments the value of the index representing the serial number n, that is, adds "1". After step S29 is executed, the CPU 220 advances the process to step S31.

In step S31, the CPU 220 starts counting the advertisement switching period Ta again. The CPU 220 advances the process to step S33 and determines whether or not the advertisement switching period Ta elapses.

In step S33, for example, in a case where the advertisement switching period Ta does not elapse yet (S33—NO), the CPU 220 advances the process to step S35. In step S33, in a case where the advertisement switching period Ta elapses (S33—YES), the CPU 220 advances the process to step S37.

In step S35, the CPU 220 determines whether or not the touch panel 202 receives a touch operation from the user. For example, in a case where the touch operation is not received (S35—NO), the CPU 220 returns the process to step S33. In a case where the touch operation is received (S35—YES), the CPU 220 advances the process to step S11 from step S35.

In addition, in step S37, the CPU 220 causes the function list image 410 on the display surface of the display 204 to start moving downward. More precisely, the CPU 220 controls the display control circuit 226 to do so. The CPU 220 advances the process to step S39.

In step S39, the CPU 220 determines whether or not the value of the index representing the serial number n matches its maximum value N. For example, in a case where the value of the index representing the serial number n matches its maximum value N (S39—YES), the CPU 220 advances the process to step S41. In a case where the value of the index representing the serial number n does not match its maximum value N (S39—NO), the CPU 220 advances the process to step S43 from step S39.

In step S41, the CPU 220 causes display of the first advertisement image 420 (420a) based on the first advertisement image data 544a to be started on the display surface of the display 204. More precisely, the CPU 220 controls the display control circuit 226 to do so. The first advertisement image 420 is displayed above the function list image 410. After step S41 is executed, the CPU 220 advances the process to step S45.

In step S43, the CPU 220 causes display of the (n+1)-th advertisement image 420 based on the (n+1)-th advertisement image data 544a to be started on the display surface of the display 204. More precisely, the CPU 220 controls the display control circuit 226 to do so. The (n+1)-th advertisement image 420 is also displayed above the function list image 410. After step S43 is executed, the CPU 220 advances the process to step S45.

In step S45, the CPU 220 determines whether or not the function list image 410 reaches the lower edge of the display surface of the display 204. For example, in a case where the function list image 410 does not reach the lower edge of the display surface of the display 204 (S45—NO), the CPU 220 advances the process to step S47. In a case where the function list image 410 reaches the lower edge of the display surface of the display 204 (S45—YES), the CPU 220 advances the process to step S49 from step S45.

In step S47, the CPU 220 determines whether or not the touch panel 202 receives a touch operation from the user. For example, in a case where the touch operation is not received (S47—NO), the CPU 220 returns the process to step S45. In a case where the touch operation is received (S47—YES), the CPU 220 advances the process to step S11 from step S47.

In addition, in step S49, the CPU 220 causes the function list image 410 on the display surface of the display 204 to stop moving downward. More precisely, the CPU 220 controls the display control circuit 226 to do so. The CPU 220 advances the process to step S51.

In step S51, the CPU 220 determines whether or not the value of the index representing the serial number n matches its maximum value N. For example, in a case where the value of the index representing the serial number n matches its maximum value N (S51—YES), the CPU 220 advances the process to step S53. In a case where the value of the index representing the serial number n does not match its maximum value N (S51—NO), the CPU 220 advances the process to step S55 from step S51.

In step S53, the CPU 220 configures the value of the index representing the serial number n to be "1". After step S53 is executed, the CPU 220 returns the process to step S3 in order to start counting the advertisement switching period Ta again.

In step S55, the CPU 220 increments the value of the index representing the serial number n, that is, adds "1". After step S55 is executed, the CPU 220 returns the process to step S3 in order to start counting the advertisement switching period Ta again.

The CPU 220 that executes the series of standby screen control process acts as, for example, a standby control unit. In addition, such a CPU 220 is, for example, a function selection control unit.

As described thus far, according to the information processing system 10 according to the first embodiment, in a case where a state in which the information processing system 10 is not used by the user continues, the standby screen 400 that is a kind of dynamic image is displayed on the whole display surface of the display 204. Accordingly, the display surface of the display 204 is protected from image sticking.

In addition, even in a state where the standby screen 400 is displayed on the display surface of the display 204, the user can recognize the functions of the information processing system 10 from the function list image 410 constituting the standby screen 400. Accordingly, the convenience of use of the information processing system 10 is improved. In addition, since the advertisement image 420 constituting the standby screen 400 is gradually changed along with the elapse of time, various advertisement images 420 are presented to the user. Accordingly, the effect of advertising by the information processing system 10 is improved, and the added value, profitability, and the like of the information processing system 10 are improved.

That is, according to the information processing system 10 according to the first embodiment, the display surface of the display 204 is protected from image sticking, and the convenience of use, added value, profitability, and the like of the information processing system 10 are improved.

As described above, according to the information processing system 10 according to the first embodiment, while the user can select any function from the home screen 100, various considerations are made such that operability related to each function is improved. For example, a case where the copy function is selected by the user will be described in detail.

In this case, in the home screen 100 illustrated in FIG. 4, the button 122 in which a character string "copy" is shown is operated (pressed) by the user. Then, a copy reception screen 600 as illustrated in FIG. 14 is displayed on the display surface of the display 204.

Figure 14:
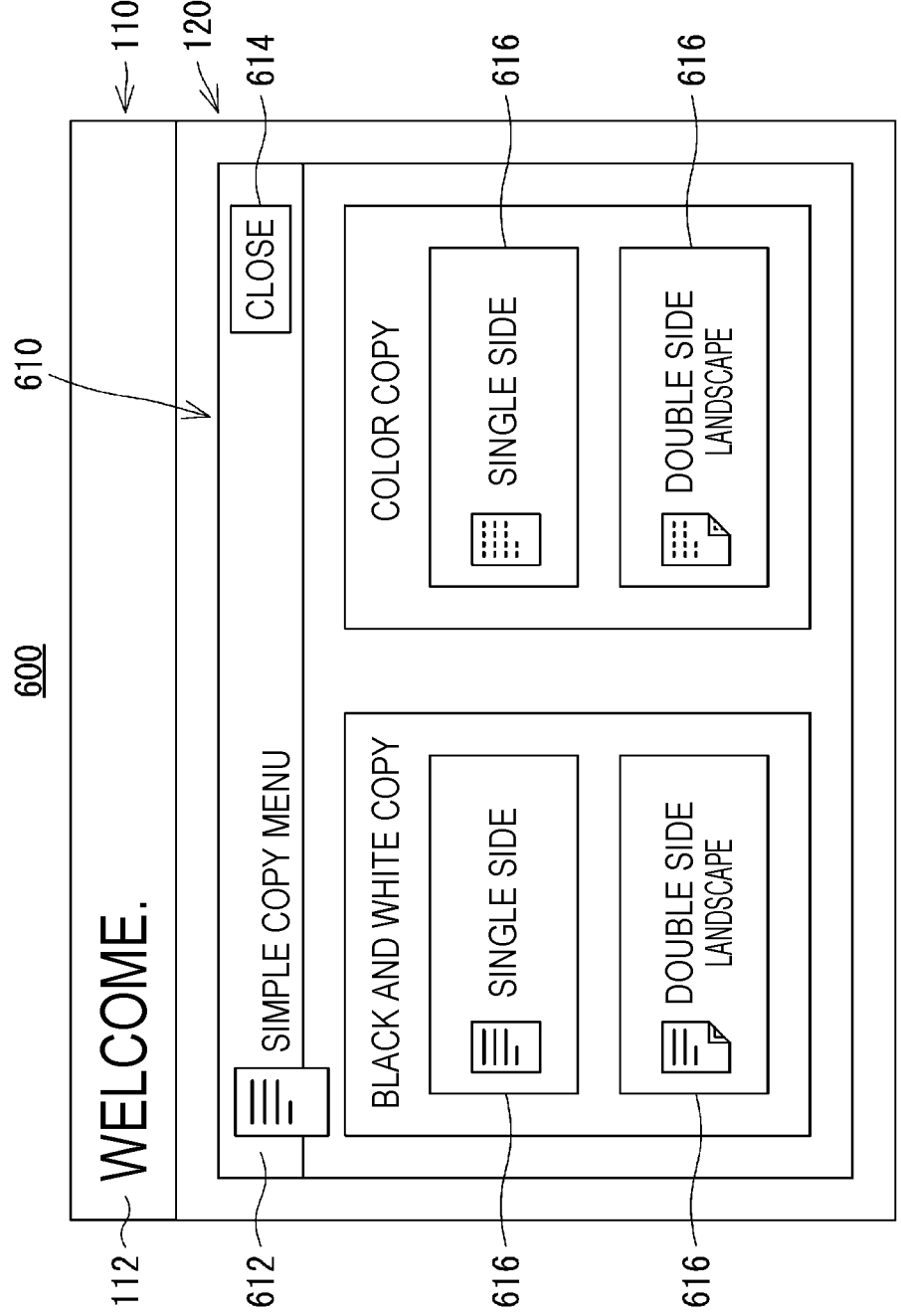
FIG. 14 is a diagram illustrating one example of a copy reception screen including a simple copy menu screen displayed on the display of the information processing apparatus.

The copy reception screen 600 illustrated in FIG. 14 is configured with the title bar area 110 and the main area 120 that are common in the home screen 100. The same title bar 112 as the home screen 100 is displayed in the title bar area 110. A simple copy menu screen 610 that has a rectangular shape slightly (almost one size) smaller than the main area 120 is displayed at the center of the main area 120.

The simple copy menu screen 610 is a screen for roughly selecting a copy mode related to the copy function, that is, an initial screen related to the copy function. Specifically, a subtitle bar 612 that has a horizontally elongated rectangular shape is disposed in the upper part of the simple copy menu screen 610. A character string representing the title of the simple copy menu screen 610, for example, a character string "simple copy menu", is shown in the subtitle bar 612. In addition, a button in which a character string "close" is shown, that is, a close button 614, is disposed in the vicinity of, for example, the right end part of the subtitle bar 612.

Furthermore, a plurality of, for example, four, buttons 616, 616, . . . are disposed vertically in two rows and horizontally in two columns below the subtitle bar 612 in the simple copy menu screen 610. The left two of the buttons 616, 616, . . . correspond to a black and white copy mode and correspond to a single side copy mode and a double side copy mode, respectively. An appropriate character string or the like that represents the copy mode corresponding to the left two buttons 616 and 616 is shown above the left two buttons 616 and 616. The right two buttons 616 and 616 correspond to a color copy mode and correspond to the single side copy mode and the double side copy mode, respectively. An appropriate character string or the like that represents the copy mode corresponding to the right two buttons 616 and 616 is shown above the right two buttons 616 and 616.

According to the simple copy menu screen 610, the user presses any of the buttons 616, 616, . . . depending on whether the user desires any of the black and white copy mode or the color copy mode or desires any of the single side copy mode or the double side copy mode. In a case where the user stops selecting the copy function, the user may press the close button 614. In a case where the close button 614 is pressed, the home screen 100 is displayed again on the display surface of the display 204. In other words, a return is made to a state where the home screen 100 is displayed.

Figure 15:
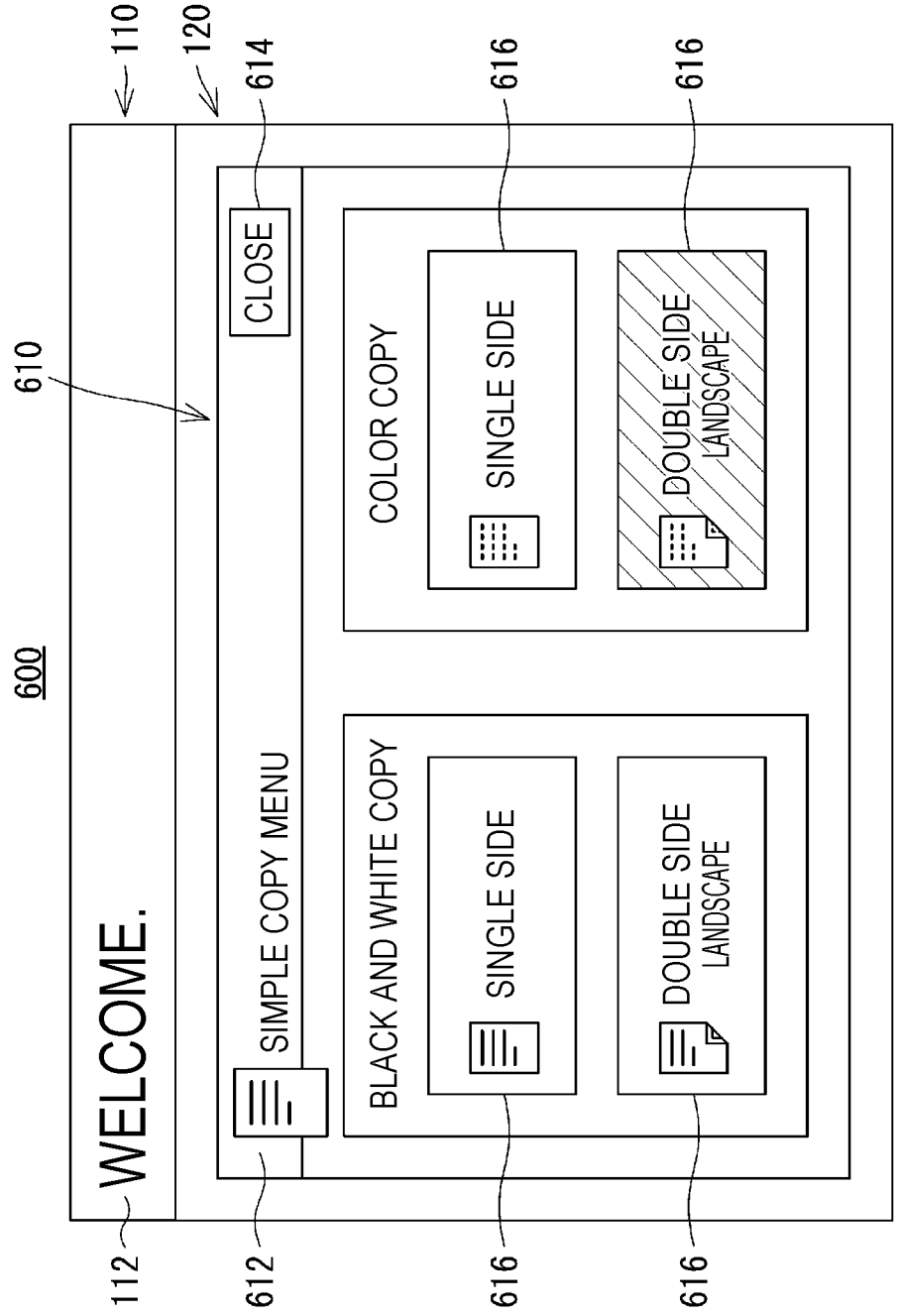
FIG. 15 is a diagram illustrating one example of a state where the display state of the simple copy menu screen is changed.

In the simple copy menu screen 610, for example, in a case where the button 616 (positioned on the lower right side) that corresponds to the color copy mode and the double side copy mode is pressed, the display state of the pressed button 616 is changed as illustrated in FIG. 15. In FIG. 15, while the pressed button 616 is hatched, the hatching represents an appropriate color set in the pressed button 616. Accordingly, the copy mode corresponding to the pressed button 616 is selected. Data of the selected copy mode is stored as one parameter related to the copy function and more specifically, is stored as one piece of the copy configuration data 552. The display state of the simple copy menu screen 610 illustrated in FIG. 15 is maintained for a certain period, for example, a relatively short period of shorter than or equal to one second.

Figure 16:
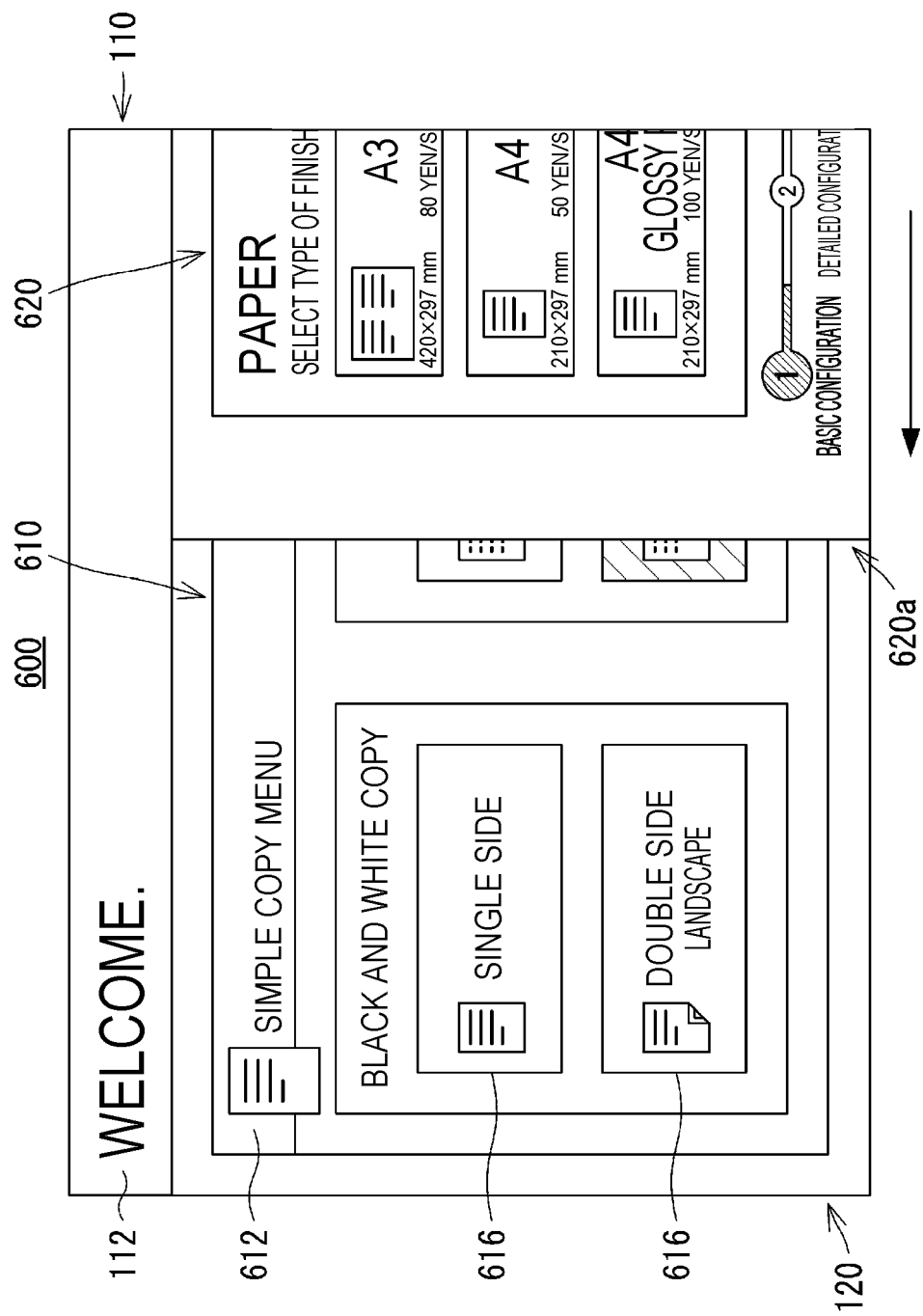
FIG. 16 is a diagram illustrating one example of a state where a paper selection screen is slid into a main area of the copy reception screen.
Figure 17:
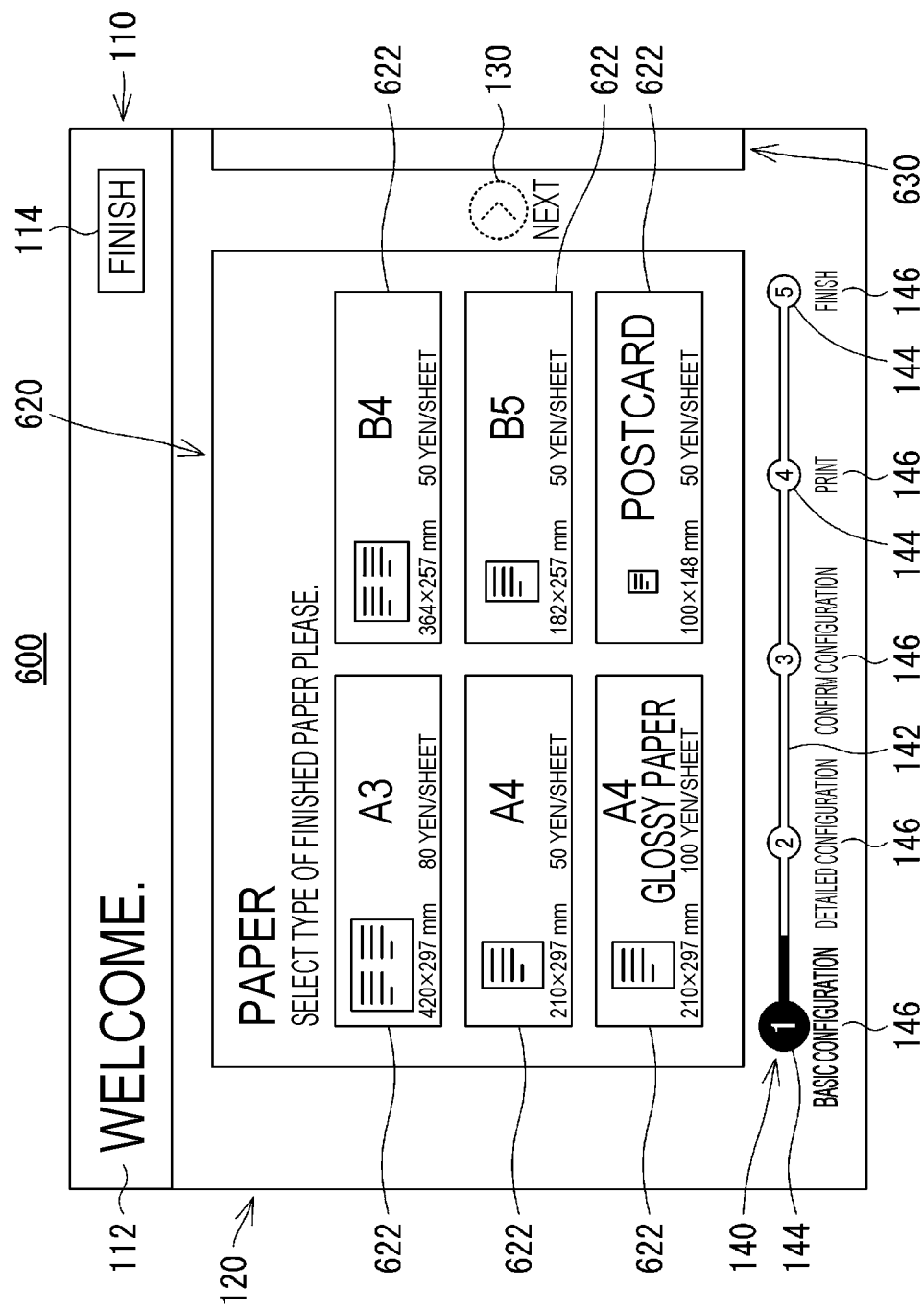
FIG. 17 is a diagram illustrating one example of the paper selection screen.

Then, as illustrated in FIG. 16, an image 620a that has a rectangular shape including a paper selection screen 620, described subsequently, is slid into the main area 120 from the right side of the main area 120 such that the image 620a covers the simple copy menu screen 610. Consequently, as illustrated in FIG. 17, the paper selection screen 620 that has a rectangular shape slightly (almost two sizes) smaller than the main area 120 is displayed at the center of the main area 120 of the copy reception screen 600. A time period that is taken to slide the image 620a including the paper selection screen 620 into the main area 120 is, for example, a relatively short time period shorter than or equal to one second. In other words, the image 620a is slid into the main area 120 at such a speed.

The paper selection screen 620 is a screen for selecting the type of finished sheet as one parameter related to the copy function, that is, one configuration screen related to the copy function. Specifically, a plurality of, for example, six, buttons 622, 622, . . . are disposed vertically in three rows and horizontally in two columns in the paper selection screen 620. Each of the buttons 622, 622, . . . corresponds to the type of finished sheet. More specifically, the buttons 622, 622, . . . correspond to A3 size plain paper, A4 size plain paper, A4 size glossy paper, B4 size plain paper, B5 size plain paper, and postcard, respectively. An appropriate character string and a figure that represent the type, unit price, and the like of the corresponding finished sheet are shown in each of the buttons 622, 622, . . . .

In addition, a part of a configuration confirmation screen 630, described below, that is the subsequent configuration screen is displayed on the horizontally right side of the paper selection screen 620, that is, in a marginal part on the right side of the main area 120. More specifically, the left end part of the configuration confirmation screen 630 is displayed. Therefore, from the display of the left end part of the configuration confirmation screen 630, the user can intuitively recognize the presence of the subsequent configuration screen, that is, the fact that a configuration operation related to the copy function still continues.

Furthermore, a button with a character string "next" shown in its vicinity, that is, a next button 130, is displayed between the right end part of the paper selection screen 620, which is the current configuration target screen, and the left end part of the configuration confirmation screen 630 which is the subsequent configuration screen. The next button 130 functions as a display element that represents the presence of the subsequent configuration screen. Therefore, from the display of the next button 130, the user can intuitively recognize the presence of the subsequent configuration screen, that is, the fact that the configuration operation related to the copy function still continues.

As will be described in detail below, in a case where the configuration operation related to the current configuration target screen is not complete yet, the next button 130 is displayed in light gray and is displayed in a so-called grayed-out manner. In FIG. 17, the grayed-out display of the next button 130 is represented by the next button 130 that is shown in a broken line. In a case where the configuration operation related to the current configuration target screen is already complete, the next button 130 is clearly displayed in black and white. In this case, the next button 130 functions as a subsequent sequence operator that can receive a user operation in order to display the subsequent configuration screen as the configuration target screen at the center of the main area 120, that is, in order to proceed to the subsequent configuration screen.

In addition, a progress status bar 140 is displayed below the paper selection screen 620, that is, in a marginal part below the main area 120. The progress status bar 140 is a display element that graphically displays the progress status of the configuration operation at the current time, that is, a status display element. Specifically, the progress status bar 140 includes a linear bar part 142 and a plurality of, for example, five, stage marks 144, 144, . . . . The linear bar part 142 linearly extends horizontally. The stage marks 144, 144, . . . are disposed at an appropriate (certain) interval on the linear bar part 142. Each stage mark 144 corresponds to a stage of the configuration operation. For example, the stage mark 144 at the left end corresponds to a basic configuration stage that is the initial (first) stage. The stage mark 144 at the right end corresponds to a finish stage that is the final (fifth) stage. A numerical value that represents its corresponding stage is displayed in each stage mark 144. Furthermore, a character string 146 that simply represents the content of the corresponding stage is displayed in the vicinity of, for example, below, each stage mark 144.

The progress status bar 140 graphically displays the progress status as described above by making an appropriate modification corresponding to the progress status of the configuration operation at the current time. In FIG. 17, the stage mark 144 at the left end is displayed in a larger size than the other stage marks 144, 144, . . . . Accordingly, the fact that the progress status of the configuration operation at the current time is in the basic configuration stage is represented. In addition, an appropriate color is set in a part before an approximately middle point (a left part including the approximately middle point) between the stage mark 144 at the left end and the second stage mark 144 from the left end in the progress status bar 140. Accordingly, the progress status of the configuration operation that is in the basic configuration stage at the current time is represented. Furthermore, the character string 146 below the stage mark 144 at the left end is displayed in a larger size than the other character strings 146, 146, . . . . Accordingly, the progress status of the configuration operation that is in the basic configuration stage at the current time is represented. Therefore, the user can intuitively recognize the progress status of the configuration operation at the current time from the display state of the progress status bar 140.

In addition, as will be described in detail below, the progress status bar 140 functions as an operator that can receive a user operation in order to display any configuration screen for which the configuration operation is complete, again as the configuration target screen at the center of the main area 120, that is, in order to jump to the configuration screen for which configuration is complete. The state of the progress status bar 140 as the status display element is one example and is not limited to the described example.

Furthermore, a button in which a character string "finish" is shown, that is, a finish button 114, is disposed in the title bar 112 of the copy reception screen 600 when the paper selection screen 620 as the configuration target screen is displayed at the center of the main area 120. In FIG. 17, while the finish button 114 is disposed in the vicinity of the right end part of the title bar 112, the finish button 114 may be disposed at other positions. In a case where the finish button 114 is pressed, the configuration operation related to the copy function is stopped. Then, an appropriate finish message, not illustrated, is displayed on the display surface of the display 204 for a certain period, and the home screen 100 is displayed again on the display surface of the display 204. The finish button 114 is also disposed in the title bar 112 of the copy reception screen 600 that includes each configuration screen subsequent to the configuration confirmation screen 630 which is the subsequent configuration screen.

Figure 18:
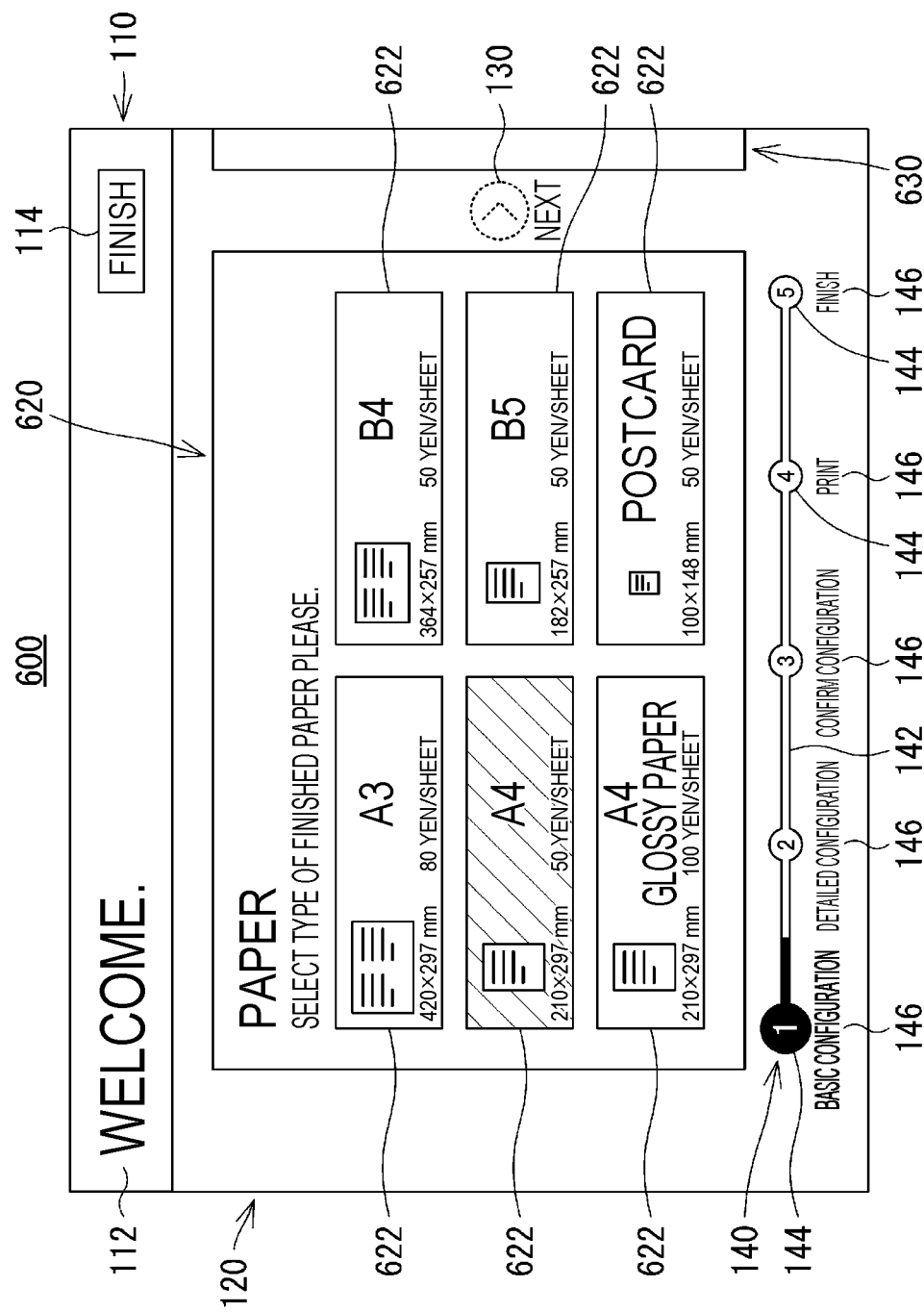
FIG. 18 is a diagram illustrating one example of a state where the display state of the paper selection screen is changed.

In the paper selection screen 620 illustrated in FIG. 17, in a case where any of the buttons 622, 622, . . . for selecting the type of finished sheet is pressed, the display state of the pressed button 622 is changed as illustrated in FIG. 18. FIG. 18 illustrates a state where the button 622 corresponding to A4 size plain paper is pressed. In addition, in FIG. 18, while the pressed button 622 is hatched, the hatching represents an appropriate color set in the pressed button 622. By pressing the button 622, the type of finished sheet corresponding to the pressed button 622 is selected. Data of the selected type of finished sheet is also stored as one parameter related to the copy function and more specifically, is stored as one piece of the copy configuration data 552. The display state of the paper selection screen 620 illustrated in FIG. 18 is maintained for a certain period, for example, a relatively short period shorter than or equal to one second.

Figure 19:
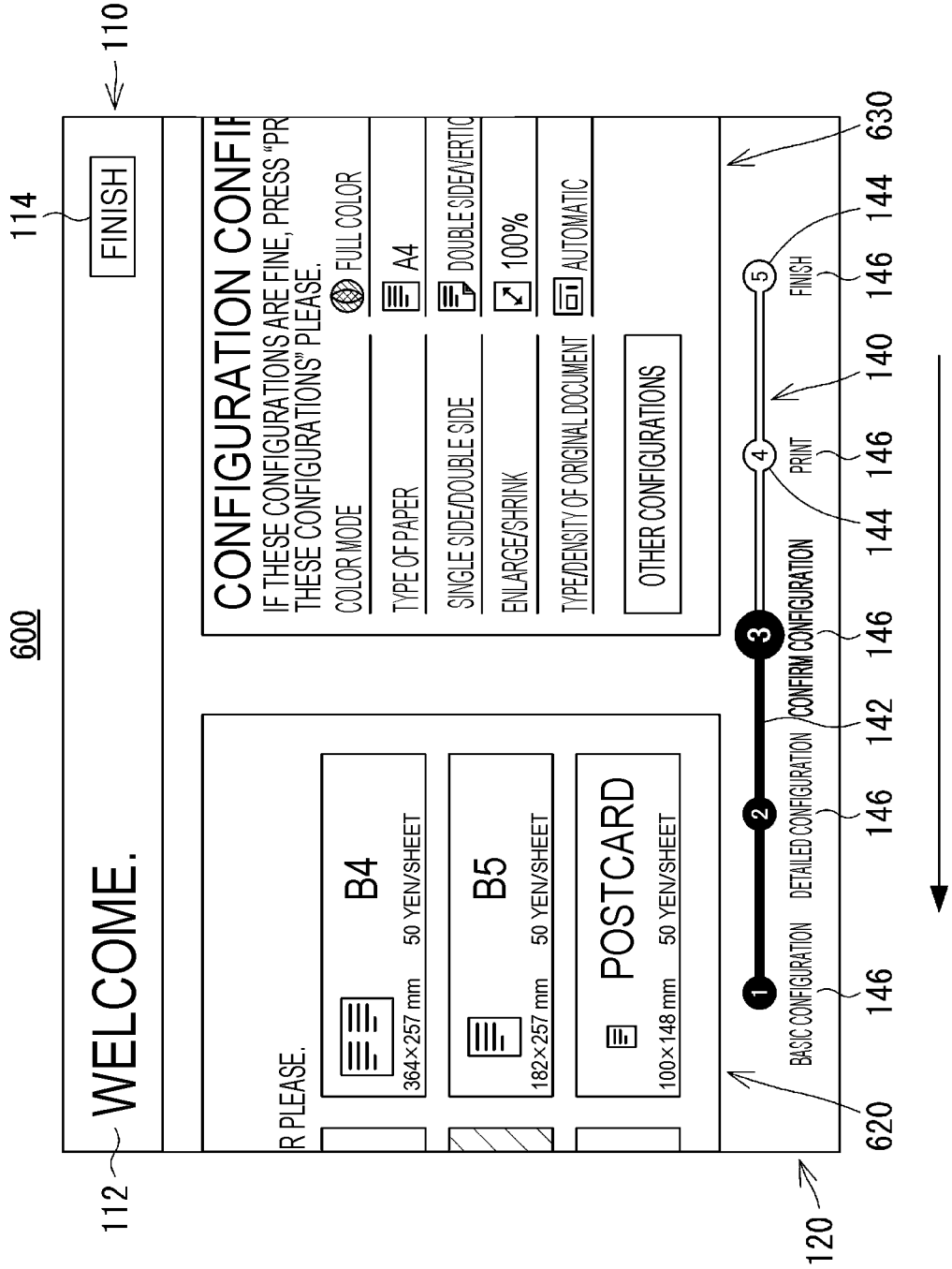
FIG. 19 is a diagram illustrating one example of a state where a configuration confirmation screen is slid into the main area of the copy reception screen.
Figure 20:
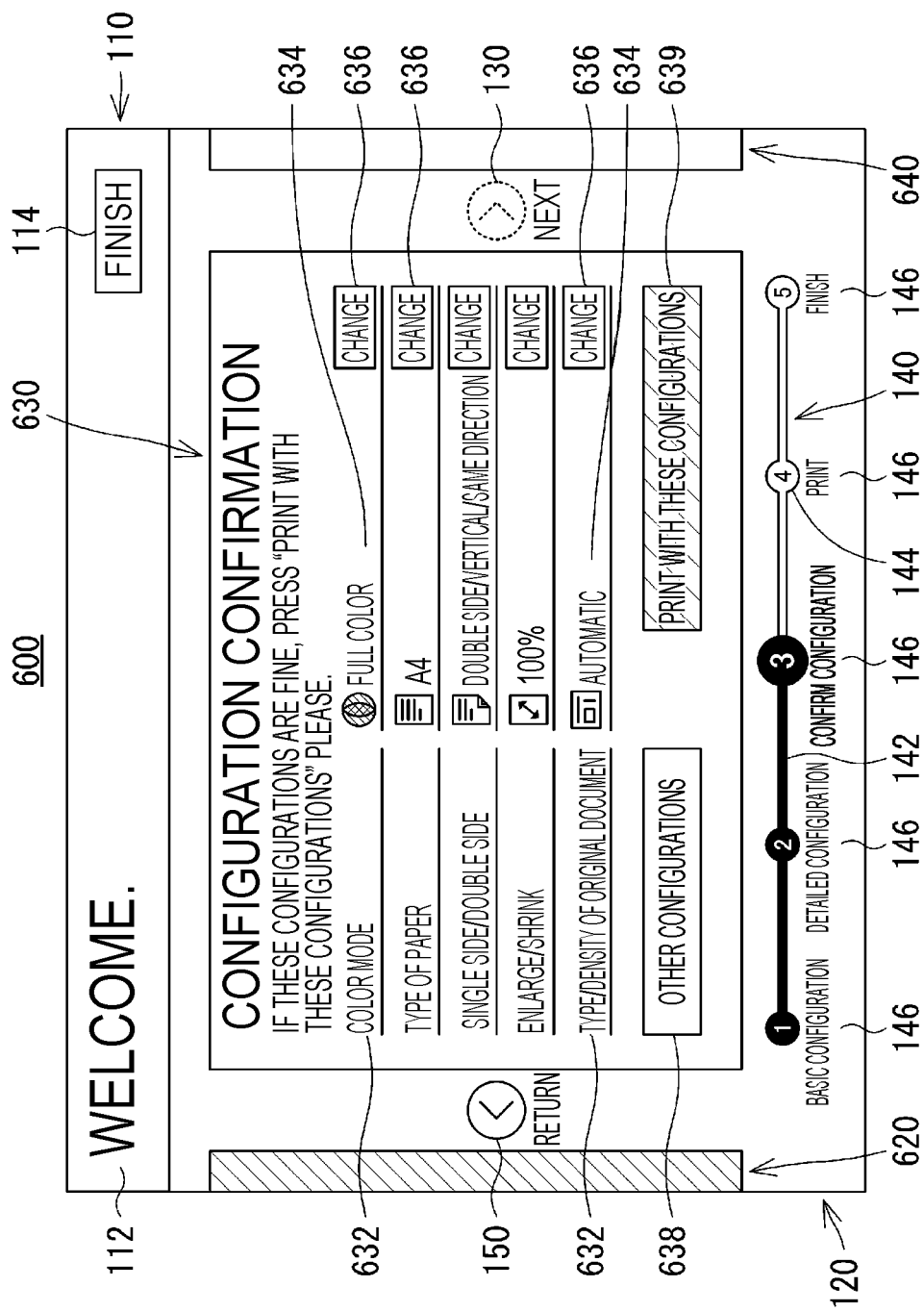
FIG. 20 is a diagram illustrating one example of the configuration confirmation screen.

Then, as illustrated in FIG. 19, the paper selection screen 620 displayed at the center of the main area 120 slides toward the left side of the main area 120. In addition, the configuration confirmation screen 630 which is the subsequent configuration screen slides into the main area 120. As illustrated in FIG. 20, the configuration confirmation screen 630 is displayed as the configuration target screen at the center of the main area 120. The shape and size of the configuration confirmation screen 630 are the same as the shape and size of the paper selection screen 620. A time period that is taken to slide the configuration confirmation screen 630 into the main area 120 is a relatively short time period shorter than or equal to one second. While screens are subsequently slid into the main area 120 as will be described below, the same time period is taken when these screens are slid in.

The configuration confirmation screen 630 is a screen for confirming the current configuration contents of the parameters related to the copy function. The configuration confirmation screen 630 is also one configuration screen related to the copy function. A plurality of character strings 632, 632, . . . that represent basic parameters related to the copy function are vertically disposed in a row at a position on the left side of the configuration confirmation screen 630. A character string 634 that represents the configuration content of the parameter corresponding to each character string 632 is disposed on the horizontally right side of each character string 632. The configuration content of the parameter represented by the character string 634 is based on the copy configuration data 552. Default contents are configured for the parameters other than the parameters configured by the configuration operation (related to the simple copy menu screen 610 and the paper selection screen 620) thus far. Furthermore, a button in which a character string "change" is shown, that is, a change button 636, is disposed on the horizontally right side of the character string 634. The change button 636 is an operator for changing the configuration content of its corresponding parameter. While detailed description is not provided, in a case where the change button 636 is pressed, a screen for changing the configuration content of the parameter corresponding to the change button 636 is displayed. For example, an appropriate dialog box is overlappingly displayed on the configuration confirmation screen 630. The user can change the configuration content of the parameter in the dialog box. The copy configuration data 552 is updated based on the changed configuration content of the parameter.

In addition, a button in which a character string "other configurations" is shown, that is, an other configurations button 638, is disposed at an appropriate position in the configuration confirmation screen 630, for example, at a position below the character strings 632, 632, . . . . The other configurations button 638 is an operator for confirming or changing the contents of the parameters other than the parameters corresponding to the character strings 632, 632, . . . , that is, the other parameters. While detailed description is not provided, in a case where the other configurations button 638 is pressed, a screen that includes information related to the other parameters and their configuration contents is displayed. For example, an appropriate dialog box is overlappingly displayed on the configuration confirmation screen 630. In addition, a button for changing the configuration content of each of the other parameters is displayed in the dialog box. The user can change the configuration content of each of the other parameters by performing an appropriate operation including pressing of the button. In this case, the copy configuration data 552 is also updated based on the changed configuration content of the parameter.

Furthermore, a button in which a character string "print with these configurations" is shown, that is, a print button 639, is disposed at an appropriate position in the configuration confirmation screen 630, for example, at a position below the change buttons 636, 636, . . . . The print button 639 is an operator for providing an instruction to start printing under a condition corresponding to the current configuration contents of the parameters related to the copy function. That is, in a case where the print button 639 is pressed, a process for providing an instruction to start printing under the condition corresponding to the current configuration contents of the parameters related to the copy function is performed. However, even in a case where the print button 639 is pressed, printing is not immediately started. In a case where the print button 639 is pressed, an original document first page reading screen 640 that is the subsequent configuration screen is slid into the main area 120 as will be described below. An appropriate modification, for example, setting an appropriate color, is made on the print button 639. In FIG. 20, while the print button 639 is hatched, the hatching represents an appropriate color set in the print button 639. By making an appropriate modification on the print button 639, the user implicitly perceives that the print button 639 is pressed in order to start printing.

Even in the copy reception screen 600 including the configuration confirmation screen 630 illustrated in FIG. 20, a part of the original document first page reading screen 640 which is the subsequent configuration screen is displayed in a marginal part on the right side of the main area 120. More specifically, the left end part of the original document first page reading screen 640 is displayed. Therefore, from the display of the left end part of the original document first page reading screen 640, the user can intuitively recognize the presence of the subsequent configuration screen, that is, the fact that the configuration operation related to the copy function still continues.

Furthermore, the next button 130 is displayed between the right end part of the configuration confirmation screen 630, which is the current configuration target screen, and the left end part of the original document first page reading screen 640 which is the subsequent configuration screen. Therefore, from the display of the next button 130, the user can intuitively recognize the presence of the subsequent configuration screen, that is, the fact that the configuration operation related to the copy function still continues.

In addition, a part of the paper selection screen 620 which is the previous configuration screen is displayed on the horizontally left side of the configuration confirmation screen 630 which is the current configuration target screen, that is, in a marginal part on the left side of the main area 120. More specifically, the right end part of the paper selection screen 620 is displayed. Therefore, from the display of the right end part of the paper selection screen 620, the user can intuitively recognize the presence of the previous configuration screen, that is, the fact that the configuration confirmation screen 630 which is the current configuration target screen is not the initial configuration screen. Since the configuration operation related to the paper selection screen 620 is already complete, an appropriate modification, for example, setting an appropriate color, is made on the right end part of the paper selection screen 620 in order to represent the completion of configuration. In FIG. 20, while the right end part of the paper selection screen 620 is hatched, the hatching represents an appropriate color set in the right end part of the paper selection screen 620. Therefore, from an appropriate color set in the right end part of the paper selection screen 620, the user can intuitively recognize that the configuration operation related to the paper selection screen 620 is already complete, that is, configuration on the paper selection screen 620 is complete.

A button with a character string "return" shown in its vicinity, that is, a return button 150, is displayed between the left end part of the configuration confirmation screen 630, which is the current configuration target screen, and the right end part of the paper selection screen 620 which is the previous configuration screen. Therefore, from the display of the return button 150, the user can intuitively recognize the presence of the previous configuration screen, that is, the fact that the configuration confirmation screen 630 which is the current configuration target screen is not the initial configuration screen.

In addition, the return button 150 functions as a previous sequence operator that can receive a user operation in order to display the previous configuration screen as the configuration target screen at the center of the main area 120 again, that is, in order to return to the previous configuration screen. For example, in the copy reception screen 600 illustrated in FIG. 20, in a case where the return button 150 is pressed, the paper selection screen 620 which is the previous configuration screen is displayed again as the configuration target screen at the center of the main area 120. Specifically, the configuration confirmation screen 630 that is displayed at the center of the main area 120 thus far slides toward the right side of the main area 120. In addition, the paper selection screen 620 which is the previous configuration screen is slid into the main area 120. The paper selection screen 620 is displayed again as the configuration target screen at the center of the main area 120. That is, the copy reception screen 600 returns to the state illustrated in FIG. 17. The return button 150 that functions as an operator is not displayed in a grayed-out manner and is clearly displayed in black and white.

Furthermore, even in the copy reception screen 600 illustrated in FIG. 20, the progress status bar 140 is displayed in a marginal part below the main area 120. However, the display state of the progress status bar 140 in FIG. 20 is different from, for example, the display state of the progress status bar 140 in FIG. 17. That is, in the progress status bar 140 in FIG. 20, the stage mark 144 at the center is displayed in a larger size than the other stage marks 144, 144, . . . .

Accordingly, the fact that the progress status of the configuration operation at the current time is in a configuration content confirmation stage is represented. In addition, an appropriate color is set in a part before the stage mark 144 at the center (a left part including the stage mark 144 at the center) in the progress status bar 140. Accordingly, the fact that the progress status of the configuration operation at the current time is in the configuration content confirmation stage is represented. The character string 146 below the stage mark 144 at the center is displayed in a larger size than the other character strings 146, 146, . . . . Accordingly, the fact that the progress status of the configuration operation at the current time is in the configuration content confirmation stage is represented. In addition, the character strings 146, 146, . . . (three on the left side) before the character string 146 at the center are displayed in a larger size than the other character strings 146 and 146 (two on the right side). As illustrated in FIG. 19, when the configuration target screen displayed at the center of the main area 120 is switched to the configuration confirmation screen 630 from the paper selection screen 620, the display state of the progress status bar 140 is changed to the same display state as in FIG. 20.

Figure 21:
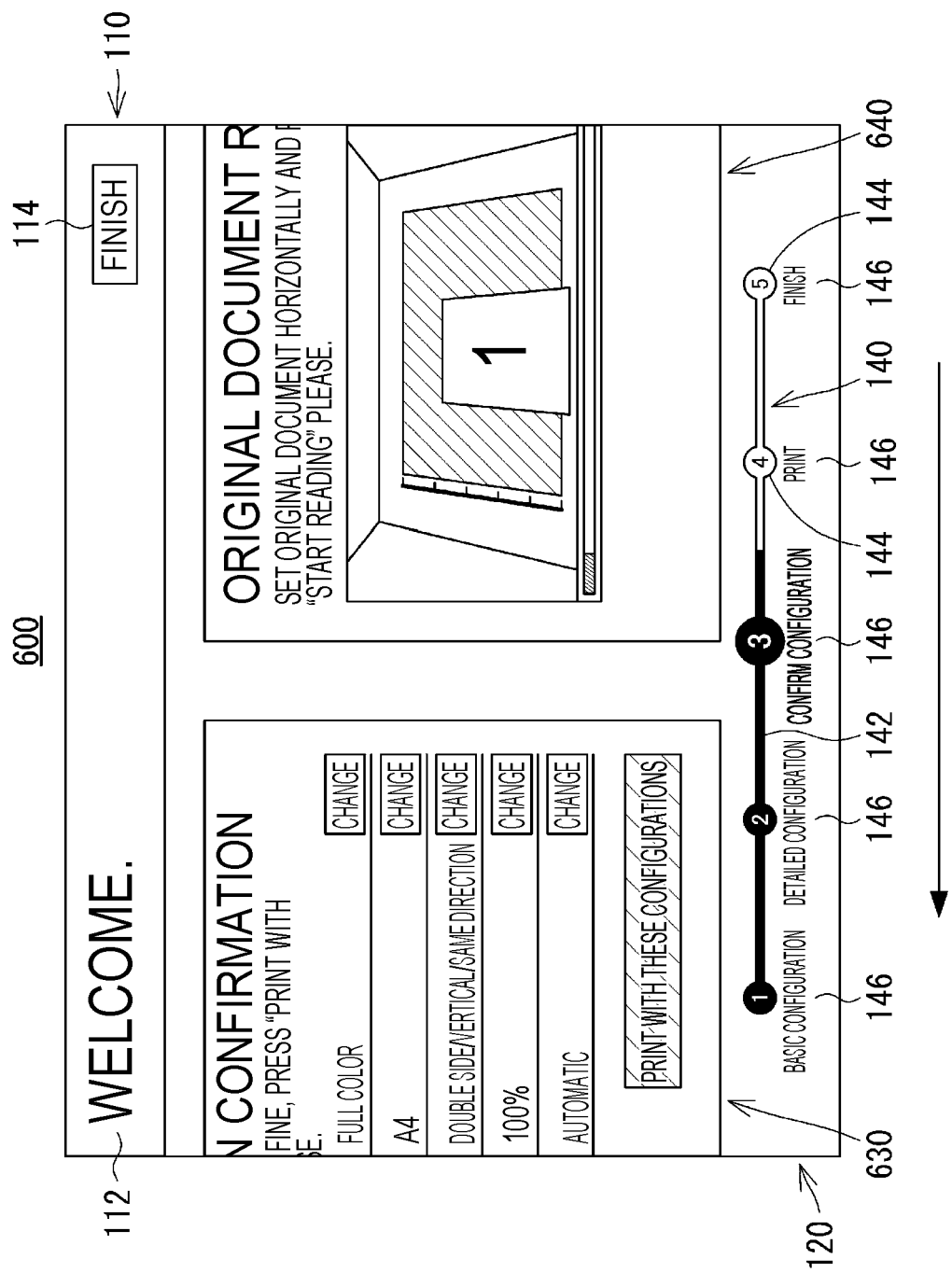
FIG. 21 is a diagram illustrating one example of a state where an original document first page reading screen is slid into the main area of the copy reception screen.
Figure 22:
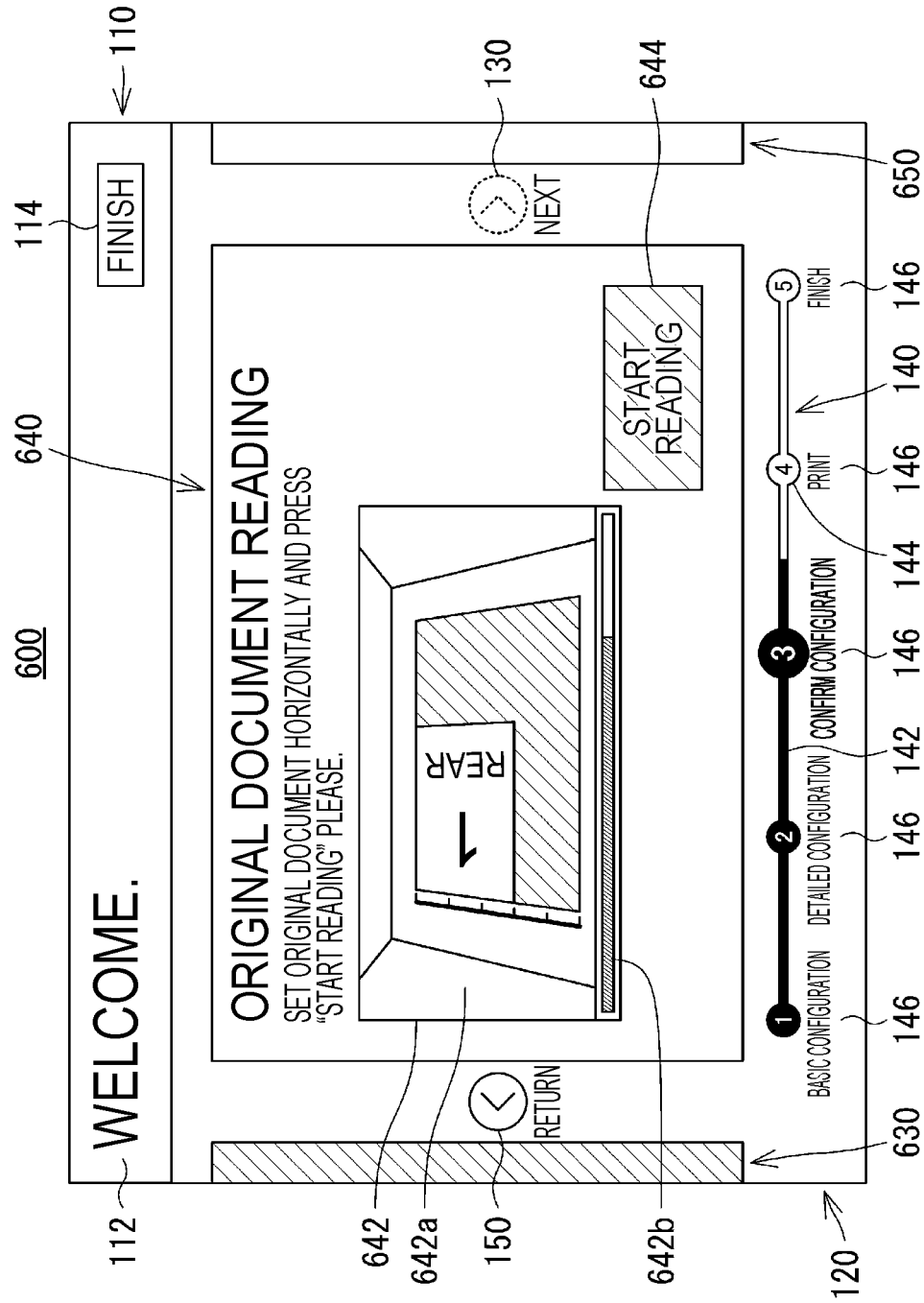
FIG. 22 is a diagram illustrating one example of the original document first page reading screen.

In the configuration confirmation screen 630 in the copy reception screen 600 illustrated in FIG. 20, in a case where the print button 639 is pressed, the original document first page reading screen 640 which is the subsequent configuration screen is slid into the main area 120 as illustrated in FIG. 21. As illustrated in FIG. 22, the original document first page reading screen 640 is displayed as the configuration target screen at the center of the main area 120. The shape and size of the original document first page reading screen 640 are the same as the shape and size of the configuration confirmation screen 630 which is the previous configuration screen, that is, the same as the shape and size of the paper selection screen 620 which is the initial configuration screen.

The original document first page reading screen 640 is a screen for reading the first page of the original document related to the double side copy mode, that is, the original document that is printed on the front surface of the finished sheet. The original document first page reading screen 640 is also one configuration screen related to the copy function. Specifically, a dynamic image display area 642 having a rectangular shape is disposed at a position slightly on the left side of the center of the original document first page reading screen 640. A dynamic image 642*a* that illustrates how to read the first page of the original document is displayed in the dynamic image display area 642. In addition, a horizontally long linear bar that represents the current reproduction position of the dynamic image 642*a*, that is, a so-called seek bar 642*b*, is displayed in the lower part of the dynamic image display area 642.

Furthermore, a button in which a character string "start reading" is shown, that is, a start reading button 644, is disposed at an appropriate position in the original document first page reading screen 640, for example, a position close to the lower right corner of the original document first page reading screen 640. The start reading button 644 is an operator for providing an instruction to start reading the first page of the original document. An appropriate modification, for example, setting an appropriate color, is made on the start reading button 644. By making an appropriate modification on the start reading button 644, the user implicitly perceives that the start reading button 644 is pressed in order to start reading the first page of the original document.

Even in the copy reception screen 600 including the original document first page reading screen 640 illustrated in FIG. 22, a part of an original document second page reading screen 650 that is the subsequent configuration screen is displayed in a marginal part on the right side of the main area 120. More specifically, the left end part of the original document second page reading screen 650 is displayed. The next button 130 is displayed between the right end part of the original document first page reading screen 640, which is the current configuration target screen, and the left end part of the original document second page reading screen 650 which is the subsequent configuration screen.

Furthermore, a part of the configuration confirmation screen 630 which is the previous configuration screen is displayed in a marginal part on the left side of the main area 120. More specifically, the right end part of the configuration confirmation screen 630 is displayed. An appropriate modification, for example, setting an appropriate color, is made on the right end part of the configuration confirmation screen 630 in order to represent the completion of configuration on the configuration confirmation screen 630. In addition, the return button 150 is displayed between the left end part of the original document first page reading screen 640, which is the current configuration target screen, and the right end part of the configuration confirmation screen 630 which is the previous configuration screen. In addition, in the copy reception screen 600 illustrated in FIG. 22, in a case where the return button 150 is pressed, the configuration confirmation screen 630 which is the previous configuration screen is displayed as the configuration target screen at the center of the main area 120. Consequently, the display surface of the display 204 returns to the state illustrated in FIG. 20.

In addition, even in the copy reception screen 600 illustrated in FIG. 22, the progress status bar 140 is displayed in a marginal part below the main area 120. However, the display state of the progress status bar 140 in FIG. 22 is slightly different from, for example, the display state of the progress status bar 140 in FIG. 20. Specifically, in the progress status bar 140 in FIG. 22, the stage mark 144 at the center is displayed in a large size, and the character string 146 below the stage mark 144 at the center is displayed in a large size. This point is the same as the display state of the progress status bar 140 in FIG. 20. However, in the progress status bar 140 in FIG. 22, an appropriate color is set in a part before an approximately middle point between the stage mark 144 at the center and its adjacent stage mark 144 on the right side (second from the right end). This point is different from the display state of the progress status bar 140 in FIG. 20. As illustrated in FIG. 21, when the configuration target screen displayed in the main area 120 is switched to the original document first page reading screen 640 from the configuration confirmation screen 630, the display state of the progress status bar 140 is changed to the same display state as in FIG. 22.

Figure 23:
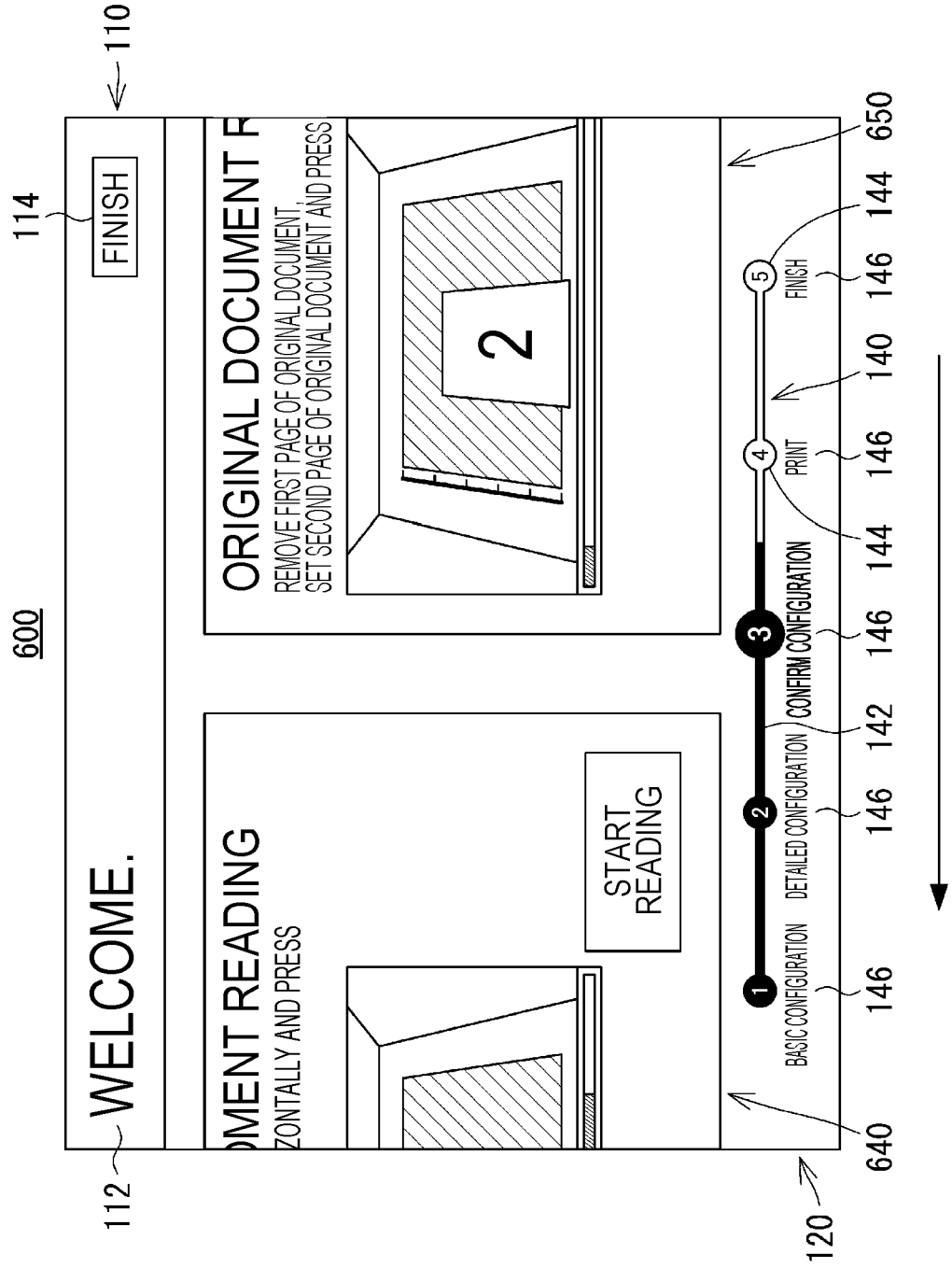
FIG. 23 is a diagram illustrating one example of a state where an original document second page reading screen is slid into the main area of the copy reception screen.

In the original document first page reading screen 640 in the copy reception screen 600 illustrated in FIG. 22, in a case where the start reading button 644 is pressed after the first page of the original document is set on the original document setting table of the image reading unit 302, the image reading process for reading an image of the first page of the original document is started by the image reading unit 302. The image reading data related to the first page of the original document acquired by the image reading process is stored as one piece of the transmission and reception data 548 illustrated in FIG. 10. In a case where the image reading process is finished, the original document second page reading screen 650 which is the subsequent configuration screen is slid into the main area 120 as illustrated in FIG. 23.

Figure 24:
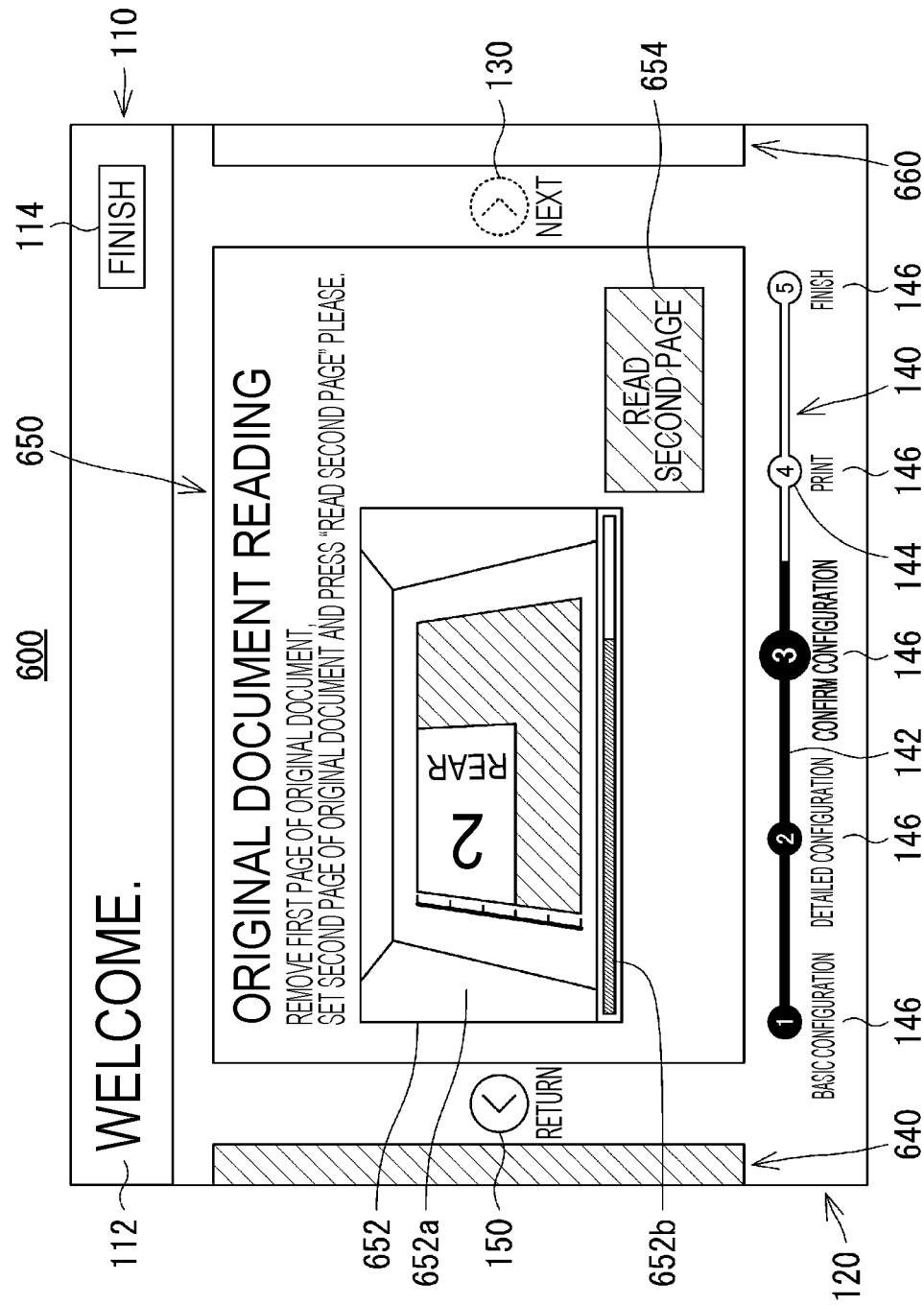
FIG. 24 is a diagram illustrating one example of the original document second page reading screen.

As illustrated in FIG. 24, the original document second page reading screen 650 is displayed as the configuration target screen at the center of the main area 120. The shape and size of the original document second page reading screen 650 are the same as the shape and size of the paper selection screen 620 which is the initial configuration screen.

The original document second page reading screen 650 is a screen for reading the second page of the original document related to the double side copy mode, that is, the original document that is printed on the rear surface of the finished sheet. The original document second page reading screen 650 is also one configuration screen related to the copy function. Specifically, a dynamic image display area 652 having a rectangular shape is disposed at a position slightly on the left side of the center of the original document second page reading screen 650. A dynamic image 652a that illustrates how to read the second page of the original document is displayed in the dynamic image display area 652. In addition, a horizontally long seek bar 652b that represents the current reproduction position of the dynamic image 652a is displayed in the lower part of the dynamic image display area 652.

Furthermore, a button in which a character string "read second page" is shown, that is, a read second page button 654, is disposed at an appropriate position in the original document second page reading screen 650, for example, a position close to the lower right corner of the original document second page reading screen 650. The read second page button 654 is an operator for providing an instruction to start reading the second page of the original document. An appropriate modification, for example, setting an appropriate color, is made on the read second page button 654. By making an appropriate modification on the read second page button 654, the user implicitly perceives that the read second page button 654 is pressed in order to start reading the second page of the original document.

Even in the copy reception screen 600 including the original document second page reading screen 650 illustrated in FIG. 24, a part of a final confirmation screen 660, described below, that is the subsequent configuration screen is displayed in a marginal part on the right side of the main area 120. More specifically, the left end part of the final confirmation screen 660 is displayed. In addition, the next button 130 is displayed between the right end part of the original document second page reading screen 650, which is the current configuration target screen, and the left end part of the final confirmation screen 660 which is the subsequent configuration screen.

In addition, a part of the original document first page reading screen 640 which is the previous configuration screen is displayed in a marginal part on the left side of the main area 120. More specifically, the right end part of the original document first page reading screen 640 is displayed. An appropriate modification, for example, setting an appropriate color, is made on the right end part of the original document first page reading screen 640 in order to represent the completion of configuration on the original document first page reading screen 640, more precisely, the fact that the image reading process related to the first page of the original document is already complete. In addition, the return button 150 is displayed between the left end part of the original document second page reading screen 650, which is the current configuration target screen, and the right end part of the original document first page reading screen 640 which is the previous configuration screen. In addition, in the copy reception screen 600 illustrated in FIG. 24, in a case where the return button 150 is pressed by the user, the original document first page reading screen 640 which is the previous configuration screen is displayed as the configuration target screen at the center of the main area 120. Consequently, the display surface of the display 204 returns to the state illustrated in FIG. 22.

Furthermore, even in the copy reception screen 600 illustrated in FIG. 24, the progress status bar 140 is displayed in a marginal part below the main area 120. The display state of the progress status bar 140 in FIG. 24 is the same as the display state of the progress status bar 140 in FIG. 22. In addition, the display state of the progress status bar 140 in FIG. 23 is the same as the display state of the progress status bar 140 in FIG. 24.

Figure 25:
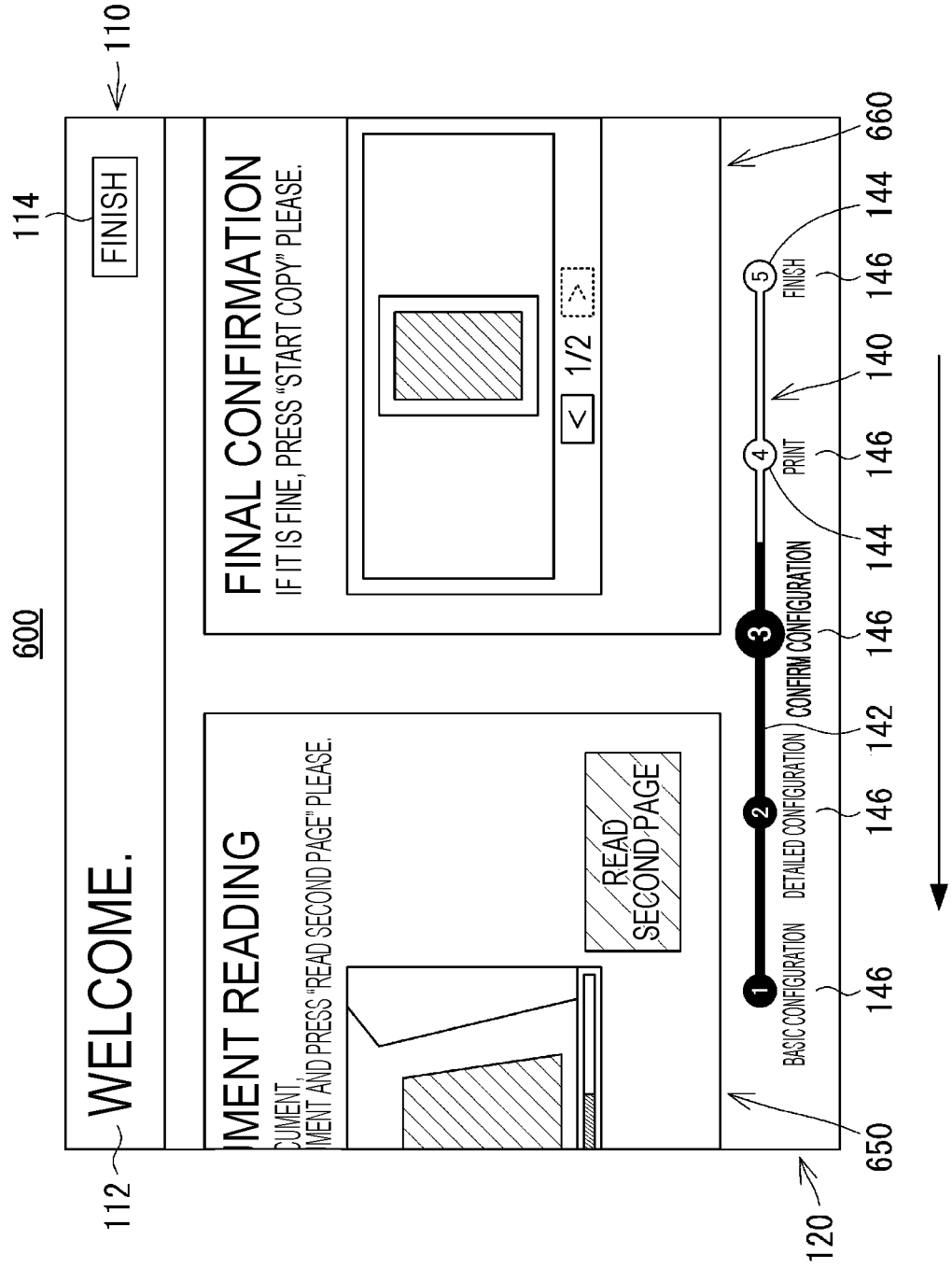
FIG. 25 is a diagram illustrating one example of a state where a final confirmation screen is slid into the main area of the copy reception screen.
Figure 26:
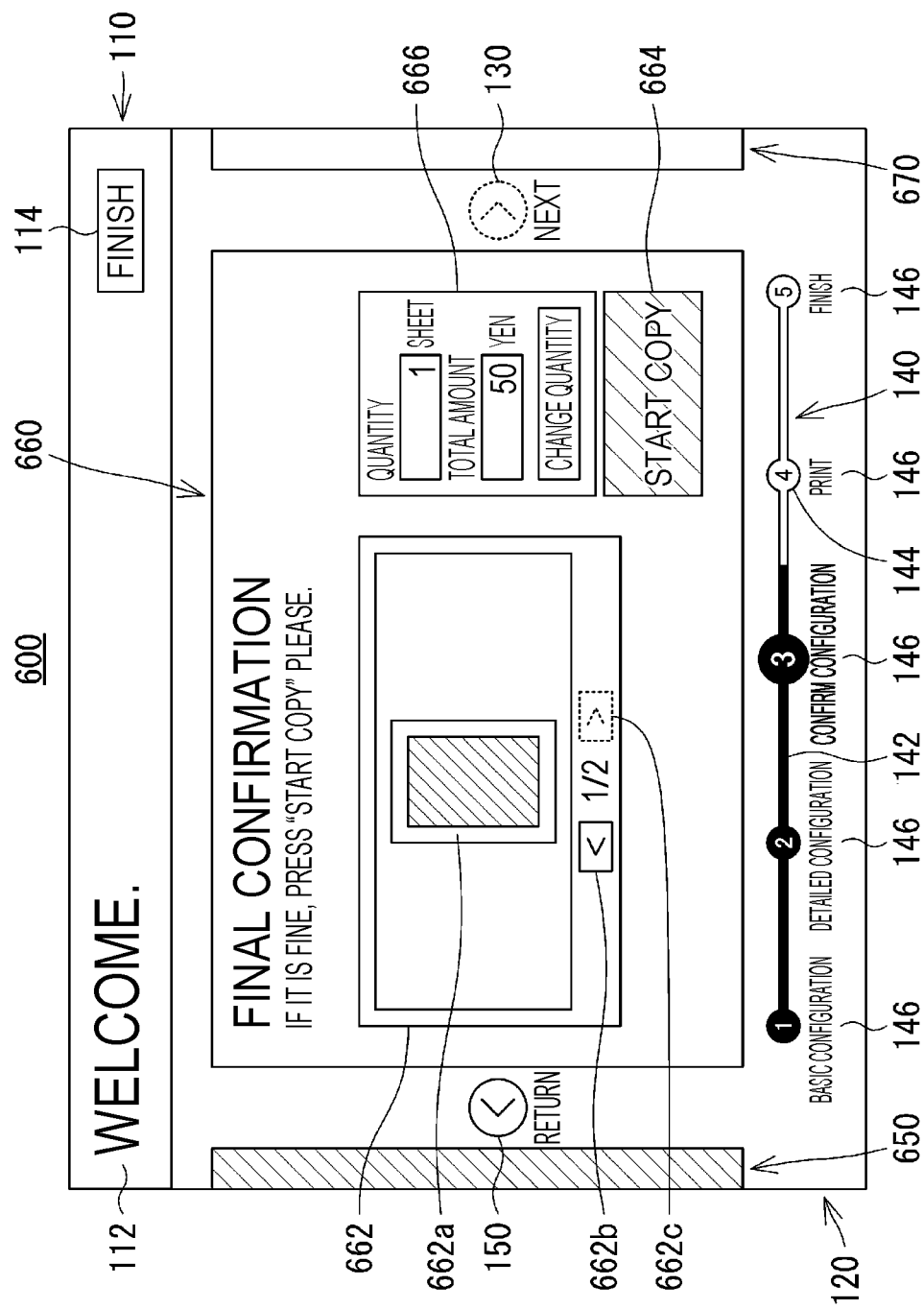
FIG. 26 is a diagram illustrating one example of the final confirmation screen.

In the original document second page reading screen 650 in the copy reception screen 600 illustrated in FIG. 24, in a case where the read second page button 654 is pressed after the second page of the original document is set on the original document setting table of the image reading unit 302, the image reading process for reading an image of the second page of the original document is started by the image reading unit 302. The image reading data related to the second page of the original document acquired by the image reading process is also stored as one piece of the transmission and reception data 548 illustrated in FIG. 10. In a case where the image reading process related to the second page of the original document is finished, for example, the final confirmation screen 660 which is the subsequent configuration screen is slid in the same manner as illustrated in FIG. 19 into the main area 120 as illustrated in FIG. 25. As illustrated in FIG. 26, the original document second page reading screen 650 is displayed as the configuration target screen at the center of the main area 120. The shape and size of the original document second page reading screen 650 are the same as the shape and size of the paper selection screen 620 which is the initial configuration screen.

The final confirmation screen 660 is a screen for confirming the image reading result of each of the first page of the original document and the second page of the original document by the image reading process. The final confirmation screen 660 is also one configuration screen related to the copy function. Specifically, a read image preview area 662 having a rectangular shape is disposed at a position slightly on the left side of the center of the final confirmation screen 660. A preview image 662a that represents the reading result of each of the first page of the original document and the second page of the original document is displayed in the read image preview area 662. While detailed illustration is not provided, by pressing two buttons 662b and 662c disposed in the lower part of the read image preview area 662, the preview image 662a rotates about an axis of a vertical (extending in the up-down direction) imaginary line that passes through the center of the preview image 662a. From the preview image 662a, the user can recognize the reading result of each of the first page of the original document and the second page of the original document.

Furthermore, a button in which a character string "start copy" is shown, that is, a start copy button 664, is disposed at an appropriate position in the final confirmation screen 660, for example, a position close to the lower right corner of the final confirmation screen 660. The start copy button 664 is an operator for providing an instruction to start printing. At first glance, the start copy button 664 is considered to be the same operator as the print button 639 in the configuration confirmation screen 630 illustrated in FIG. 20. In the same manner as the print button 639, even in a case where the start copy button 664 is pressed, printing is not immediately started. In a case where the start copy button 664 is pressed, a payment method selection screen 670 that is the subsequent configuration screen is slid into the main area 120 as will be described below. An appropriate modification, for example, setting an appropriate color, is made on the start copy button 664. By making an appropriate modification on the start copy button 664, the user implicitly perceives that the start copy button 664 is pressed in order to start printing.

In addition, a quantity display area 666 having a rectangular shape is disposed at an appropriate position in the final confirmation screen 660, for example, above the start copy button 664. Information that is based on the current configuration contents of a part of the parameters related to the copy function is displayed in the quantity display area 666. For example, information related to the printed quantity and the total amount of charge related to printing is displayed. While specific description is not provided, the printed quantity in the information displayed in the quantity display area 666 can be changed to any quantity. In a case where the printed quantity is changed, the total amount of charge related to printing is also changed consequently. The copy configuration data 552 is also changed depending on the change in content.

Even in the copy reception screen 600 including the final confirmation screen 660 illustrated in FIG. 26, a part of the payment method selection screen 670 which is the subsequent configuration screen is displayed in a marginal part on the right side of the main area 120. More specifically, the left end part of the payment method selection screen 670 is displayed. In addition, the next button 130 is displayed between the right end part of the final confirmation screen 660, which is the current configuration target screen, and the left end part of the payment method selection screen 670 which is the subsequent configuration screen.

A part of the original document second page reading screen 650 which is the previous configuration screen is displayed in a marginal part on the left side of the main area 120. More specifically, the right end part of the original document second page reading screen 650 is displayed. An appropriate modification, for example, setting an appropriate color, is made on the right end part of the original document second page reading screen 650 in order to represent the completion of configuration on the original document second page reading screen 650, more precisely, the fact that the image reading process related to the second page of the original document is already complete. In addition, the return button 150 is displayed between the left end part of the final confirmation screen 660, which is the current configuration target screen, and the right end part of the original document second page reading screen 650 which is the previous configuration screen. In addition, in the copy reception screen 600 illustrated in FIG. 26, in a case where the return button 150 is pressed by the user, the original document second page reading screen 650 which is the previous configuration screen is displayed as the configuration target screen at the center of the main area 120. Consequently, the display surface of the display 204 returns to the state illustrated in FIG. 24.

Furthermore, even in the copy reception screen 600 illustrated in FIG. 26, the progress status bar 140 is displayed in a marginal part below the main area 120. The display state of the progress status bar 140 in FIG. 26 is the same as the display state of the progress status bar 140 in FIG. 22. In addition, the display state of the progress status bar 140 in FIG. 25 is the same as the display state of the progress status bar 140 in FIG. 26.

Figure 27:
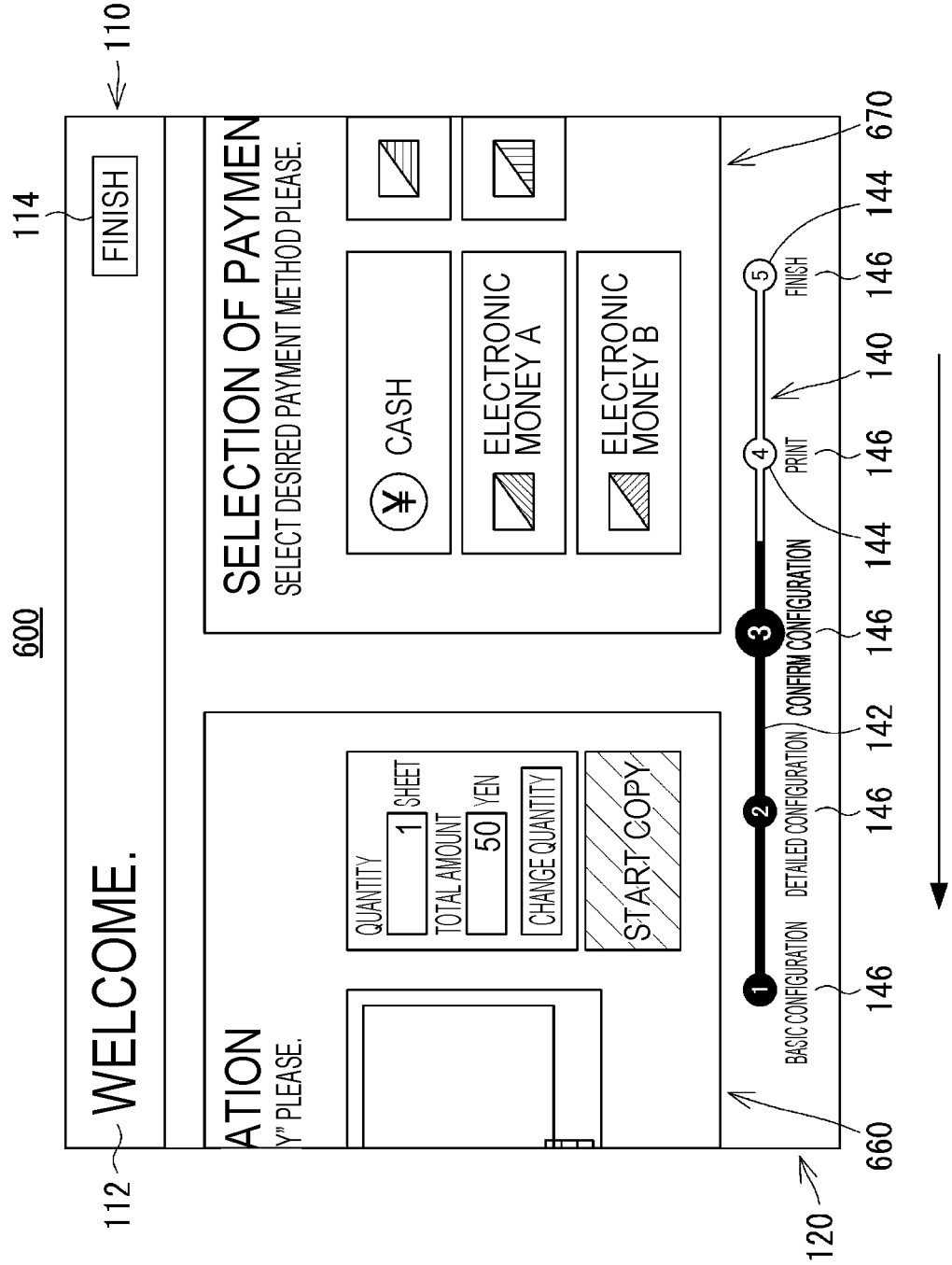
FIG. 27 is a diagram illustrating one example of a state where a payment method selection screen is slid into the main area of the copy reception screen.
Figure 28:
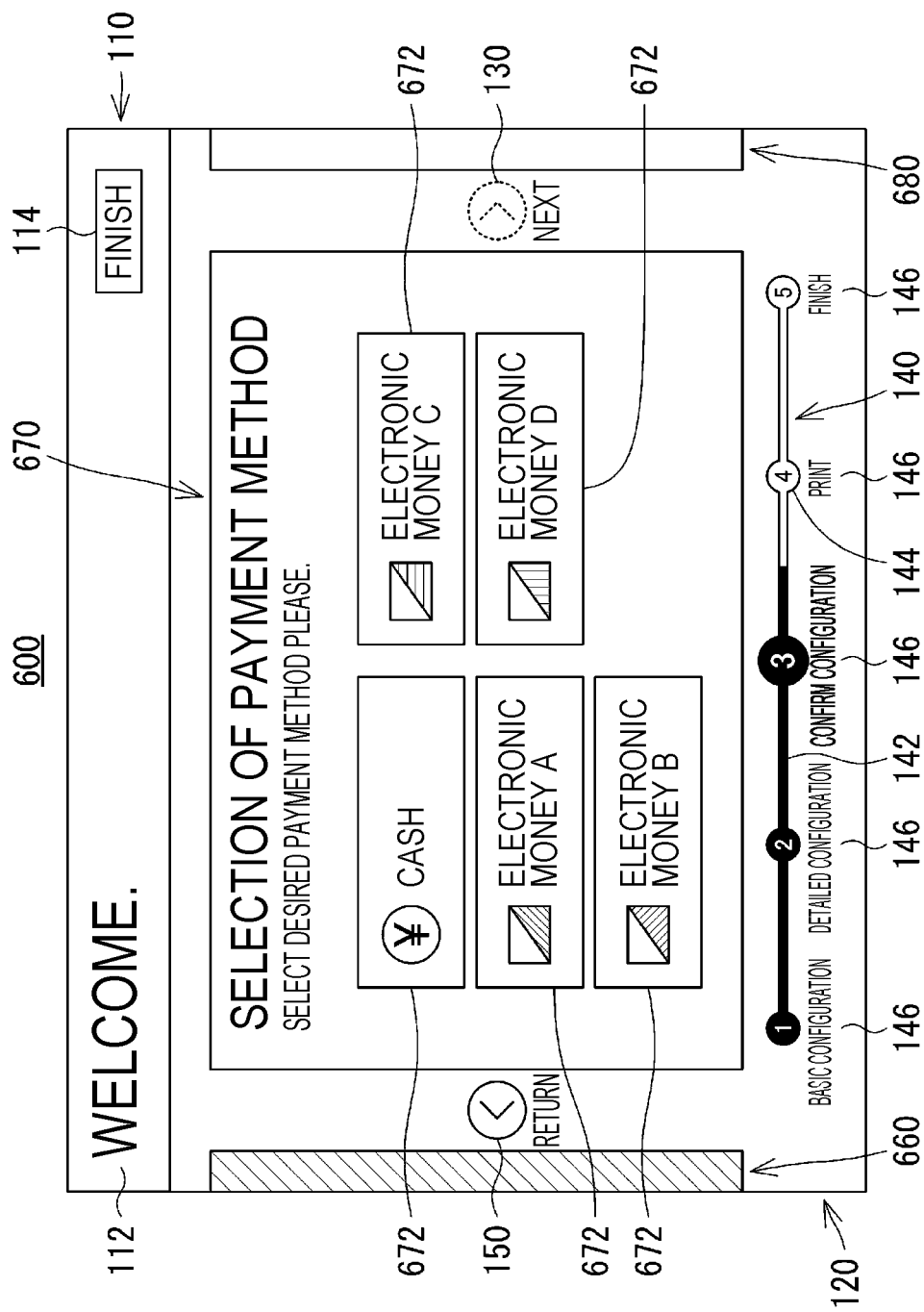
FIG. 28 is a diagram illustrating one example of the payment method selection screen.

In the final confirmation screen 660 in the copy reception screen 600 illustrated in FIG. 26, in a case where the start copy button 664 is pressed, the payment method selection screen 670 which is the subsequent configuration screen is slid into the main area 120 as illustrated in FIG. 27. As illustrated in FIG. 28, the payment method selection screen 670 is displayed as the configuration target screen at the center of the main area 120. The shape and size of the payment method selection screen 670 are the same as the shape and size of the paper selection screen 620 which is the initial configuration screen.

The payment method selection screen 670 is a screen for selecting a payment method for the charge related to printing. The payment method selection screen 670 is also one configuration screen related to the copy function. A plurality of, for example, five, buttons 672, 672, . . . are disposed in the payment method selection screen 670. Three of the five buttons 672, 672, . . . are vertically lined up in a row at a position on the left side of the payment method selection screen 670. The remaining two buttons 672 and 672 are vertically lined up in a row at a position on the right side of the payment method selection screen 670. The arrangement of the buttons 672, 672, . . . is one example and is not limited to the state illustrated in FIG. 28. Each of the buttons 672, 672, . . . corresponds to a payment method. More specifically, the buttons 672, 672, . . . correspond to payment methods using cash, electronic money A, electronic money B, electronic money C, and electronic money D, respectively. An appropriate character string and a figure that represent the corresponding payment method are shown in each of the buttons 672, 672, . . . .

Even in the copy reception screen 600 including the payment method selection screen 670 illustrated in FIG. 28, a part of a payment process screen 680, described below, that is the subsequent configuration screen is displayed in a marginal part on the right side of the main area 120. More specifically, the left end part of the payment process screen 680 is displayed. In addition, the next button 130 is displayed between the right end part of the payment method selection screen 670, which is the current configuration target screen, and the left end part of the payment process screen 680 which is the subsequent configuration screen.

A part of the final confirmation screen 660 which is the previous configuration screen is displayed in a marginal part on the left side of the main area 120. More specifically, the right end part of the final confirmation screen 660 is displayed. An appropriate modification, for example, setting an appropriate color, is made on the right end part of the final confirmation screen 660 in order to represent the completion of configuration on the final confirmation screen 660. In addition, the return button 150 is displayed between the left end part of the payment method selection screen 670, which is the current configuration target screen, and the right end part of the final confirmation screen 660 which is the previous configuration screen. In addition, in the copy reception screen 600 illustrated in FIG. 28, in a case where the return button 150 is pressed by the user, the final confirmation screen 660 which is the previous configuration screen is displayed as the configuration target screen at the center of the main area 120. Consequently, the display surface of the display 204 returns to the state illustrated in FIG. 26.

Furthermore, even in the copy reception screen 600 illustrated in FIG. 28, the progress status bar 140 is displayed in a marginal part below the main area 120. The display state of the progress status bar 140 in FIG. 28 is the same as the display state of the progress status bar 140 in FIG. 22. In addition, the display state of the progress status bar 140 in FIG. 27 is the same as the display state of the progress status bar 140 in FIG. 28.

Figure 29:
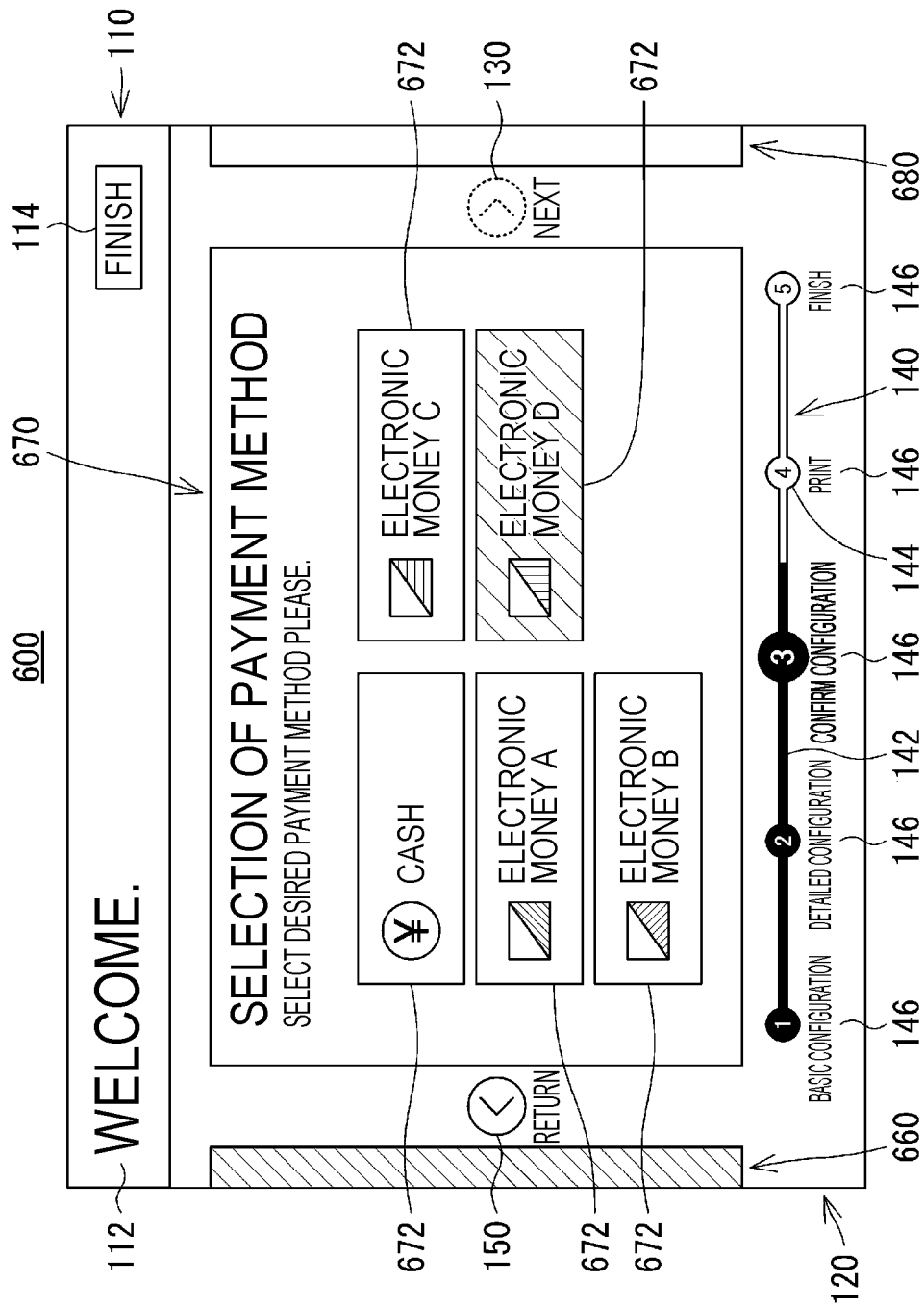
FIG. 29 is a diagram illustrating one example of a state where the display state of the payment method selection screen is changed.

In the payment method selection screen 670 in the copy reception screen 600 illustrated in FIG. 28, in a case where any of the buttons 672, 672, . . . for selecting a payment method is pressed, the display state of the pressed button 672 is changed as illustrated in FIG. 29. FIG. 29 illustrates a state where the button 672 corresponding to the payment method using electronic money D is pressed. In addition, in FIG. 29, while the pressed button 672 is hatched, the hatching represents an appropriate color set in the pressed button 672. By pressing the button 672, the payment method corresponding to the pressed button 672 is selected. Data of the selected payment method is also stored as one parameter related to the copy function and more specifically, is stored as one piece of the copy configuration data 552. The display state of the payment method selection screen 670 illustrated in FIG. 29 is maintained for a certain period, for example, a relatively short period shorter than or equal to one second.

Figure 30:
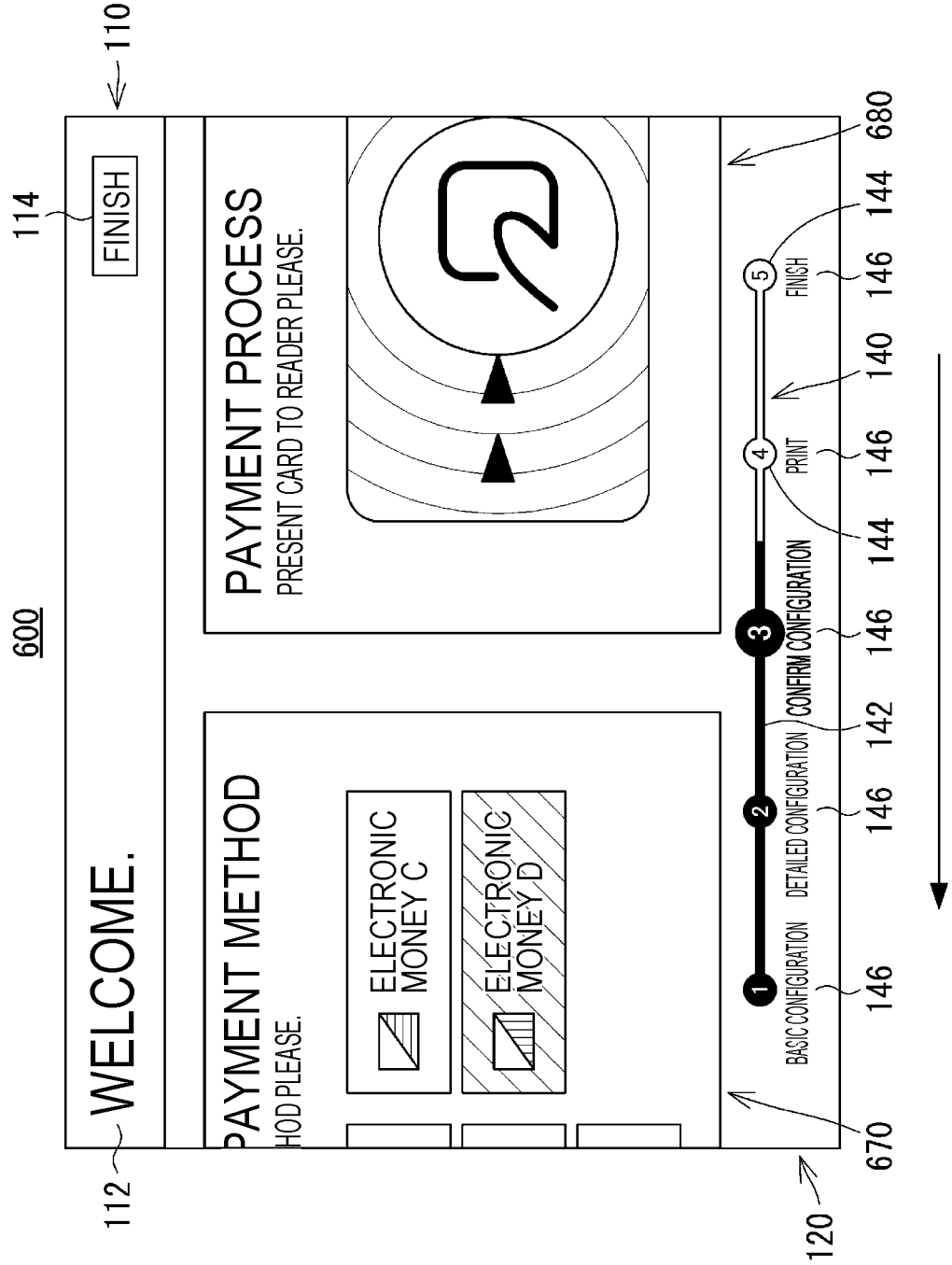
FIG. 30 is a diagram illustrating one example of a state where a payment process screen is slid into the main area of the copy reception screen.
Figure 31:
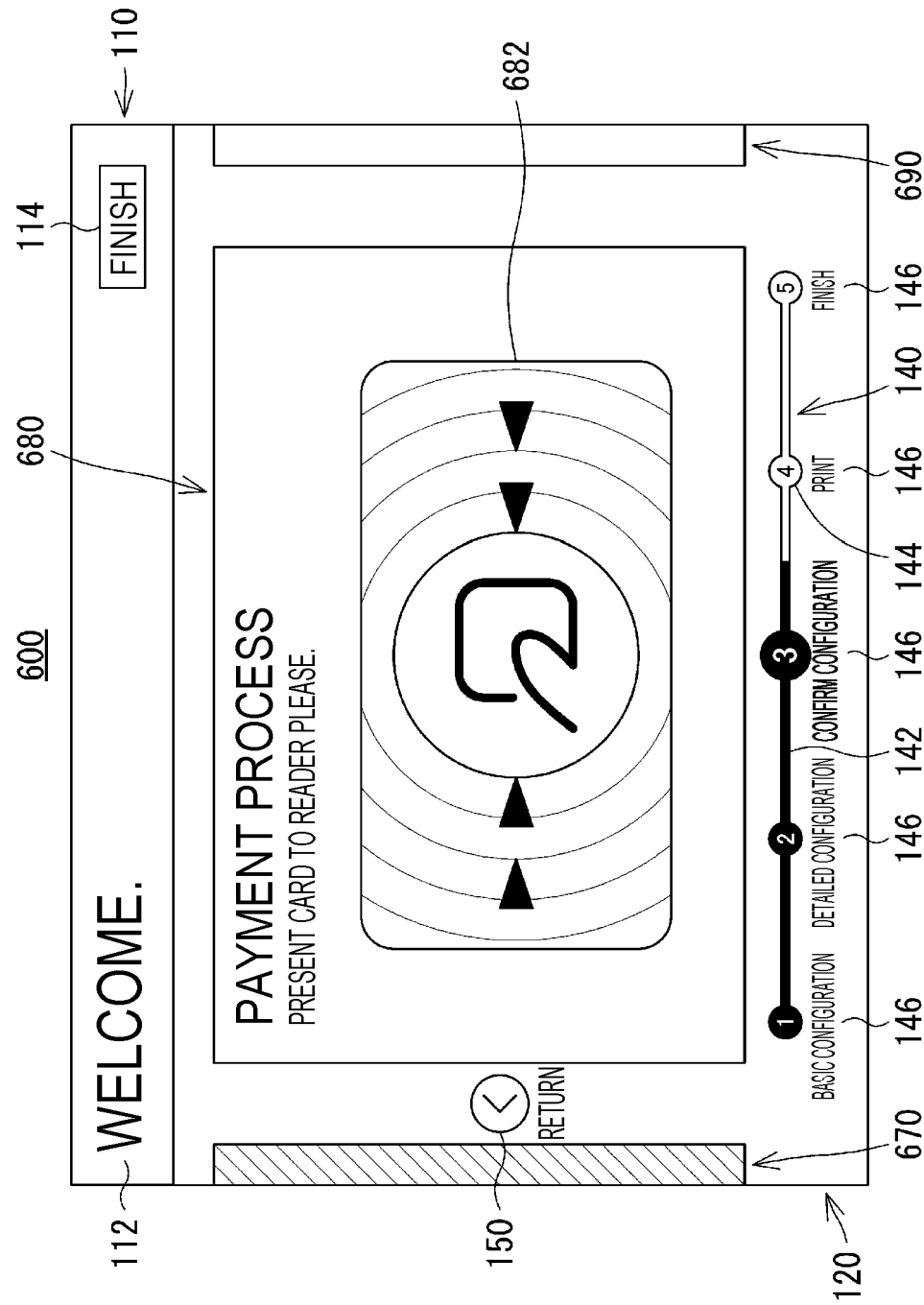
FIG. 31 is a diagram illustrating one example of the payment process screen.

Then, as illustrated in FIG. 30, the payment process screen 680 which is the subsequent configuration screen is slid into the main area 120. As illustrated in FIG. 31, the payment process screen 680 is displayed as the configuration target screen at the center of the main area 120. The shape and size of the payment process screen 680 are the same as the shape and size of the paper selection screen 620 which is the initial configuration screen.

The payment process screen 680 is a screen for performing a payment process of the charge related to printing using the payment method selected by the configuration operation related to the payment method selection screen 670 which is the previous configuration screen. The payment process screen 680 is also one configuration screen related to the copy function. A reader/writer area 682 that represents a reader/writer to which the communication target, not illustrated, such as the IC card or the user terminal used in the payment process is presented is disposed at the center of the payment process screen 680. A transparent antenna, not illustrated, for implementing contactless data communication with the communication target is embedded in the reader/writer area 682. In addition, an appropriate figure that represents the reader/writer area 682 functioning as the reader/writer is shown in the reader/writer area 682.

In the copy reception screen 600 including the payment process screen 680 illustrated in FIG. 31, a part of a printing in progress screen 690 described below is displayed in a marginal part on the right side of the main area 120. More specifically, the left end part of the printing in progress screen 690 is displayed. As will be described below, the printing in progress screen 690 is a screen for presenting the fact that printing is in progress to the user, and is not a configuration screen that receives any configuration operation from the user. Accordingly, the next button 130 is not displayed between the right end part of the payment process screen 680 and the left end part of the printing in progress screen 690.

A part of the payment method selection screen 670 which is the previous configuration screen is displayed in a marginal part on the left side of the main area 120. More specifically, the right end part of the payment method selection screen 670 is displayed. An appropriate modification, for example, setting an appropriate color, is made on the right end part of the payment method selection screen 670 in order to represent the completion of configuration on the payment method selection screen 670. In addition, the return button 150 is displayed between the left end part of the payment process screen 680, which is the current configuration target screen, and the right end part of the payment method selection screen 670 which is the previous configuration screen. In addition, in the copy reception screen 600 illustrated in FIG. 31, in a case where the return button 150 is pressed by the user, the payment method selection screen 670 which is the previous configuration screen is displayed as the configuration target screen at the center of the main area 120. Consequently, the display surface of the display 204 returns to the state illustrated in FIG. 28.

Furthermore, even in the copy reception screen 600 illustrated in FIG. 31, the progress status bar 140 is displayed in a marginal part below the main area 120. The display state of the progress status bar 140 in FIG. 31 is the same as the display state of the progress status bar 140 in FIG. 22. In addition, the display state of the progress status bar 140 in FIG. 30 is the same as the display state of the progress status bar 140 in FIG. 31.

Figure 32:
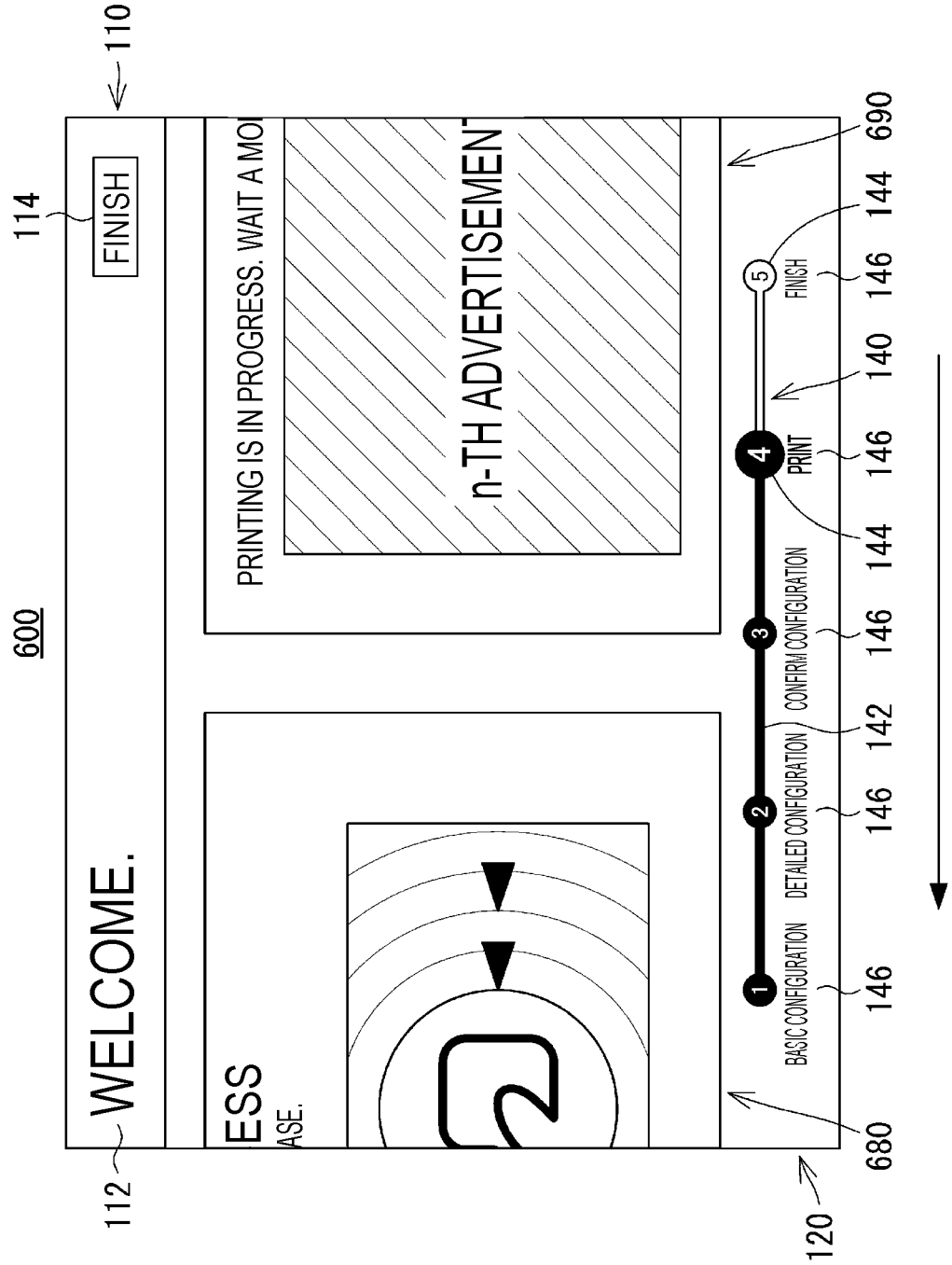
FIG. 32 is a diagram illustrating one example of a state where a printing in progress screen is slid into the main area of the copy reception screen.
Figure 33:
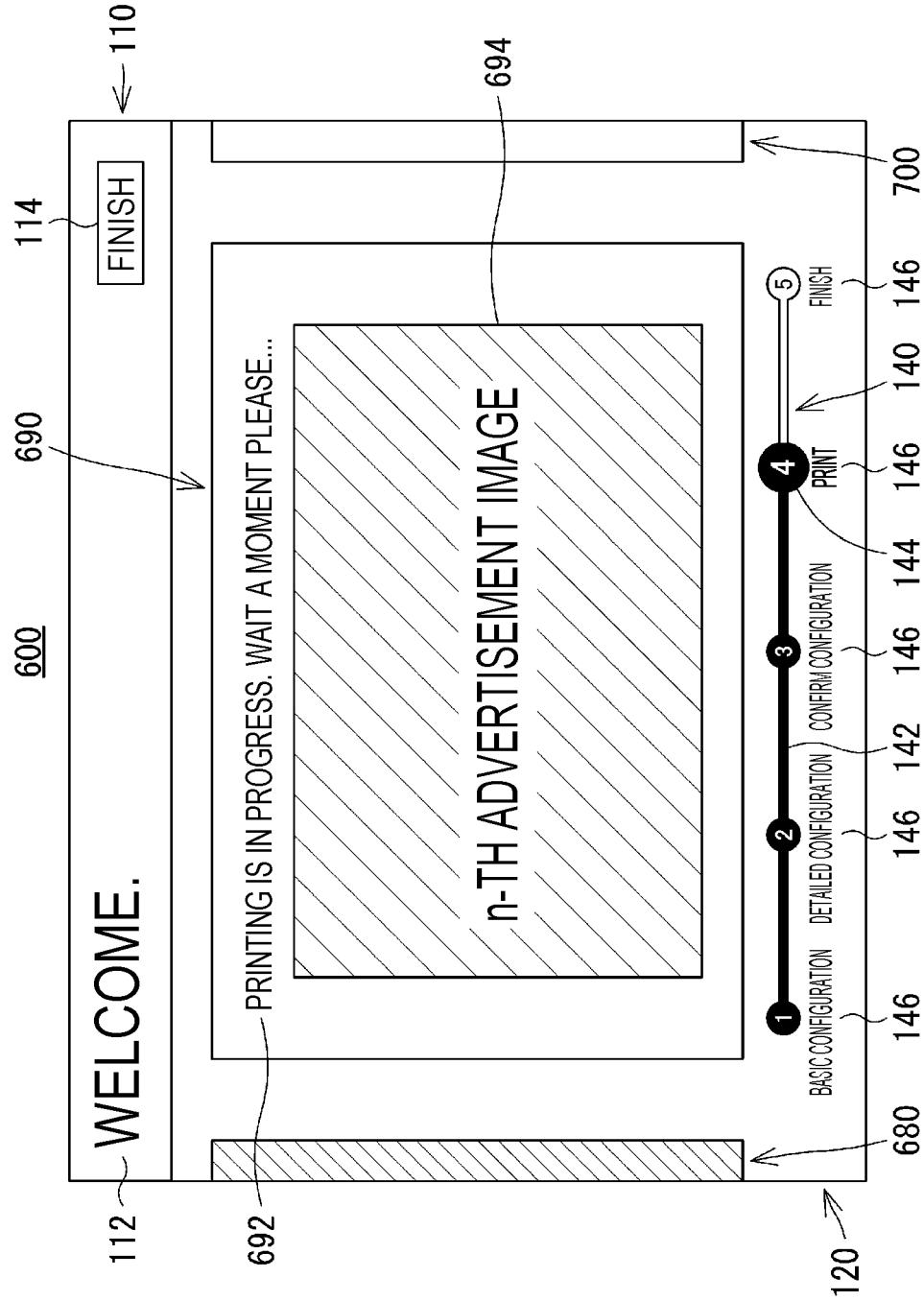
FIG. 33 is a diagram illustrating one example of the printing in progress screen.

In the payment process screen 680 in the copy reception screen 600 illustrated in FIG. 31, in a case where the communication target that matches the payment method selected by the configuration operation related to the previous payment method selection screen 670 is presented to the reader/writer area 682, the printing in progress screen 690 is slid into the main area 120 as illustrated in FIG. 32. As illustrated in FIG. 33, the printing in progress screen 690 is displayed at the center of the main area 120. The shape and size of the printing in progress screen 690 are the same as the shape and size of the paper selection screen 620 which is the initial configuration screen. In addition, printing is started based on the contents of the parameters configured by the configuration operation thus far, that is, the condition corresponding to the copy configuration data 552. In this printing, the image forming process is performed by the image forming unit 304 based on the image reading data that is stored as the transmission and reception data 548. Furthermore, the payment process of the charge related to the printing using the payment method is performed.

As described above, the printing in progress screen 690 is a screen for presenting the fact that printing is currently in progress to the user, and is not a configuration screen. An appropriate character string 692 that represents the fact that printing is currently in progress is shown at an appropriate position in the printing in progress screen 690, for example, the upper part of the printing in progress screen 690. An appropriate dynamic image 694 is displayed below the character string 692. For example, the image that is based on the advertisement image data 544 in FIG. 10 is displayed as the dynamic image 694. By displaying the dynamic image 694 based on the advertisement image data 544, the effect of advertising is further improved.

In the copy reception screen 600 including the printing in progress screen 690 illustrated in FIG. 33, a part of a printing completion screen 700 described below is displayed in a marginal part on the right side of the main area 120. More specifically, the left end part of the printing completion screen 700 is displayed. As will be described below, the printing completion screen 700 is a screen for presenting the fact that printing is complete to the user, and is not a configuration screen. Accordingly, the next button 130 is not displayed between the right end part of the printing in progress screen 690 and the left end part of the printing completion screen 700.

A part of the payment process screen 680 which is the previous configuration screen is displayed in a marginal part on the left side of the main area 120. More specifically, the right end part of the payment process screen 680 is displayed. An appropriate modification, for example, setting an appropriate color, is made on the right end part of the payment process screen 680 in order to represent the completion of configuration on the payment process screen 680 (more precisely, the fact that the payment process is already complete). In a case where printing is currently in progress, returning to the payment process screen 680 which is the previous configuration screen is not appropriate. Thus, the return button 150 is not displayed between the left end part of the printing in progress screen 690 and the right end part of the payment process screen 680.

Furthermore, even in the copy reception screen 600 illustrated in FIG. 33, the progress status bar 140 is displayed in a marginal part below the main area 120. In the progress status bar 140 in FIG. 33, the second stage mark 144 from the right end is displayed in a larger size than the other stage marks 144, 144, . . . . In addition, an appropriate color is set in a part before the second stage mark 144 from the right end (a left part including the second stage mark 144 from the right end) in the progress status bar 140. Furthermore, the character string 146 below the second stage mark 144 from the right end is displayed in a larger size than the other character strings 146, 146, . . . . In addition, each of the character strings 146, 146, . . . other than the character string 146 at the right end is displayed in a larger size than the character string 146 at the right end. The fact that printing is currently in progress is also represented by the display state of the progress status bar 140. As illustrated in FIG. 32, when the screen displayed at the center of the main area 120 is switched to the printing in progress screen 690 from the payment process screen 680, the display state of the progress status bar 140 is changed to the same display state as in FIG. 33.

Figure 34:
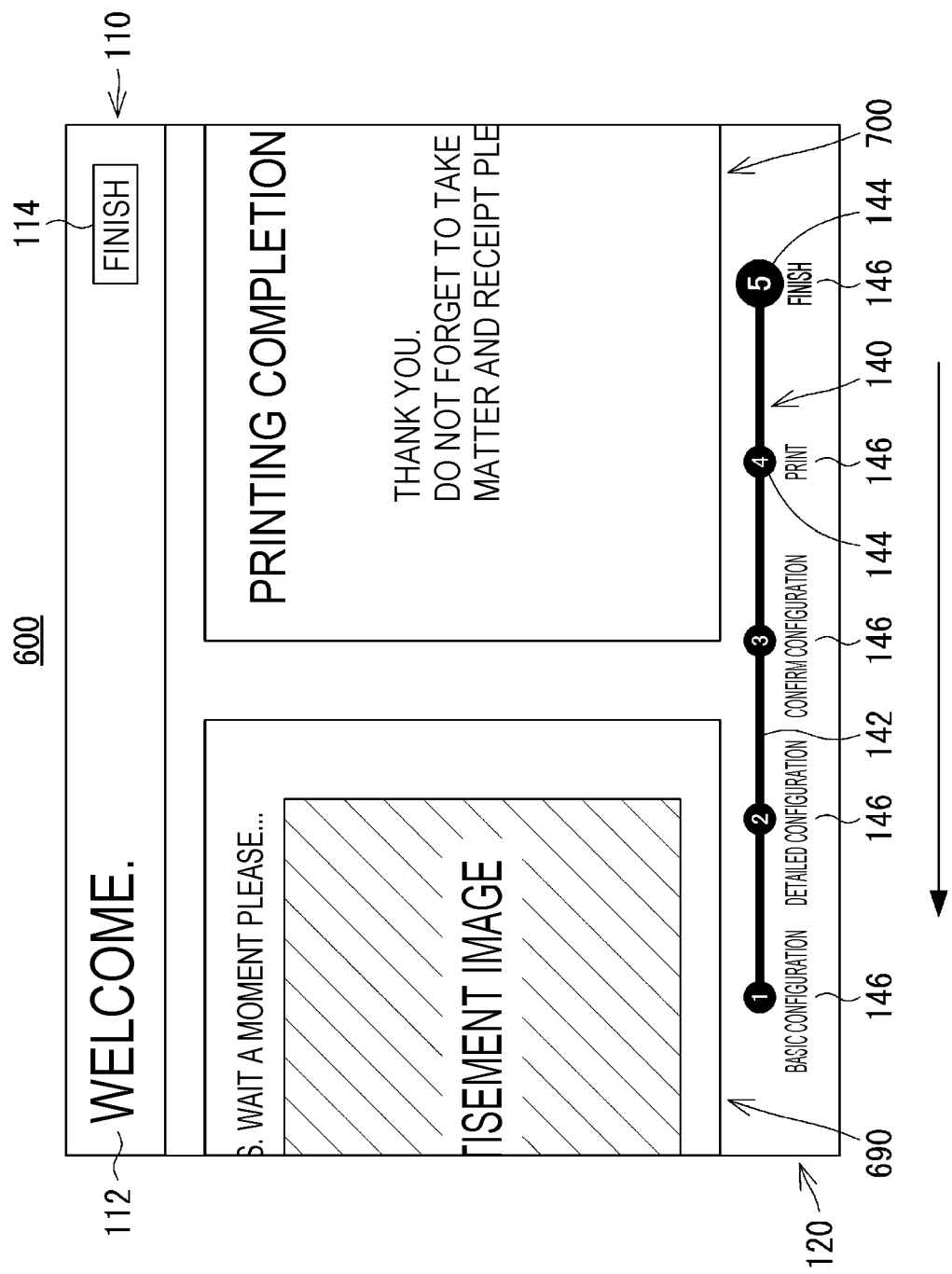
FIG. 34 is a diagram illustrating one example of a state where a printing completion screen is slid into the main area of the copy reception screen.
Figure 35:
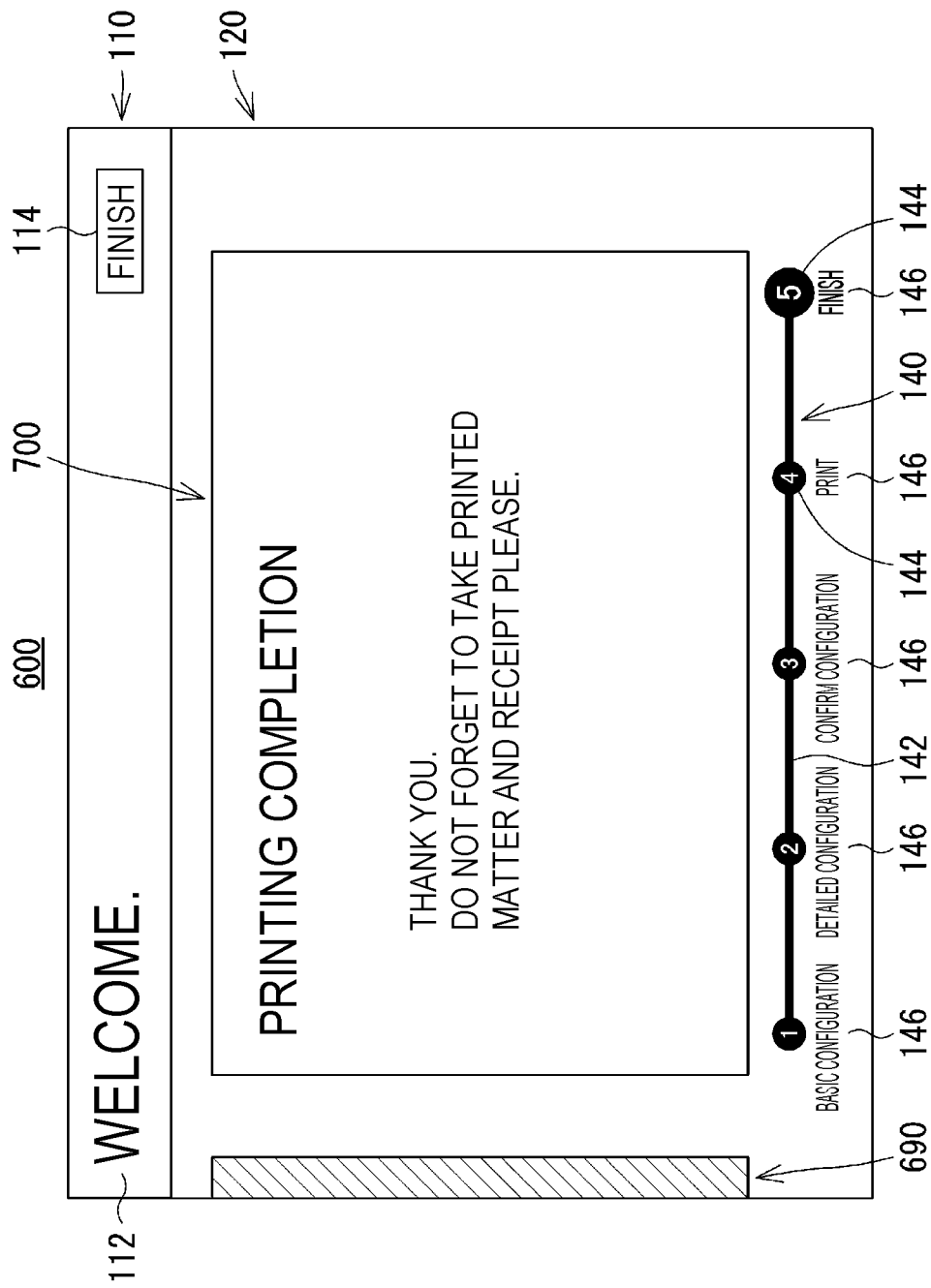
FIG. 35 is a diagram illustrating one example of the printing completion screen.

In a case where printing is complete, the printing completion screen 700 is slid into the main area 120 as illustrated in FIG. 34. As illustrated in FIG. 35, the printing completion screen 700 is displayed at the center of the main area 120. The shape and size of the printing completion screen 700 are the same as the shape and size of the paper selection screen 620 which is the initial configuration screen.

As described above, the printing completion screen 700 is a screen for presenting the fact that printing is complete to the user, and is not a configuration screen. An appropriate character string that represents the completion of printing and the like is shown in the printing completion screen 700.

In addition, the printing completion screen 700 is a screen that is finally displayed in the series of processes related to the copy function. Therefore, in the copy reception screen 600 including the printing completion screen 700 illustrated in FIG. 35, a specific image such as a part of another screen is not displayed in a marginal part on the right side of the main area 120. In addition, the next button 130 is also not displayed.

A part of the printing in progress screen 690 which is the previous screen is displayed in a marginal part on the left side of the main area 120. More specifically, the right end part of the printing in progress screen 690 is displayed. An appropriate modification, for example, setting an appropriate color, is made on the right end part of the printing in progress screen 690 in order to represent the completion of printing. After printing is complete, returning to the printing in progress screen 690 which is the previous screen is not appropriate. Thus, the return button 150 is not displayed between the left end part of the printing completion screen 700 and the right end part of the printing in progress screen 690.

Furthermore, even in the copy reception screen 600 illustrated in FIG. 35, the progress status bar 140 is displayed in a marginal part below the main area 120. In the progress status bar 140 in FIG. 35, the stage mark 144 at the right end is displayed in a larger size than the other stage marks 144, 144, . . . . In addition, an appropriate color is set in the whole progress status bar 140. Furthermore, the character string 146 below the stage mark 144 at the right end is displayed in a larger size than the other character strings 146, 146, . . . . In addition, all character strings 146, 146, . . . below the stage marks 144, 144, . . . are displayed in a large size. The completion of printing is also represented by the display state of the progress status bar 140. As illustrated in FIG. 34, when the screen displayed at the center of the main area 120 is switched to the printing completion screen 700 from the printing in progress screen 690, the display state of the progress status bar 140 is changed to the same display state as in FIG. 35.

The printing completion screen 700 is displayed for a certain period, for example, a few seconds. Then, the home screen 100 is displayed again on the display surface of the display 204. That is, a return is made to a state where the home screen 100 is displayed.

According to the information processing system 10 according to the first embodiment, a plurality of configuration screens starting from the paper selection screen 620 are displayed one at a time in a predetermined order as the configuration target screen at the center of the main area 120. In a case where the subsequent configuration screen is present when any configuration screen is displayed as the configuration target screen at the center of the main area 120, the left end part of the subsequent configuration screen is displayed in a marginal part on the right side of the main area 120. In a case where the previous configuration screen is present, the right end part of the previous configuration screen is displayed in a marginal part on the left side of the main area 120. The subsequent configuration screen referred hereto is one example of a subsequent sequence screen according to the present disclosure. The previous configuration screen referred hereto is one example of a previous sequence screen according to the present disclosure. In addition, the paper selection screen 620 which is the initial configuration screen is one example of a leading screen according to the present disclosure. The payment process screen 680 which is the final configuration screen is one example of a final screen according to the present disclosure.

Furthermore, while the printing in progress screen 690 and the printing completion screen 700 are not configuration screens, the printing in progress screen 690 and the printing completion screen 700 are also displayed one at a time in order at the center of the main area 120. In a case where the subsequent screen is present when each of the printing in progress screen 690 and the printing completion screen 700 is displayed at the center of the main area 120, the left end part of the subsequent screen is displayed in a marginal part on the right side of the main area 120. In addition, the right end part of the previous screen is displayed in a marginal part on the left side of the main area 120.

The scheme of so-called screen switching control will be described with reference to FIG. 36 to FIG. 43.

Figure 36:
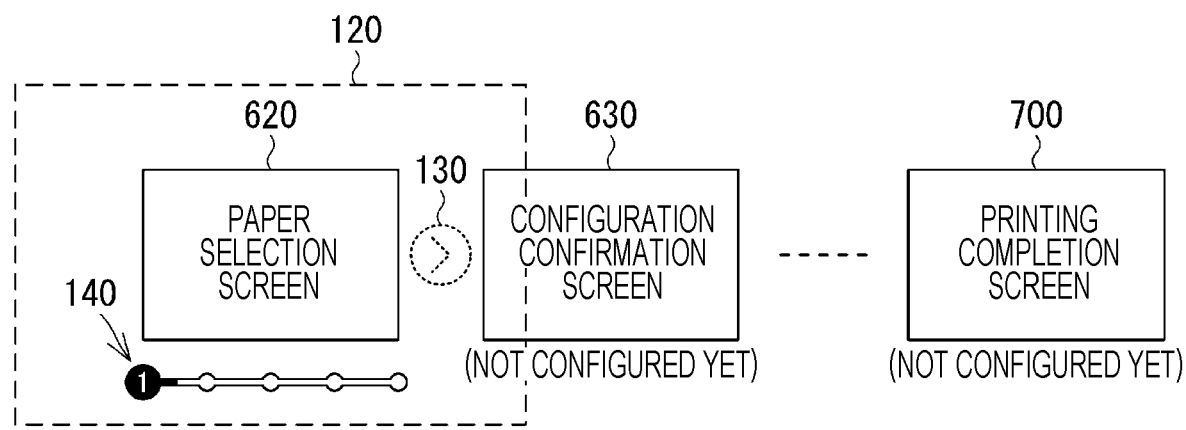
FIG. 36 is a diagram conceptually illustrating a scheme of screen switching control related to switching of the screen displayed in the main area of the copy reception screen.

FIG. 36 is a diagram conceptually illustrating a state where the paper selection screen 620 which is the initial configuration screen is displayed as the configuration target screen at the center of the main area 120. The state illustrated in FIG. 36 corresponds to the state illustrated in FIG. 17. As illustrated in FIG. 36, the screens 620 to 700 from the paper selection screen 620, which is the initial configuration screen, to the printing completion screen 700 displayed at last are horizontally lined up in a row at a certain interval in a predetermined order. The size, interval, and the like of each of the screens 620 to 700 is defined such that the left end part of the configuration confirmation screen 630 which is the subsequent configuration screen is displayed in a marginal part on the right side of the main area 120 when the paper selection screen 620 is displayed as the configuration target screen at the center of the main area 120. In addition, the next button 130 is displayed in a marginal part on the right side of the main area 120. In a case where the paper selection screen 620 which is the current configuration target screen is not configured yet, the next button 130 is displayed in a grayed-out manner. Furthermore, the progress status bar 140 is displayed in a marginal part below the main area 120. The progress status bar 140 is displayed such that the progress status bar 140 corresponds to the progress status of the configuration operation at the current time as described above.

Figure 37:
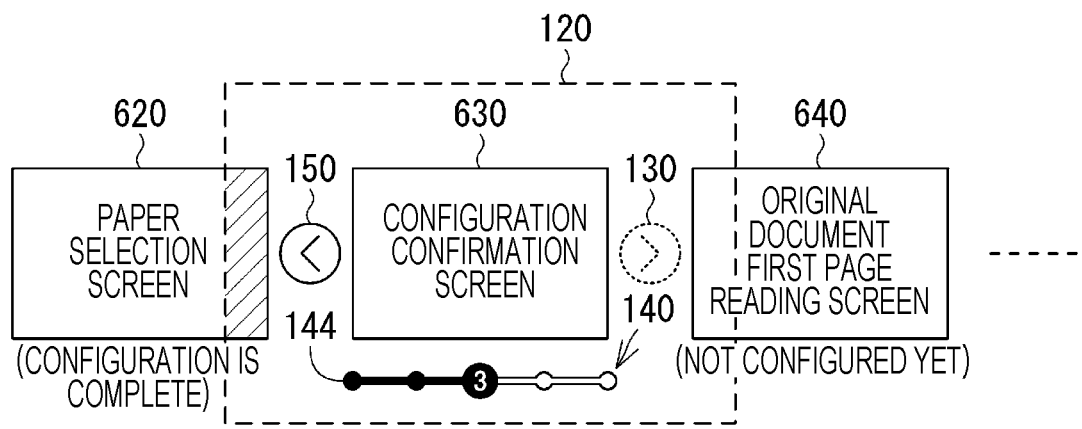
FIG. 37 is another diagram conceptually illustrating the scheme of screen switching control.

In the state illustrated in FIG. 36, the configuration confirmation screen 630 which is the subsequent configuration screen is slid into the main area 120 by sliding the lined-up screens 620 to 700 toward the left side from the right side in FIG. 36. As illustrated in FIG. 37, the configuration confirmation screen 630 is displayed as the configuration target screen at the center of the main area 120. The state illustrated in FIG. 37 corresponds to the state illustrated in FIG. 20. In the state illustrated in FIG. 37, the left end part of the original document first page reading screen 640 which is the subsequent configuration screen is displayed in a marginal part on the right side of the main area 120. In addition, the next button 130 is displayed in a marginal part on the right side of the main area 120. In a case where the configuration operation related to the configuration confirmation screen 630 which is the current configuration target screen is not complete yet, the next button 130 is displayed in a grayed-out manner. Furthermore, the right end part of the paper selection screen 620 which is the previous configuration screen is displayed in a marginal part on the left side of the main area 120. Since the configuration operation related to the paper selection screen 620 is already complete, that is, since configuration on the paper selection screen 620 is complete, an appropriate modification is made on the right end part of the paper selection screen 620. In addition, the return button 150 is displayed in a marginal part on the left side of the main area 120. As described above, the return button 150 can receive a user operation and is clearly displayed in black and white. In addition, the progress status bar 140 is displayed in a marginal part below the main area 120.

In the state illustrated in FIG. 37, the original document first page reading screen 640 which is the subsequent configuration screen is slid into the main area 120 by sliding the lined-up screens 620 to 700 toward the left side from the right side in FIG. 37. As illustrated in FIG. 38, the original document first page reading screen 640 is displayed as the configuration target screen at the center of the main area 120. The state illustrated in FIG. 38 corresponds to the state illustrated in FIG. 22. In the state illustrated in FIG. 38, the left end part of the original document second page reading screen 650 which is the subsequent configuration screen is displayed in a marginal part on the right side of the main area 120. In addition, the next button 130 is displayed in a marginal part on the right side of the main area 120. In a case where the configuration operation (more precisely, the image reading process) related to the original document first page reading screen 640 which is the current configuration target screen is not complete yet, the next button 130 is displayed in a grayed-out manner. Furthermore, the right end part of the configuration confirmation screen 630 which is the previous configuration screen is displayed in a marginal part on the left side of the main area 120. Since configuration on the configuration confirmation screen 630 is complete, an appropriate modification is made on the right end part of the configuration confirmation screen 630. In addition, the return button 150 is displayed in a marginal part on the left side of the main area 120. In addition, the progress status bar 140 is displayed in a marginal part below the main area 120.

By sliding the lined-up screens 620 to 700 in order, the printing completion screen 700 is lastly displayed at the center of the main area 120 as illustrated in FIG. 39. The state illustrated in FIG. 39 corresponds to the state illustrated in FIG. 35. In the state illustrated in FIG. 39, a specific image such as a part of another screen is not displayed in a marginal part on the right side of the main area 120. In addition, the next button 130 is also not displayed. The right end part of the printing in progress screen 690 which is the previous screen is displayed in a marginal part on the left side of the main area 120. An appropriate modification is made on the right end part of the printing in progress screen 690. However, the return button 150 is not displayed. The progress status bar 140 is displayed in a marginal part below the main area 120.

Figure 40:
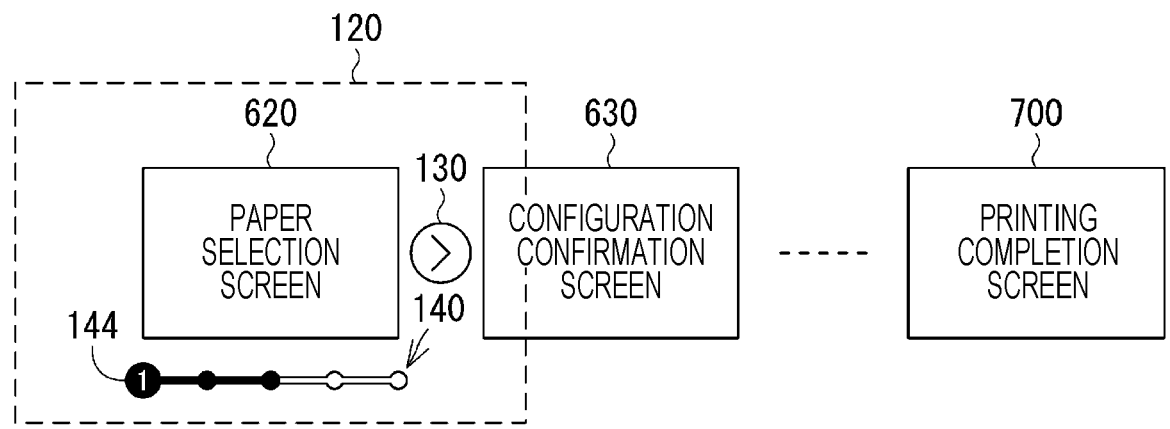
FIG. 40 is still another diagram conceptually illustrating the scheme of screen switching control.

For example, it is assumed that the return button 150 is pressed in the state illustrated in FIG. 37. Then, as illustrated in FIG. 40, a return is made to a state where the paper selection screen 620 is displayed again as the configuration target screen at the center of the main area 120. At first glance, the state illustrated in FIG. 40 is considered to be the same as the state illustrated in FIG. 36. However, the display states of the progress status bar 140 and the next button 130 are different.

That is, when a return is made from the state illustrated in FIG. 37 to a state where the paper selection screen 620 is displayed again as the configuration target screen as illustrated in FIG. 40, the paper selection screen 620 is in a state where configuration is complete. In other words, in the progress status of the configuration operation related to the copy function, the configuration operation is advanced to the stage illustrated in FIG. 37. Therefore, in the state illustrated in FIG. 40, the display state of the progress status bar 140 is the same as the display state thereof illustrated in FIG. 37. In other words, the same display state as illustrated in FIG. 37 is maintained.

In addition, in the state illustrated in FIG. 40, the next button 130 is not displayed in a grayed-out manner and is clearly displayed in black and white. Accordingly, the next button 130 can receive an operation from the user. That is, the next button 130 is enabled. In a case where the next button 130 is pressed, the configuration confirmation screen 630 which is the subsequent configuration screen is slid again into the main area 120. That is, a transition is made to the state illustrated in FIG. 37.

In the state illustrated in FIG. 37, in a case where the stage mark 144 at the left end in the progress status bar 140 is pressed, a transition is made from the state illustrated in FIG. 37 to the state illustrated in FIG. 40. The point is that the progress status bar 140 functions as an operator for displaying any configuration screen on which configuration is complete, again as the configuration target screen at the center of the main area 120. In other words, the progress status bar 140 functions as an operator for jumping to any configuration screen on which configuration is complete.

In addition, while detailed description is not provided, the type of finished sheet can be selected again in the state illustrated in FIG. 40. However, in a case where the size of the finished sheet is changed, other parameters may be affected. Therefore, in this case, the configuration operation related to each of the subsequent configuration screens is performed again. In addition, the display states of the next button 130 and the progress status bar 140 are appropriately corrected.

Figure 41:
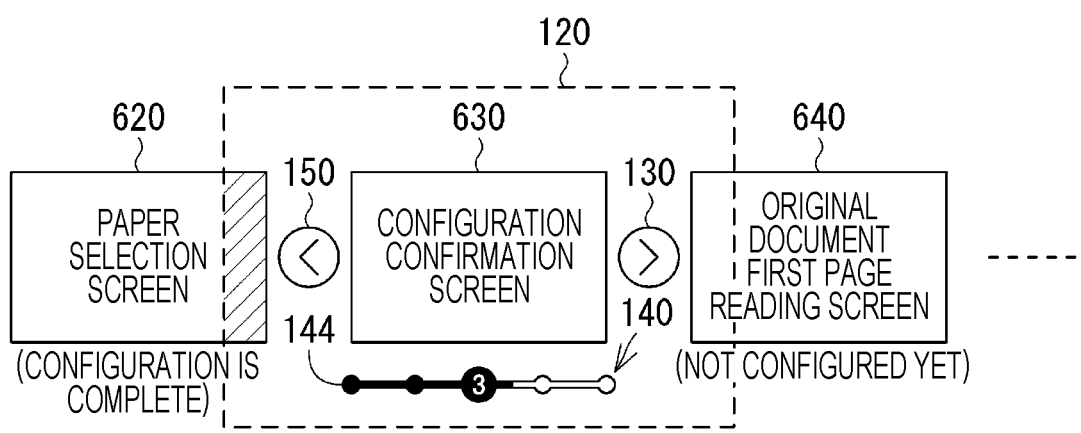
FIG. 41 is still another diagram conceptually illustrating the scheme of screen switching control.

Furthermore, for example, in the state illustrated in FIG. 38, in a case where the return button 150 is pressed, a return is made to a state where the configuration confirmation screen 630 is displayed again as the configuration target screen at the center of the main area 120 as illustrated in FIG. 41. At first glance, the state illustrated in FIG. 41 is considered to be the same as the state illustrated in FIG. 37. However, the display states of the progress status bar 140 and the next button 130 are different.

That is, when a return is made from the state illustrated in FIG. 38 to a state where the configuration confirmation screen 630 is displayed again as the configuration target screen as illustrated in FIG. 41, the configuration confirmation screen 630 is in a state where configuration is complete. In other words, in the progress status of the configuration operation related to the copy function, the configuration operation is advanced to the stage illustrated in FIG. 38. Therefore, in the state illustrated in FIG. 41, the display state of the progress status bar 140 is the same as the display state thereof illustrated in FIG. 38. In other words, the same display state as illustrated in FIG. 38 is maintained.

In addition, in the state illustrated in FIG. 41, the next button 130 is not displayed in a grayed-out manner and is clearly displayed in black and white. Accordingly, the next button 130 can receive an operation from the user. In a case where the next button 130 is pressed, the original document first page reading screen 640 which is the subsequent configuration screen is slid again into the main area 120. That is, a transition is made to the state illustrated in FIG. 38.

In the state illustrated in FIG. 38, in a case where the stage mark 144 at the center in the progress status bar 140 is pressed, a transition is made from the state illustrated in FIG. 38 to the state illustrated in FIG. 41.

In addition, while detailed description is not provided, any parameter can be changed again in the state illustrated in FIG. 41. However, depending on the changed parameter, other parameters may be affected. Therefore, in this case, the configuration operation related to each of the subsequent configuration screens is performed again. In addition, the display states of the next button 130 and the progress status bar 140 are corrected.

Figure 42:
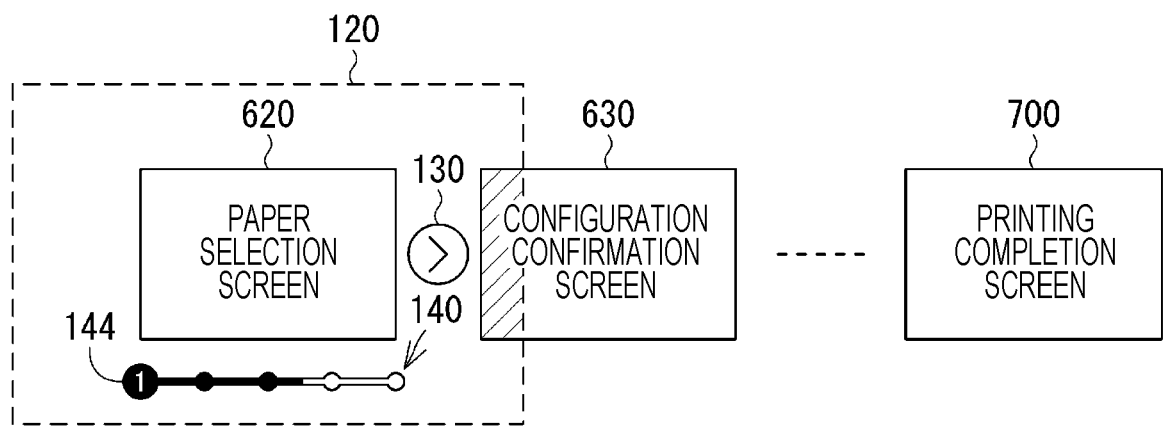
FIG. 42 is still another diagram conceptually illustrating the scheme of screen switching control.

In addition, in the state illustrated in FIG. 41, in a case where the return button 150 is pressed, a return is made to a state where the paper selection screen 620 is displayed again as the configuration target screen at the center of the main area 120 as illustrated in FIG. 42. At first glance, the state illustrated in FIG. 42 is considered to be the same as the state illustrated in FIG. 40. However, the display state of the configuration confirmation screen 630 which is the subsequent configuration screen is different.

That is, when a return is made from the state illustrated in FIG. 41 to a state where the paper selection screen 620 is displayed again as the configuration target screen as illustrated in FIG. 42, the configuration confirmation screen 630 which is the subsequent configuration screen is in a state where configuration is complete. In order to represent such a state, in the state illustrated in FIG. 42, an appropriate modification, for example, setting an appropriate color, is made on the left end part of the configuration confirmation screen 630 which is the subsequent configuration screen displayed in a marginal part on the right side of the main area 120. In FIG. 42, while the left end part of the configuration confirmation screen 630 is hatched, the hatching represents an appropriate color set in the left end part of the configuration confirmation screen 630. Therefore, from an appropriate color set in the left end part of the configuration confirmation screen 630, the user can intuitively recognize that configuration on the configuration confirmation screen 630 is complete.

Even in the state illustrated in FIG. 42, the next button 130 can receive a user operation and is clearly displayed in black and white. That is, the next button 130 is enabled. In a case where the next button 130 is pressed, the configuration confirmation screen 630 which is the subsequent configuration screen is slid again into the main area 120. That is, a transition is made to the state illustrated in FIG. 41.

In addition, the display state of the progress status bar 140 in the state illustrated in FIG. 42 is the same as the display state thereof illustrated in FIG. 41, that is, the same display state as illustrated in FIG. 38. In addition, in the state illustrated in FIG. 38, in a case where the stage mark 144 at the left end in the progress status bar 140 is pressed, a transition, that is, a jump, is made from the state illustrated in FIG. 38 to the state illustrated in FIG. 42.

Figure 43:
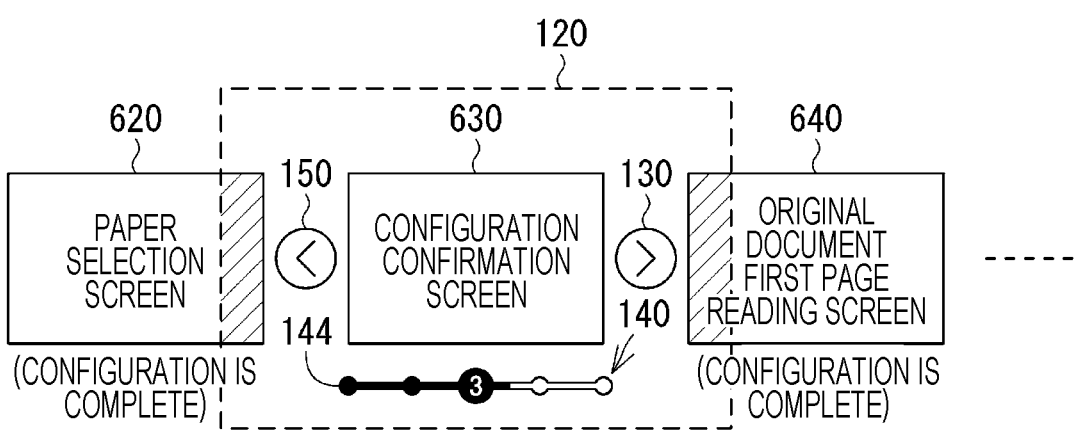
FIG. 43 is still another diagram conceptually illustrating the scheme of screen switching control.

For example, it is assumed that the stage mark 144 at the center in the progress status bar 140 is pressed in a state where any of the configuration screens subsequent to the original document second page reading screen 650 is displayed as the configuration target screen in the main area 120. In this case, as illustrated in FIG. 43, a return is made to a state where the configuration confirmation screen 630 is displayed again as the configuration target screen at the center of the main area 120. At first glance, the state illustrated in FIG. 43 is considered to be the same as the state illustrated in FIG. 41. However, the display state of the original document first page reading screen 640 which is the subsequent configuration screen is different.

That is, in the state illustrated in FIG. 43, the original document first page reading screen 640 which is the subsequent configuration screen is in a state where configuration is complete. In order to represent such a state, in the state illustrated in FIG. 43, an appropriate modification, for example, setting an appropriate color, is made on the left end part of the original document first page reading screen 640 displayed in a marginal part on the right side of the main area 120.

Even in the state illustrated in FIG. 43, the next button 130 can receive a user operation and is clearly displayed in black and white. In a case where the next button 130 is pressed, the original document first page reading screen 640 which is the subsequent configuration screen is slid into the main area 120 again.

In addition, the display state of the progress status bar 140 in the state illustrated in FIG. 43 is the same display state as the state before a transition is made to the state illustrated in FIG. 43, that is, a state from which a jump is made. A transition to the state illustrated in FIG. 43 can also be made by pressing the next button 130 a desired number of times in the state from which a jump is made.

In order to implement such screen switching control, the CPU 220 of the information processing apparatus 20 executes a screen switching control process in accordance with the information processing program 520 stored in the RAM 228. In addition, the CPU 220 executes a progress status display process in accordance with the information processing program 520. The progress status display process is a process for controlling the display states of the left end part of the subsequent screen displayed in a marginal part on the right side of the main area 120, the next button 130, the right end part of the previous screen displayed in a marginal part on the left side of the main area 120, the return button 150, and the progress status bar 140.

Figure 44:
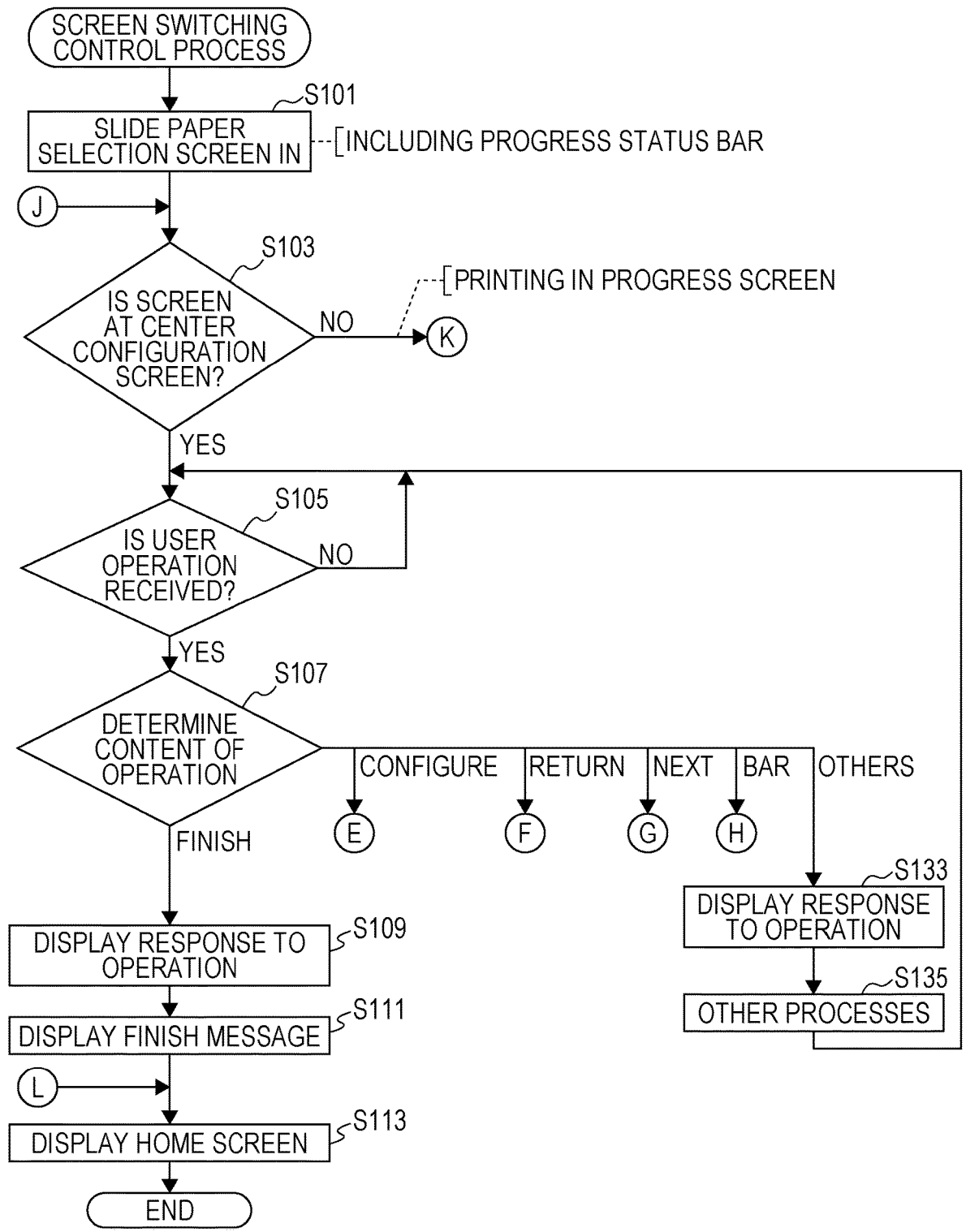
FIG. 44 is a flowchart illustrating a part of one example of a screen switching control process executed by the CPU of the information processing apparatus.
Figure 45:
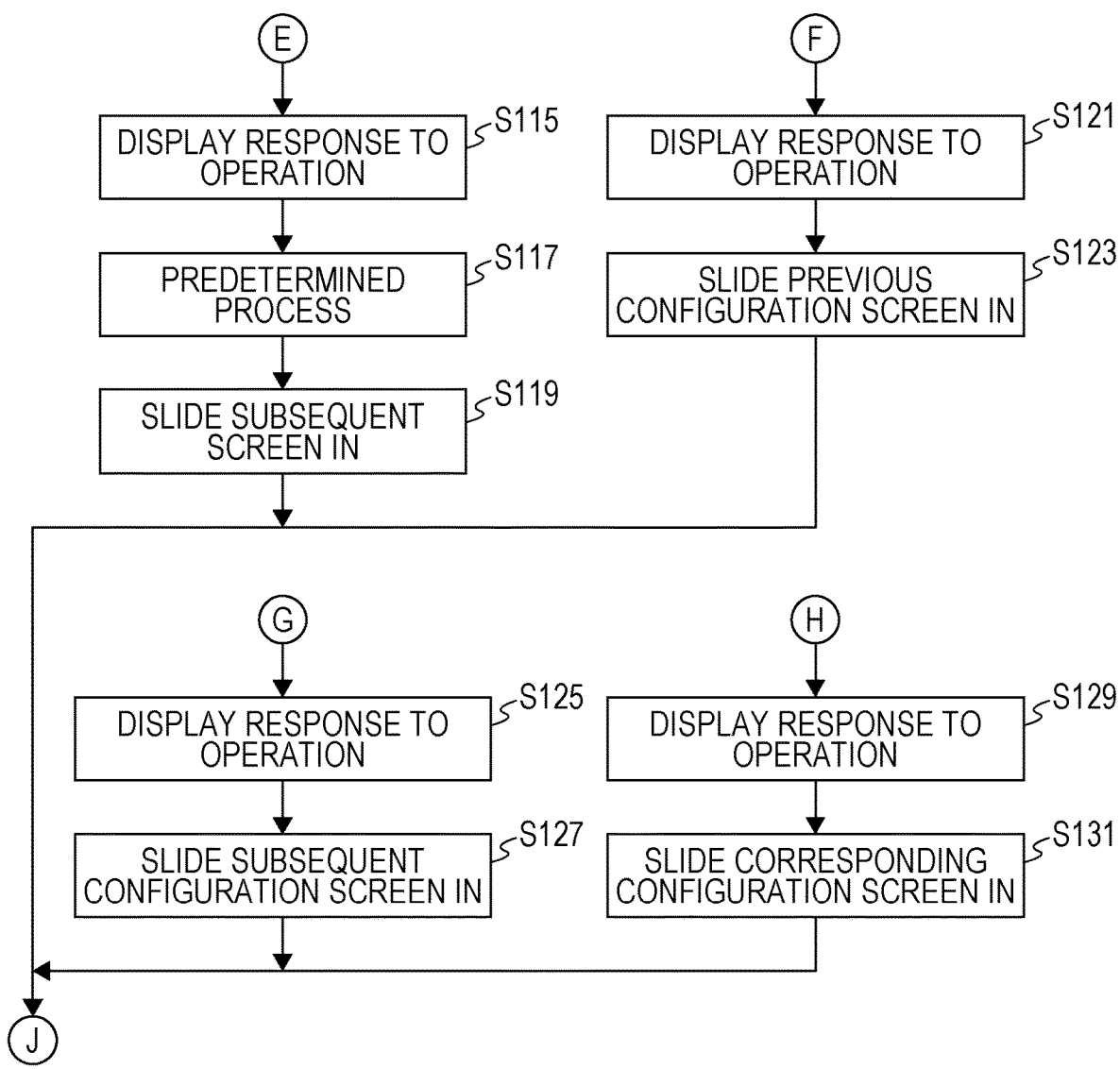
FIG. 45 is a flowchart illustrating another part of the example of the screen switching control process.
Figure 46:
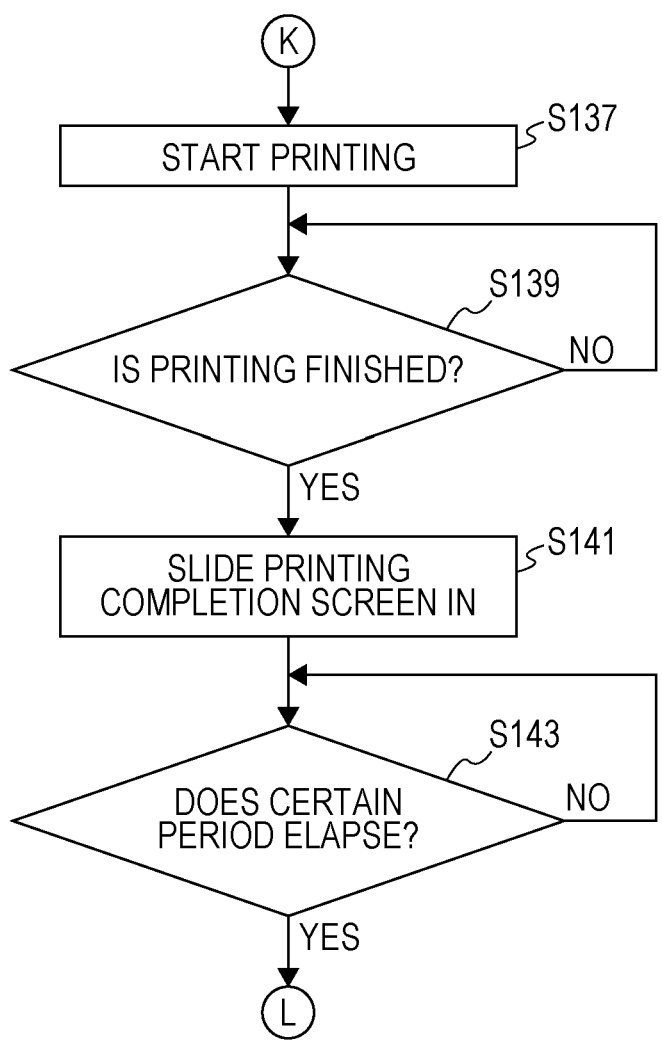
FIG. 46 is a flowchart illustrating the remaining part of the example of the screen switching control process.

First, the flow of screen switching control process will be described with reference to flowcharts illustrated in FIG. 44 to FIG. 46. The CPU 220 starts executing the screen switching control process when any copy mode is selected by the configuration operation related to the simple copy menu screen 610 illustrated in FIG. 14, more precisely, when the touch coordinate data representing the selection is input from the touch panel control circuit 224.

In step S101, the CPU 220 slides the image 620a including the paper selection screen 620 into the main area 120. More precisely, the CPU 220 controls the display control circuit 226 to do so. Accordingly, as illustrated in FIG. 17, the paper selection screen 620 is displayed as the configuration target screen at the center of the main area 120. At this point, the left end part of the configuration confirmation screen 630 which is the subsequent configuration screen is displayed in a marginal part on the right side of the main area 120. In addition, the progress status bar 140 is displayed in a marginal part below the main area 120. The next button 130 is displayed by executing the progress status display process as will be described below. In addition, as described above, the state illustrated in FIG. 17 corresponds to the state illustrated in FIG. 36 as described above.

Step S101 is one example of a subsequent sequence screen adding procedure according to the present disclosure. Execution of step S101 by the CPU 220 is one example of subsequent sequence screen adding according to the present disclosure. Furthermore, the CPU 220 that executes step S101 is one example of a subsequent sequence screen adding unit according to the present disclosure. In addition, the CPU 220 that executes step S101 is one example of a status display element adding unit according to the present disclosure.

In step S103, the CPU 220 determines whether or not the screen displayed at the center of the main area 120 is a configuration screen, that is, any configuration screen of the paper selection screen 620 to the payment process screen 680. For example, in a case where the screen displayed at the center of the main area 120 is the configuration screen (S103—YES), the CPU 220 advances the process to step S105. In a case where the screen displayed at the center of the main area 120 is not the configuration screen (S103—NO), more specifically, in a case where the screen displayed at the center of the main area 120 is the printing in progress screen 690, the CPU 220 advances the process to step S137 described below from step S103.

In step S105, the CPU 220 waits until a user operation is received by the touch panel 202, more precisely, until the touch coordinate data corresponding to the user operation is input from the touch panel control circuit 224 (S105—NO). In a case where the user operation is received by the touch panel 202 (S105—YES), the CPU 220 advances the process to step S107 from step S105.

In step S107, the CPU 220 determines the content of the user operation received in step S105. For example, in a case where the user operation is pressing of the finish button 114, the CPU 220 advances the process to step S109. In a case where the user operation is a configuration operation, the CPU 220 advances the process to step S115 described below from step S107. For example, the configuration operation referred hereto refers to an operation of pressing any of the buttons 622, 622, . . . in a case where the paper selection screen 620 illustrated in FIG. 17 is displayed as the configuration target screen at the center of the main area 120. In addition, for example, the configuration operation when the payment process screen 680 illustrated in FIG. 31 is displayed as the configuration target screen at the center of the main area 120 refers to presenting of the communication target to the reader/writer area 682.

Furthermore, in step S107, in a case where the user operation is pressing of the return button 150, the CPU 220 advances the process to step S121 described below. Pressing of the return button 150 is one example of a first instruction operation, particularly, one example of a third instruction operation according to the present disclosure. In a case where the user operation is pressing of the next button 130, the CPU 220 advances the process to step S125 described below from step S107. Pressing of the next button 130 is one example of a second instruction operation according to the present disclosure. In addition, in a case where the user operation is pressing of the progress status bar 140, more precisely, pressing of any stage mark 144, the CPU 220 advances the process to step S129 described below from step S107. Pressing of the progress status bar 140 is one example of the first instruction operation according to the present disclosure. In a case where the user operation is another operation, the CPU 220 advances the process to step S133 described below from step S107.

In step S109, in response to the pressing of the finish button 114 as the user operation, the CPU 220 sets the display state of the finish button 114 to a state corresponding to the user operation, for example, a state where the finish button 114 looks actually pressed. The CPU 220 advances the process to step S111.

In step S111, the CPU 220 displays an appropriate finish message representing the finish of the operation related to the copy function on the display surface of the display 204 for a certain period, for example, a few seconds. The CPU 220 advances the process to step S113.

In step S113, the CPU 220 displays the home screen 100 on the display surface of the display 204. Accordingly, the CPU 220 finishes the execution of the screen switching control process.

In addition, in a case where the CPU 220 advances the process to step S115 from step S107, the CPU 220 in step S115 sets the display state of the configuration screen on which the configuration operation is received, that is, the current configuration target screen, to a state corresponding to the configuration operation in response to the configuration operation as the user operation. For example, in a case where the current configuration target screen is the paper selection screen 620 illustrated in FIG. 17, the CPU 220 sets an appropriate color in the pressed button 622 as illustrated in FIG. 18. In addition, for example, in a case where the current configuration target screen is the payment process screen 680 illustrated in FIG. 31, the CPU 220 makes an appropriate change to the display state of the reader/writer area 682. The CPU 220 advances the process to step S117.

In step S117, the CPU 220 performs a predetermined process corresponding to the configuration operation related to the current configuration target screen. For example, in a case where the current configuration target screen is the paper selection screen 620 illustrated in FIG. 17, the CPU 220 stores data of the type of finished sheet corresponding to the pressed button 622 as one piece of the copy configuration data 552. In addition, for example, in a case where the current configuration target screen is the payment process screen 680 illustrated in FIG. 31, the CPU 220 performs the payment process of the charge related to printing. The CPU 220 advances the process to step S119.

In step S119, the CPU 220 slides the subsequent screen of the current screen into the main area 120. The subsequent screen referred hereto is any configuration screen of the configuration confirmation screen 630 to the payment process screen 680 or the printing in progress screen 690. Accordingly, the screen that is slid into the main area 120 is displayed at the center of the main area 120. In addition, in a case where the subsequent screen of the screen displayed at the center of the main area 120 is present, the left end part of the subsequent screen is displayed in a marginal part on the right side of the main area 120. Furthermore, the right end part of the previous screen of the screen displayed at the center of the main area 120 is displayed in a marginal part on the left side of the main area 120. Then, the CPU 220 returns the process to step S103.

Step S119 is one example of a screen switching procedure according to the present disclosure. In addition, step S119 is one example of the subsequent sequence screen adding procedure according to the present disclosure. Execution of the step S119 by the CPU 220 is one example of the screen switching step according to the present disclosure and also one example of the subsequent sequence screen adding step according to the present disclosure. Furthermore, the CPU 220 that executes step S119 is one example of a screen switching unit according to the present disclosure. In addition, the CPU 220 that executes step S119 is one example of the subsequent sequence screen adding unit and a previous sequence screen adding unit according to the present disclosure.

In addition, in a case where the CPU 220 advances the process to step S121 from step S107, the CPU 220 in step S121, in response to the pressing of the return button 150 as the user operation, sets the display state of the return button 150 to a state corresponding to the user operation, for example, a state where the return button 150 looks actually pressed. The CPU 220 advances the process to step S123.

In step S123, the CPU 220 slides the previous configuration screen of the current screen into the main area 120. The previous configuration screen referred hereto is any configuration screen of the paper selection screen 620 to the payment method selection screen 670. Accordingly, the configuration screen that is slid into the main area 120 is displayed as the configuration target screen at the center of the main area 120. In addition, the left end part of the subsequent configuration screen of the configuration target screen is displayed in a marginal part on the right side of the main area 120. Furthermore, in a case where the previous configuration screen of the configuration target screen is present, the right end part of the previous configuration screen is displayed in a marginal part on the left side of the main area 120. Then, the CPU 220 returns the process to step S103.

Step S123 is one example of a first changing procedure according to the present disclosure. Step S123 is also one example of the subsequent sequence screen adding procedure according to the present disclosure. Furthermore, execution of the step S123 by the CPU 220 is one example of first changing according to the present disclosure. Execution of step S123 by the CPU 220 is also one example of the subsequent sequence screen adding according to the present disclosure. In addition, the CPU 220 that executes step S123 is one example of a first changing unit according to the present disclosure. The CPU 220 that executes step S123 is also one example of the subsequent sequence screen adding unit and the previous sequence screen adding unit according to the present disclosure.

Furthermore, in a case where the CPU 220 advances the process to step S125 from step S107, the CPU 220 in step S125, in response to the pressing of the next button 130 as the user operation, sets the display state of the next button 130 to a state corresponding to the user operation, for example, a state where the next button 130 looks actually pressed. The CPU 220 advances the process to step S127.

In step S127, the CPU 220 slides the subsequent configuration screen of the current screen into the main area 120. The subsequent configuration screen referred hereto is any configuration screen of the configuration confirmation screen 630 to the payment process screen 680. Accordingly, the configuration screen that is slid into the main area 120 is displayed as the configuration target screen at the center of the main area 120. In addition, in a case where the subsequent screen of the configuration target screen is present, the left end part of the subsequent screen is displayed in a marginal part on the right side of the main area 120. Furthermore, the right end part of the previous configuration screen of the configuration target screen is displayed in a marginal part on the left side of the main area 120. Then, the CPU 220 returns the process to step S103.

The CPU 220 that executes step S127 is one example of a second changing unit according to the present disclosure. The CPU 220 that executes step S127 is also one example of the subsequent sequence screen adding unit and the previous sequence screen adding unit according to the present disclosure. Furthermore, step S127 is one example of the subsequent sequence screen adding procedure according to the present disclosure. In addition, execution of step S127 by the CPU 220 is one example of the subsequent sequence screen adding according to the present disclosure.

In a case where the CPU 220 advances the process to step S129 from step S107, the CPU 220 in step S129, in response to the pressing of the progress status bar 140 as the user operation, sets the display state of the progress status bar 140 to a state corresponding to the user operation. For example, an appropriate change is made to the display state of the progress status bar 140. The CPU 220 advances the process to step S131.

In step S131, the CPU 220 slides the configuration screen corresponding to the position of the press in the progress status bar 140 pressed as the user operation into the main area 120. The configuration screen corresponding to the position of the press referred hereto is any configuration screen of the paper selection screen 620 to the payment process screen 680. Accordingly, the configuration screen that is slid into the main area 120 is displayed as the configuration target screen at the center of the main area 120. In addition, in a case where the subsequent screen of the configuration target screen is present, the left end part of the subsequent screen is displayed in a marginal part on the right side of the main area 120. Furthermore, in a case where the previous configuration screen of the configuration target screen is present, the right end part of the previous configuration screen is displayed in a marginal part on the left side of the main area 120. Then, the CPU 220 returns the process to step S103.

Step S131 is one example of the first changing procedure according to the present disclosure and is also one example of the subsequent sequence screen adding procedure according to the present disclosure. Execution of the step S131 by the CPU 220 is one example of the first changing according to the present disclosure and also one example of the subsequent sequence screen adding according to the present disclosure. Furthermore, the CPU 220 that executes step S131 is one example of the first changing unit according to the present disclosure and is also one example of the subsequent sequence screen adding unit and the previous sequence screen adding unit according to the present disclosure.

In addition, in a case where the CPU 220 advances the process to step S133 from step S107, the CPU 220 in step S133 makes an appropriate change to the display state of the current configuration target screen in response to the other operation as the user operation. The CPU 220 advances the process to step S135.

In step S135, the CPU 220 performs the other process. For example, in a case where the current configuration target screen is the configuration confirmation screen illustrated in FIG. 20, the other process referred hereto is a process when any change button 636 or the other configurations button 638 is pressed. In addition, for example, in a case where the current configuration target screen is the final confirmation screen illustrated in FIG. 26, the other process is a process when any of the buttons 662b and 662c in the read image preview area 662 is pressed, or a process when information related to the printed quantity in the quantity display area 666 is changed. The CPU 220 returns the process to step S103.

Furthermore, in a case where the CPU 220 advances the process to step S137 from step S103, the CPU 220 starts printing in step S137. More precisely, the CPU 220 instructs the CPU 312 of the image forming apparatus 30 to start copying. The CPU 220 advances the process to step S139.

Step S137 is one example of an information processing procedure according to the present disclosure. Execution of step S137 by the CPU 220 is one example of the information processing step according to the present disclosure. Furthermore, the CPU 220 that executes step S137 is one example of an information processing unit according to the present disclosure. In addition, instructing of the CPU 312 of the image forming apparatus 30 to start copying by the CPU 220 in step S137 is one example of predetermined information processing according to the present disclosure, particularly, one example of an image forming instruction process.

In step S139, the CPU 220 waits until printing started in step S137 is finished, more precisely, until a copy finish notification is transmitted from the CPU 312 of the image forming apparatus 30 (S139—NO). In a case where printing is finished (S139—YES), the CPU 220 advances the process to step S141 from step S139.

In step S141, the CPU 220 slides the printing completion screen 700 into the main area 120. Accordingly, the printing completion screen 700 is displayed as the configuration target screen at the center of the main area 120. In addition, the right end part of the printing in progress screen 690 which is the previous screen of the printing completion screen 700 is displayed in a marginal part on the left side of the main area 120. Then, the CPU 220 advances the process to step S143.

In step S143, the CPU 220 waits for an elapse of a certain period (a few seconds) (S143—NO). In a case where the certain period elapses (S143—YES), the CPU 220 advances the process to step S113 from step S143 in order to display the home screen 100 on the display surface of the display 204.

Figure 47:
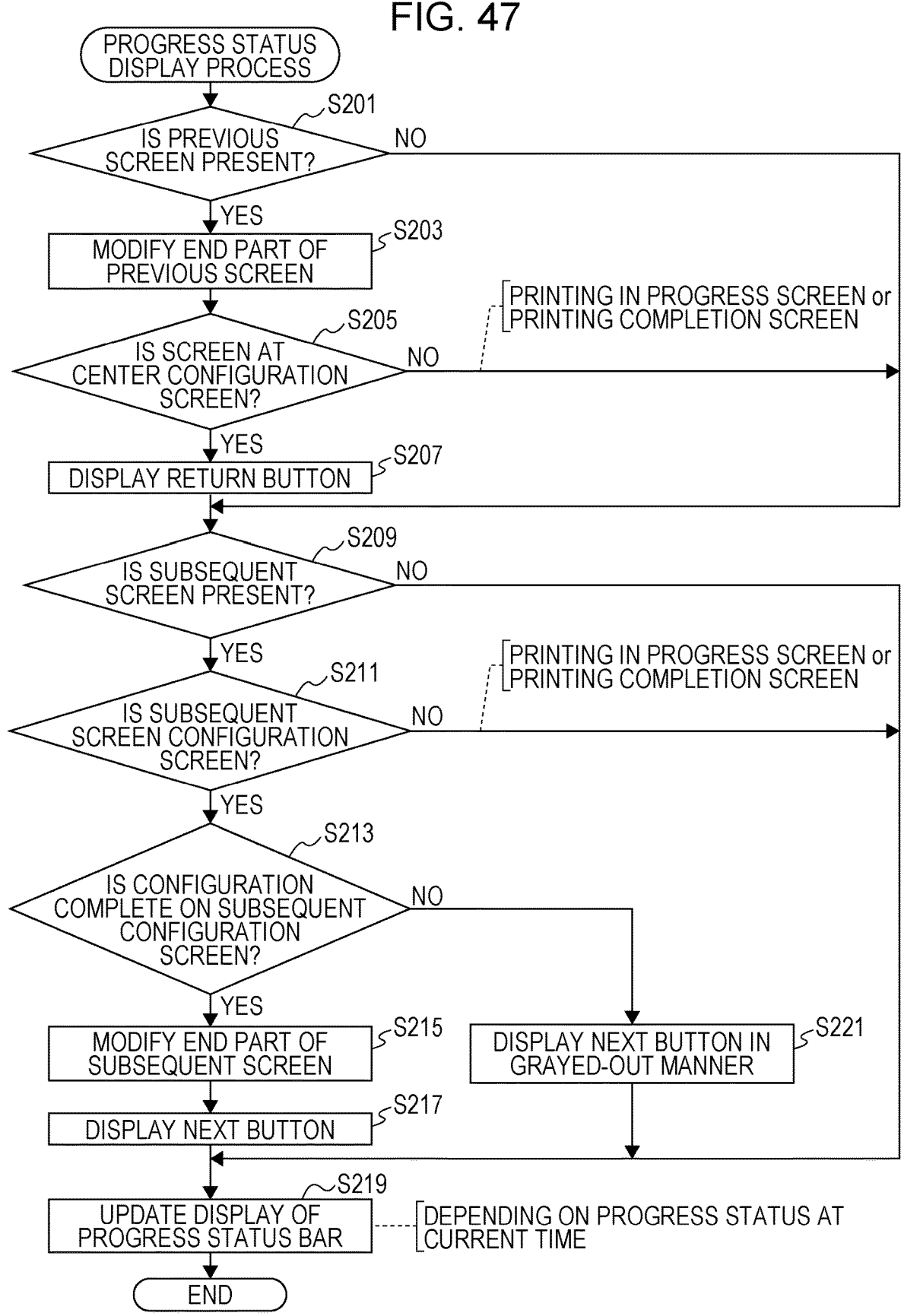
FIG. 47 is a flowchart illustrating one example of a progress status display process executed by the CPU of the information processing apparatus.

Next, the flow of progress status display process will be described with reference to a flowchart illustrated in FIG. 47. The CPU 220 starts executing the progress status display process when any screen of the paper selection screen 620 to the printing completion screen 700 slides into the main area 120.

First, in step S201, the CPU 220 determines whether or not the previous screen is present. For example, in a case where the previous screen is present (S201—YES), the CPU 220 advances the process to step S203. In a case where the previous screen is not present (S201—NO), the CPU 220 advances the process to step S209 described below from step S201.

In step S203, the CPU 220 makes an appropriate modification, for example, sets an appropriate color, on the right end part of the previous screen displayed in a marginal part on the left side of the main area 120. The CPU 220 advances the process to step S205.

In step S205, the CPU 220 determines whether or not the screen displayed at the center of the main area 120 is a configuration screen, that is, any configuration screen of the paper selection screen 620 to the payment process screen 680. For example, in a case where the screen displayed at the center of the main area 120 is the configuration screen (S205—YES), the CPU 220 advances the process to step S207. In a case where the screen displayed at the center of the main area 120 is not the configuration screen (S205—NO), that is, in a case where the screen is the printing in progress screen 690 or the printing completion screen 700, the CPU 220 advances the process to step S209 described below from step S205.

In step S207, the CPU 220 displays the return button 150. More precisely, the CPU 220 clearly displays the return button 150 in black and white. The CPU 220 advances the process to step S209.

In step S209, a determination as to whether or not the subsequent screen is present is performed. For example, in a case where the subsequent screen is present (S209—YES), the CPU 220 advances the process to step S211. In a case where the subsequent screen is not present (S209—NO), the CPU 220 advances the process to step S219 described below from step S209.

In step S211, the CPU 220 determines whether or not the subsequent screen is a configuration screen, that is, any configuration screen of the configuration confirmation screen 630 to the payment process screen 680. For example, in a case where the subsequent screen is the configuration screen (S211—YES), the CPU 220 advances the process to step S213. In a case where the subsequent screen is not the configuration screen (S211—NO), that is, in a case where the subsequent screen is the printing in progress screen 690 or the printing completion screen 700, the CPU 220 advances the process to step S219 described below from step S211.

In step S213, the CPU 220 determines whether or not an operation on the subsequent configuration screen is complete. This determination is performed based on whether or not a parameter corresponding to the configuration operation is stored as the copy configuration data 552. For example, in a case where configuration on the subsequent configuration screen is complete (S213—YES), the CPU 220 advances the process to step S215. In a case where the subsequent configuration screen is not configured yet (S213—NO), the CPU 220 advances the process to step S221 described below from step S213.

In step S215, the CPU 220 makes an appropriate modification, for example, sets an appropriate color, on the left end part of the subsequent screen displayed in a marginal part on the right side of the main area 120. The CPU 220 advances the process to step S217.

In step S217, the CPU 220 displays the next button 130. More precisely, the CPU 220 clearly displays the next button 130 in black and white. The CPU 220 advances the process to step S219.

In step S219, the CPU 220 updates the display state of the progress status bar 140 in order to set the display state of the progress status bar 140 to a state corresponding to the current configuration status. Accordingly, the CPU 220 finishes the execution of the progress status display process. More precisely, the CPU 220 that executes not only step S101 but also step S219 is one example of the status display element adding unit according to the present disclosure.

In addition, in a case where the CPU 220 advances the process to step S221 from step S213, the CPU 220 in step S221 displays the next button 130 in a grayed-out manner. Then, the CPU 220 advances the process to step S219.

As described thus far, according to the information processing system 10 according to the first embodiment, a plurality of configuration screens starting from the paper selection screen 620 are displayed one at a time in a predetermined order as the configuration target screen at the center of the main area 120. In a case where the subsequent configuration screen is present when any configuration screen is displayed as the configuration target screen at the center of the main area 120, the left end part of the subsequent configuration screen is displayed in a marginal part on the right side of the main area 120. Therefore, from whether or not the left end part of the subsequent configuration screen is displayed in a marginal part on the right side of the main area 120, the user can intuitively recognize whether or not the subsequent configuration screen is present, that is, whether or not the configuration operation still continues.

In addition, in a case where configuration on the subsequent configuration screen is complete, an appropriate modification is made on the left end part of the subsequent configuration screen. Therefore, from whether or not the appropriate modification is made on the left end part of the subsequent configuration screen, the user can intuitively recognize whether or not configuration on the subsequent configuration screen is complete.

Furthermore, in a case where the subsequent configuration screen is present, the next button 130 is displayed in a marginal part on the right side of the main area 120. The next button 130 is clearly displayed in black and white in a case where configuration on the subsequent configuration screen is complete, and is displayed in a grayed-out manner in a case where the subsequent configuration screen is not configured yet. Therefore, from whether or not the next button 130 is displayed, the user can intuitively recognize whether or not the subsequent configuration screen is present, that is, whether or not the configuration operation still continues. In addition, from the display state of the next button 130, the user can intuitively recognize whether or not configuration on the subsequent configuration screen is complete.

In addition, in a case where the previous configuration screen of the current configuration target screen is present, the right end part of the previous configuration screen is displayed in a marginal part on the left side of the main area 120. Therefore, from whether or not the right end part of the previous configuration screen is displayed in a marginal part on the left side of the main area 120, the user can intuitively recognize whether or not the previous configuration screen is present.

In addition, in a case where the previous configuration screen is present, the return button 150 is displayed in a marginal part on the left side of the main area 120. Therefore, from whether or not the return button 150 is displayed, the user can intuitively recognize whether or not the previous configuration screen is present.

Furthermore, the progress status bar 140 is displayed in a marginal part below the main area 120. The progress status bar 140 graphically displays the progress status of the configuration operation at the current time. Therefore, the user can intuitively recognize the progress status of the configuration operation at the current time from the display state of the progress status bar 140.

The user can display any configuration screen on which configuration is complete at the center of the main area 120 again as the configuration target screen by operating the next button 130, the return button 150, and the progress status bar 140. Such a point is useful in the case of confirming the content of the configuration operation related to any configuration screen on which configuration is complete, or changing the content of the configuration operation.

By employing the copy reception screen 600 on which various considerations are made as a user interface screen related to the copy function, the operability of the information processing system 10 having the copy function is improved. Such considerations may be made on not only the copy function but also functions other than the copy function such as the scanner function, the facsimile function, and furthermore, a download function for digital contents.

Figure 48:
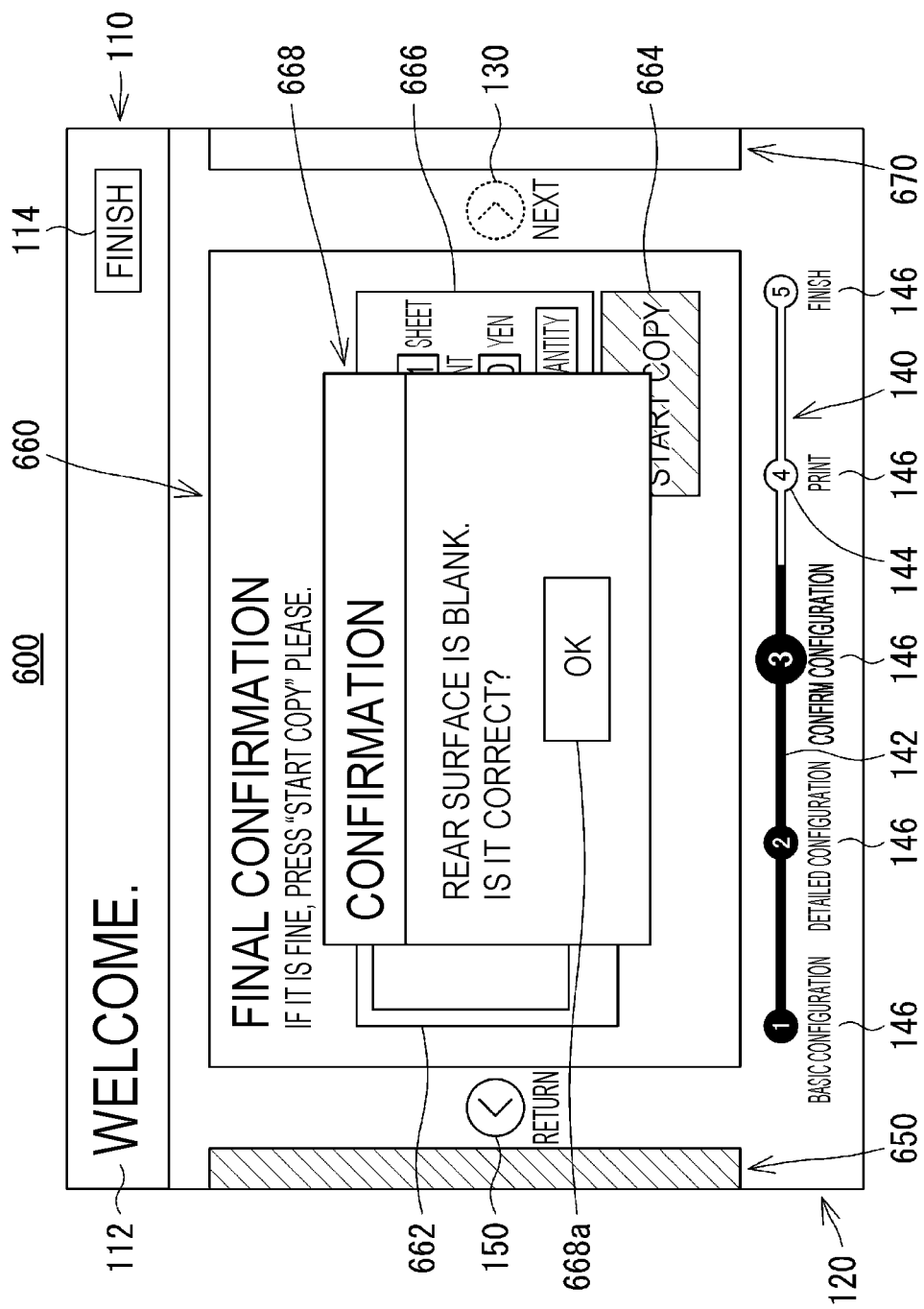
FIG. 48 is a diagram illustrating one example of a message screen displayed on the final confirmation screen.

In the double side copy mode, particularly the image reading result of the second page of the original document may be the same as that of blank paper. For example, such an event may be caused in a case where the rear surface of the original document in which an image is formed on only a single side is erroneously set as the reading surface of the second page of the original document on the original document setting table of the image reading unit 302, that is, a mistake of the user. In this case, even in the final confirmation screen 660 illustrated in FIG. 26, the preview image 662a of the second page of the original document is a completely blank image such as blank paper. In order to correct such a mistake of the user, for example, as illustrated in FIG. 48, when the final confirmation screen 660 is displayed as the configuration target screen, an appropriate message screen 668 that prompts confirmation from the user may be displayed to the user.

The message screen 668 is, for example, a dialog box and is displayed in a case where the image reading result of the second page of the original document looks the same as blank paper. A character string representing an appropriate message that prompts confirmation from the user is shown in the message screen 668. In addition, a button in which a character string "OK" is shown, that is, an OK button 668a, is disposed in the message screen 668.

By viewing the display of the message screen 668, the user can intuitively recognize that the image reading result of the second page of the original document is the same as blank paper, that is, an inappropriate point is present with respect to the second page of the original document. In this case, in a case where the OK button 668a in the message screen 668 is pressed, the message screen 668 disappears. In a case where the return button 150 is pressed, the original document second page reading screen 650 which is the previous configuration screen is displayed as an operation target screen in the main area 120. Accordingly, the image reading process for the second page of the original document can be performed again, and an inappropriate point with respect to the second page of the original document can be corrected. The same measure can be taken with respect to the first page of the original document.

Figure 49:
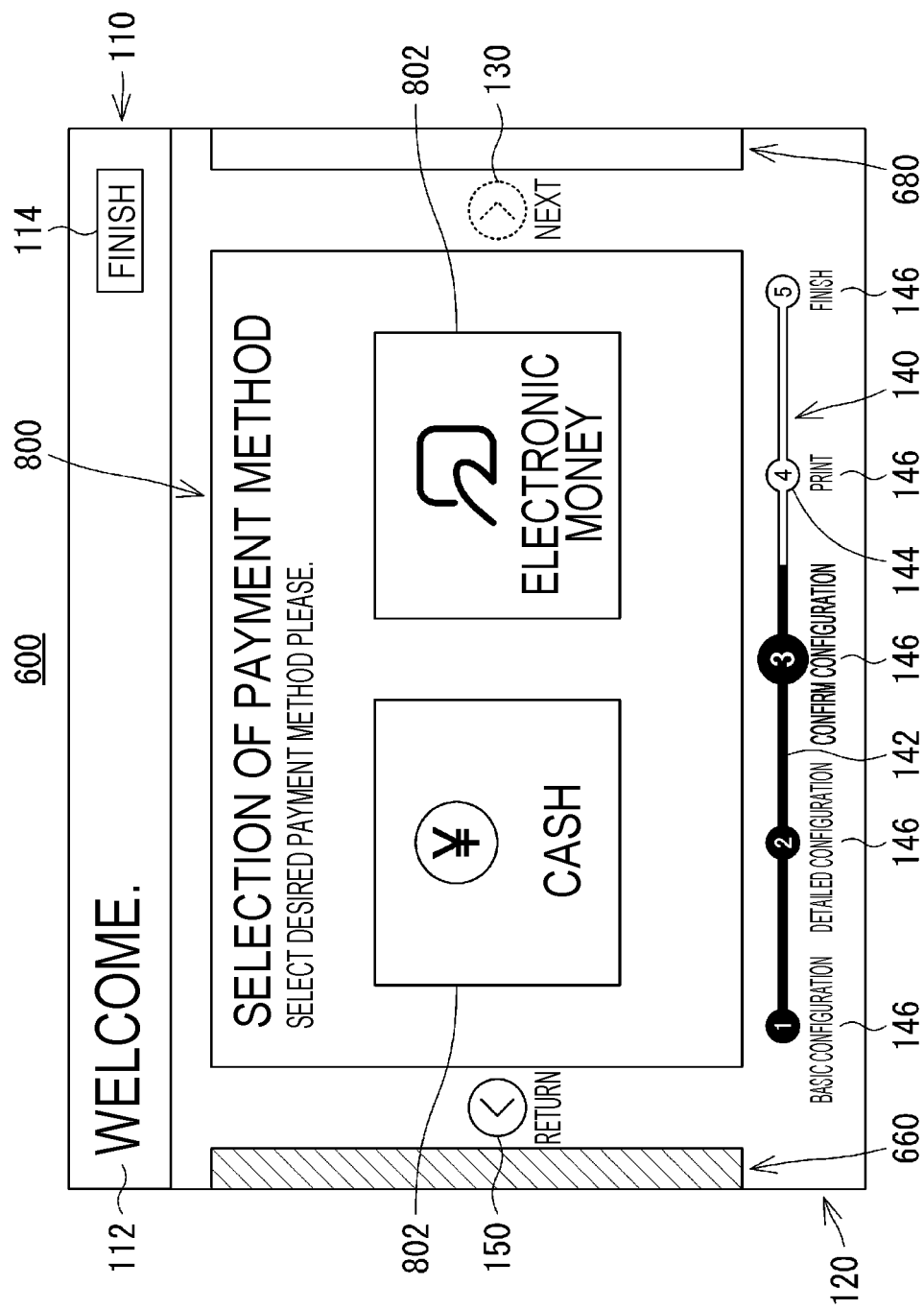
FIG. 49 is a diagram illustrating another example of the payment method selection screen.

In addition, a payment method selection screen 800 as illustrated in FIG. 49 may be displayed instead of the payment method selection screen 670 illustrated in FIG. 28. In the payment method selection screen 800 illustrated in FIG. 49, two buttons 802 and 802 are horizontally linearly disposed. One of the two buttons 802 and 802, for example, the button 802 on the left side corresponds to the payment method using cash. The button 802 on the right side corresponds to the payment method using electronic money. That is, while four buttons 672, 672, . . . are disposed in correspondence with the payment methods using four types of electronic money A to electronic money D in the payment method selection screen 670 illustrated in FIG. 28, only one button 802 that corresponds to the payment method using electronic money is disposed in the payment method selection screen 800 illustrated in FIG. 49.

Figure 50:
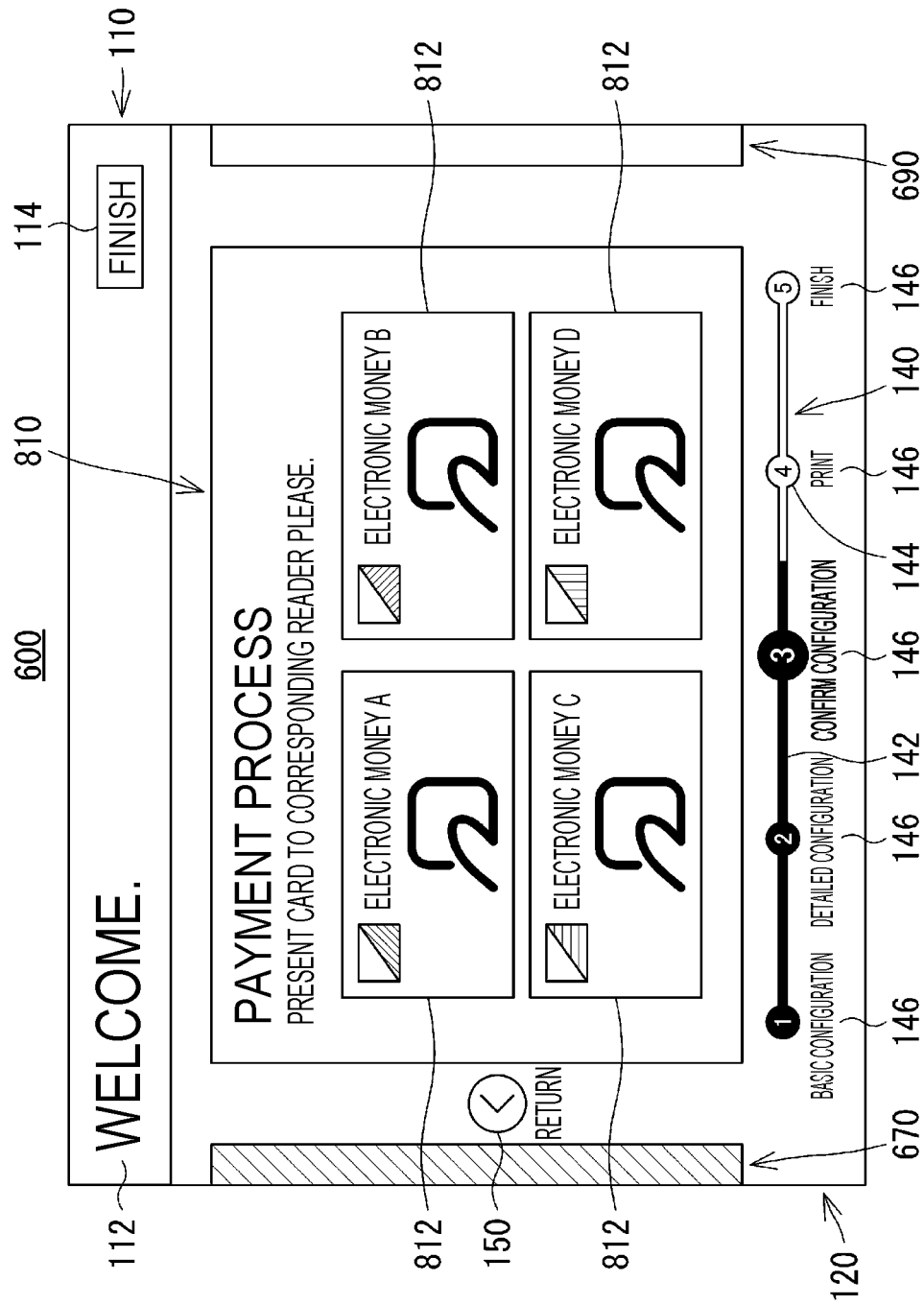
FIG. 50 is a diagram illustrating another example of the payment process screen.

In the payment method selection screen 800 illustrated in FIG. 49, for example, in a case where the button 802 on the right side is pressed, a payment process screen 810 as illustrated in FIG. 50 may be displayed as the subsequent operation target screen. In the payment process screen 810 illustrated in FIG. 50, four reader/writer areas 812, 812, . . . are disposed. The four reader/writer areas 812, 812, . . . correspond to the payment methods using the four types of electronic money A to electronic money D, respectively. Transparent antennas, not illustrated, that correspond to electronic money A to electronic money D respectively are embedded in the four reader/writer areas 812, 812, . . . . The four reader/writer areas 812, 812, . . . are disposed vertically in two rows and horizontally in two columns but are not limited thereto. According to the payment process screen 810 illustrated in FIG. 50, the type of electronic money used in the payment process is distinguished at the time of the payment process.

Second Embodiment

Next, a second embodiment of the present disclosure will be described with reference to FIG. 51. The second embodiment is different from the first embodiment only in terms of the presence of display of the next button 130. Therefore, descriptions of the same parts as in the first embodiment will not be repeated in the second embodiment.

Figure 51:
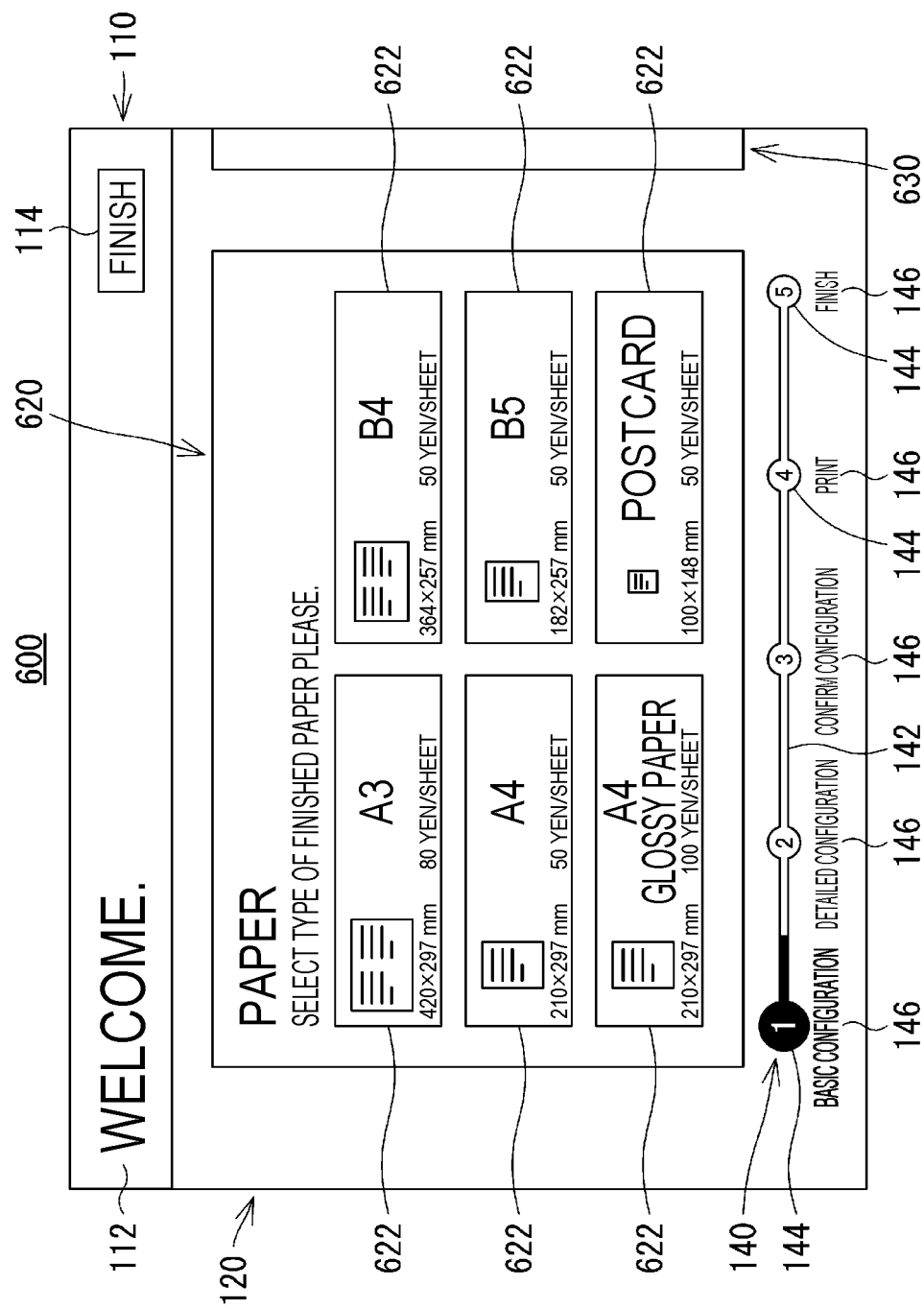
FIG. 51 is a diagram illustrating one example of a copy reception screen including a paper selection screen according to a second embodiment of the present disclosure.

FIG. 51 is one example of the copy reception screen 600 including the paper selection screen 620 in the second embodiment. In the copy reception screen 600 illustrated in FIG. 51, the next button 130 is not displayed. That is, in a case where the current configuration target screen is not configured yet, that is, in a case where it is not possible to advance to the subsequent configuration screen by pressing the next button 130, the next button 130 is not displayed.

According to the second embodiment, from whether or not the next button 130 is displayed, the user can intuitively recognize whether or not configuration on the current configuration target screen is complete, that is, whether or not it is possible to advance to the subsequent configuration screen by pressing the next button 130. According to the second embodiment, the operability of the information processing system 10 having the copy function is improved in the same manner as the first embodiment.

Third Embodiment

Next, a third embodiment of the present disclosure will be described with reference to FIG. 52 to FIG. 55. The third embodiment is different from the first embodiment only in terms of the display state of the next button 130. Therefore, descriptions of the same parts as in the first embodiment will not be repeated in the third embodiment.

FIG. 52 is one example of the copy reception screen 600 including the paper selection screen 620 in the third embodiment. In the copy reception screen 600 illustrated in FIG. 52, a button with a character string "second next" shown in its vicinity, that is, a second next button 130*a*, is disposed in addition to the next button 130. The second next button 130*a* is an operator for advancing (jumping) to the second subsequent configuration screen, that is, the original document first page reading screen 640 in the state in FIG. 52. However, the second next button 130*a* can be operated only in a case where configuration on the subsequent configuration screen is complete. Otherwise, the second next button 130*a* is displayed in a grayed-out manner. That is, the second next button 130*a* is in a disabled state where a user operation is not received.

FIG. 53 illustrates a state where the next button 130 is enabled, but the second next button 130*a* is disabled. According to the state illustrated in FIG. 53, the user can intuitively recognize that configuration on the paper selection screen 620 which is the current configuration target screen, is complete but the original document first page reading screen 640 which is the second subsequent configuration screen is not configured yet. Therefore, while the user can advance to the configuration confirmation screen 630, which is the subsequent configuration screen, by pressing the next button 130, the user cannot advance to the original document first page reading screen 640, which is the second subsequent configuration screen, by pressing the second next button 130*a*.

In addition, FIG. 54 illustrates a state where both of the next button 130 and the second next button 130*a* are enabled. According to the state illustrated in FIG. 54, the user can intuitively recognize that configuration on the paper selection screen 620 which is the current configuration target screen is complete, and configuration on the original document first page reading screen 640 which is the second subsequent configuration screen is also complete. Therefore, by pressing the next button 130, the user can advance to the configuration confirmation screen 630 which is the subsequent configuration screen. By pressing the second next button 130*a*, the user can advance to the original document first page reading screen 640 which is the second subsequent configuration screen.

In the same manner as the second next button 130*a*, for example, a second return button 150*a* may be disposed as illustrated in FIG. 55. The second return button 150*a* is an operator for returning (jumping) to the second previous configuration screen, that is, the paper selection screen 620 in the state in FIG. 55. In order to do so, a character string "second return" is shown in the vicinity of the second return button 150*a*. In the state illustrated in FIG. 55 where the second return button 150*a* is disposed, the user can return to the paper selection screen 620, which is the second previous configuration screen, by pressing the second return button 150*a*. By pressing the return button 150, the user can return to the configuration confirmation screen 630 which is the previous configuration screen, as described above.

According to the third embodiment in which the second next button 130*a* and the second return button 150*a* are disposed, the operability of the information processing system 10 is further improved.

While illustration is not provided, the second return button 150*a* is not disposed in a state where the configuration confirmation screen 630 is the configuration target screen. The second next button 130a is not disposed in a state where the payment method selection screen 670 is the configuration target screen.

Each of the embodiments described thus far is a specific example of the present disclosure, and the technical scope of the present disclosure is not limited thereto. The present disclosure can be applied to aspects other than the embodiments.

For example, in each of the embodiments, while each of the configuration screens 620 to 680 is configured to slide to the left side from the right side as the configuration operation for each of the configuration screens 620 to 680 advances, the present disclosure is not limited thereto. For example, each of the configuration screens 620 to 680 may be configured to slide to the right side from the left side, or each of the configuration screens 620 to 680 may be configured to slide in the up-down direction.

In addition, instead of pressing of the next button 130 and the return button 150, for example, a so-called swipe operation of putting a finger on the display surface of the display 204 and moving the finger in a specific direction, or a so-called flick operation of releasing the finger in a specific direction may be employed.

In addition, in each of the embodiments, while the case of applying the present disclosure to the information processing system 10 including the information processing apparatus 20 which is an MMK is illustratively described, the present disclosure may be applied to other apparatuses.

The present disclosure contains subject matter related to that disclosed in Japanese Priority Patent Application JP 2017-200773 filed in the Japan Patent Office on Oct. 17, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a display unit that includes a display;
a screen switcher that switches and displays a plurality of configuration screens one at a time in a predetermined order as a configuration target screen on the display;
an operation receiver that receives a user operation including a configuration operation which is performed depending on the configuration target screen when each of the plurality of configuration screens is displayed as the configuration target screen on the display surface;
an information processor that performs predetermined information processing under a condition corresponding to contents of configuration operations by receiving the configuration operation related to each of the plurality of configuration screens by the operation receiver; and
wherein the information processor executes subsequent sequence screen adding instructions to display a part of a subsequent sequence screen on the display when each configuration screen other than a final screen is displayed as the configuration target screen on the display, the final screen being the final configuration screen in the order among the plurality of configuration screens, and the subsequent sequence screen being the configuration screen in a subsequent sequence of the configuration target screen in the order.

2. The information processing apparatus according to claim 1,
wherein the user operation includes a first instruction operation of providing an instruction to display the configuration screen on which the reception of the configuration operation by the operation receiver is complete as the configuration target screen on the display again,
the information processing apparatus further comprises a first screen changer that changes the configuration target screen such that the configuration screen corresponding to the first instruction operation is displayed as the configuration target screen on the display again when the first instruction operation is received by the operation receiver, and
wherein the information processor executes the subsequent sequence screen adding instructions to display the part of the subsequent sequence screen on the display depending on whether or not the reception of the configuration operation by the operation receiver is complete on the subsequent sequence screen.

3. The information processing apparatus according to claim 2,
wherein the user operation includes a second instruction operation of providing an instruction to display the subsequent sequence screen as the configuration target screen on the display again in a case where any configuration screen other than the final screen is displayed as the configuration target screen on the display, and the reception of the configuration operation by the operation receiver is complete on the configuration target screen, and
the information processing apparatus further comprises a second screen changer that changes the configuration target screen such that the subsequent sequence screen is displayed as the configuration target screen on the display again when the second instruction operation is received by the operation receiver.

4. The information processing apparatus according to claim 3,
wherein the operation receiver includes a subsequent sequence operation button that is displayed on the display and receives the second instruction operation, and
the subsequent sequence operation button is displayed depending on whether or not the reception of the configuration operation by the operation receiver is complete on the configuration target screen.

5. The information processing apparatus according to claim 1, wherein:
the information processor executes previous sequence screen adding instructions to display a part of a previous sequence screen on the display when each configuration screen other than a leading screen is displayed as the configuration target screen on the display, the leading screen being the initial configuration screen in the order among the plurality of configuration screens, and the previous sequence screen being the configuration screen in a previous sequence of the configuration target screen in the order.

6. The information processing apparatus according to claim 5,
wherein the first instruction operation includes a third instruction operation of providing an instruction to display the previous sequence screen as the configuration target screen on the display again in a case where any configuration screen other than the leading screen is displayed as the configuration target screen on the display, and the operation receiver includes a previous sequence operation button that is displayed on the display surface and receives the third instruction operation.

7. The information processing apparatus according to claim 1, wherein:
the information processor executes status display element adding instructions to display a status display element on the display, the status display element representing whether or not the reception of the configuration operation by the operation receiver is complete on any of the plurality of configuration screens.

8. The information processing apparatus according to claim 7,
wherein the information processor executes the status display element adding instructions to represent which one of the plurality of configuration screens is displayed as the configuration target screen on the display using a state of the status display element.

9. The information processing apparatus according to claim 8,
wherein the status display element receives the first instruction operation as a part of the operation receiver.

10. The information processing apparatus according to claim 1,
wherein the operation receiver includes a touch panel that is disposed on the display.

11. An information processing system comprising:
the information processing apparatus according to claim 1; and
an image forming apparatus that executes an image forming process of forming an image on a sheet,
wherein the predetermined information processing includes an image forming instruction process of instructing the image forming apparatus to execute the image forming process.

12. An information processing program for an information processing apparatus including a display unit that includes a display, and an operation receiving unit that receives a user operation, and performing predetermined information processing,
the program causing a computer of the information processing apparatus to execute:
a screen switching procedure of displaying a plurality of configuration screens one at a time in a predetermined order as a configuration target screen on the display,
the user operation including a configuration operation which is performed depending on the configuration target screen when each of the plurality of configuration screens is displayed as the configuration target screen on the display;
an information processing procedure of performing the predetermined information processing under a condition corresponding to contents of configuration operations by receiving the configuration operation related to each of the plurality of configuration screens by the operation receiving unit; and
a subsequent sequence screen adding procedure of displaying a part of a subsequent sequence screen on the display when each configuration screen other than a final screen is displayed as the configuration target screen on the display, the final screen being the final configuration screen in the order among the plurality of configuration screens, and the subsequent sequence screen being the configuration screen in a subsequent sequence of the configuration target screen in the order.

13. An information processing method in an information processing apparatus including a display unit that includes a display, and an operation receiving unit that receives a user operation, and performing predetermined information processing,
the method comprising:
displaying a plurality of configuration screens one at a time in a predetermined order as a configuration target screen on the display,
the user operation including a configuration operation which is performed depending on the configuration target screen when each of the plurality of configuration screens is displayed as the configuration target screen on the display;
performing the predetermined information processing under a condition corresponding to contents of configuration operations by receiving the configuration operation related to each of the plurality of configuration screens by the operation receiving unit; and
displaying a part of a subsequent sequence screen on the display when each configuration screen other than a final screen is displayed as the configuration target screen on the display, the final screen being the final configuration screen in the order among the plurality of configuration screens, and the subsequent sequence screen being the configuration screen in a subsequent sequence of the configuration target screen in the order.

* * * * *